United States Patent
Lee et al.

(10) Patent No.: US 10,542,389 B2
(45) Date of Patent: *Jan. 21, 2020

(54) APPARATUS AND METHOD FOR MULTICASTING EMERGENCY ALERT MESSAGE IN BROADCAST SIGNAL TO COMPANION DEVICE

(71) Applicant: LG ELECTRONICS INC., Seoul (KR)

(72) Inventors: Jinwon Lee, Seoul (KR); Seungryul Yang, Seoul (KR); Sejin Oh, Seoul (KR); Woosuk Ko, Seoul (KR); Seungjoo An, Seoul (KR); Kyoungsoo Moon, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,725

(22) Filed: Jul. 1, 2019

(65) Prior Publication Data
US 2019/0327583 A1    Oct. 24, 2019

Related U.S. Application Data

(63) Continuation of application No. 15/442,805, filed on Feb. 27, 2017, now Pat. No. 10,405,148, which is a
(Continued)

(51) Int. Cl.
*H04W 4/06* (2009.01)
*H04H 20/59* (2008.01)
*H04W 4/90* (2018.01)
*H04W 4/12* (2009.01)

(52) U.S. Cl.
CPC ............ *H04W 4/06* (2013.01); *H04H 20/59* (2013.01); *H04W 4/12* (2013.01); *H04W 4/90* (2018.02)

(58) Field of Classification Search
CPC .......... H04W 4/06; H04W 4/12; H04W 4/90; H04W 4/22; H04H 20/59
(Continued)

(56) References Cited

U.S. PATENT DOCUMENTS

| 2005/0086685 A1 | 4/2005 | Rahman et al. |
| 2007/0094680 A1 | 4/2007 | Kim et al. |

(Continued)

FOREIGN PATENT DOCUMENTS

| JP | 2005079753 A | 3/2005 |
| JP | 2007259268 A | 10/2007 |

(Continued)

*Primary Examiner* — Michael Y Mapa
(74) *Attorney, Agent, or Firm* — Dentons US LLP

(57) ABSTRACT

A broadcast receiving apparatus may comprise: a broadcast interface for receiving a broadcast signal comprising an emergency alert message and signaling information indicating metadata for the emergency alert message; a control unit for generating an emergency alert multicast message comprising attributes of the emergency alert message on the basis of the broadcast signal; and a companion screen interface for transferring the emergency alert multicast message to at least one companion screen device in a multicast mode.

14 Claims, 53 Drawing Sheets

Related U.S. Application Data continuation of application No. PCT/KR2015/009113, filed on Aug. 31, 2015.

(60) Provisional application No. 62/044,954, filed on Sep. 2, 2014.

(58) Field of Classification Search
USPC .................. 455/404.1, 521; 370/33, 37–51
See application file for complete search history.

(56) References Cited

U.S. PATENT DOCUMENTS

| | | | |
|---|---|---|---|
| 2007/0136743 A1* | 6/2007 | Hasek | G08B 25/085 |
| | | | 725/33 |
| 2007/0296575 A1 | 12/2007 | Eisold et al. | |
| 2009/0247110 A1 | 10/2009 | Sennett et al. | |
| 2010/0211972 A1 | 8/2010 | Howarter et al. | |
| 2014/0313014 A1* | 10/2014 | Huh | G08B 7/066 |
| | | | 340/7.55 |
| 2017/0085955 A1* | 3/2017 | Deshpande | H04N 21/436 |

FOREIGN PATENT DOCUMENTS

| | | |
|---|---|---|
| JP | 2014027664 A | 2/2014 |
| KR | 1020070043401 A | 4/2007 |
| KR | 1020080020728 A | 3/2008 |
| KR | 100874549 B1 | 12/2008 |
| KR | 1020090113165 A | 10/2009 |

\* cited by examiner

FIG. 6

| Syntax | No. of Bits | Format |
|---|---|---|
| service_map_table_section() { | | |
|    table_id | 8 | 0xDB |
|    section_syntax_indicator | 1 | '0' |
|    private_indicator | 1 | '1' |
|    reserved | 2 | '11' |
|    section_length | 12 | uimsbf |
|    table_id_extension { | | |
|      SMT_protocol_version | 8 | uimsbf |
|      reserved | 8 | uimsbf |
|    } | | |
|    reserved | 2 | '11' |
|    version_number | 5 | uimsbf |
|    current_next_indicator | 1 | bslbf |
|    section_number | 8 | uimsbf |
|    last_section_number | 8 | uimsbf |
|    num_services | 8 | uimsbf |
|    for (i=0; i<num_services; i++) | | |
|    { | | |
|      service_id | 16 | uimsbf |
|      reserved | 2 | '11' |
|      service_status | 2 | uimsbf |
|      SP_indicator | 1 | bslbf |
|      short_service_name_length /* m */ | 3 | uimsbf |
|      short_service_name | 16*m | bslbf |
|      reserved | 2 | '11' |
|      service_category | 6 | uimsbf |
|      reserved | 3 | '111' |
|      num_components | 5 | uimsbf |
|      for (j=0; j<num_components; j++) | | |
|      { | | |
|         essential_component_indicator | 1 | bsblf |
|         reserved | 3 | '111' |
|         num_component_level_descriptors | 4 | uimsbf |
|         for (k=0; k<num_component_level_descriptors; k++) | | |
|         { | | |
|            component_level_descriptor() | var | |
|         } | | |
|      } | | |
|      reserved | 4 | '1111' |
|      num_service_level_descriptors | 4 | uimsbf |
|      for (m=0; m<num_service_level_descriptors; m++) | | |
|      { | | |
|         service_level_descriptor() | var | |
|      } | | |
|    } | | |

FIG. 7

| Syntax | No. of Bits | Format |
|---|---|---|
| service_map_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension | | |
|     SMT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (i=0;i<num_services; i++) | | |
|   { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length/* m */ | 3 | uimsbf |
|     short_service_name | 16*m | bslbf |
|     channel_number | 16 | uimsbf |
|     service_category | 6 | uimsbf |
|     reserved | 2 | '11' |
|     num_components | 5 | uimsbf |
|     for (j=0; j<num_components; j++) | | |
|     { | | |
|       essential_component_indicator | 1 | bsblf |
|       reserved | 3 | '111' |
|       num_component_level_descriptors | 4 | uimsbf |
|       for (k=0; k<num_component_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0;m<num_service_level_descriptors; m++) | | |
|     { | | |
|       service_level_descriptor() | var | |
|     } | | |
|     reserved | 4 | '1111' |
|     num_ensemble_level_descriptors | 4 | uimsbf |
|     for (n=0; n<num_ensemble_level_descriptors; n++) { | | |
|       ensemble_level_descriptor() | var | |
|     } | | |
|   } | | |
| } | | |

FIG. 8

| Syntax | No. of Bits | Format |
|---|---|---|
| data_path_descriptor( ) { | | |
|     descriptor_tag | 8 | uimsbf |
|     descriptor_length | 8 | uimsbf |
|     delivery_network_type | 8 | uimsbf |
|       data_path(delivery_network_type) | var | |
| } | | |

FIG. 9

| Syntax | No. of Bits | Format |
|---|---|---|
| data_path( ) { | | |
|     IP_version_flag | 1 | bslbf |
|     source_IP_address_flag | 1 | bslbf |
|     destination_IP_address_flag | 1 | bslbf |
|     reserved | 5 | '11111' |
|     if (source_IP_address_flag) | | |
|       source_IP_address | 32 or 128 | uimsbf |
|     if (destination_IP_address_flag) | | |
|       destination_IP_address | 32 or 128 | uimsbf |
|     port_num_count | 8 | |
|     if(port_num_count > 0) | | |
|       destination_UDP_port_num | 16 | uimsbf |
| } | | |

| Syntax | No. of Bits | Format |
|---|---|---|
| data_path( ) { | | |
|     IP_version_flag | 1 | bslbf |
|     source_IP_address_flag | 1 | bslbf |
|     reserved | 6 | '111111' |
|     if(source_IP_address_flag) | | |
|         source_IP_address | 32 or 128 | uimsbf |
|     destination_IP_address | 32 or 128 | uimsbf |
|     destination_UDP_port_num | 16 | uimsbf |
|     tsi | 16 | uimsbf |
| } | | |

FIG. 17

| XML Element/Attribute | Cardinality | Data Type | Description |
|---|---|---|---|
| ServiceInfo | | | |
| @ServiceId | 1 | unsignedShort | Unique identifier for Service |
| @ServiceName | 0..N | string | Human readable name of the service |
| @MajorChanNum | 0..1 | integer 0..15 | Major"channel number"of the service, for service selection |
| @MinorChanNum | 0..1 | integer 0..15 | Minor"channel number"of the service, for service selection |
| @Description | 0..N | string | Textual description of the service |
| @Genre | 0..N | string | Genre(s) of the service |
| @Icon | 0..N | Base64Binary | Icon used to represent the service |
| @Language | 0..1 | string | Primary language used in the service |
| @UsageReportInfo | 0..N | string | Parameters to be used for service usage reporting (e.g., URL, reporting interval, etc.) |
| @Targeting | 0..N | string | Targeting properties for the service |
| @ServiceProtection | 0..1 | string | Service protection properties for the service |
| @AdvisoryRating | 0..N | string | Content advisory rating(s) for the service |
| ComponentItem | 1..N | | Component information of the service |
| @ComponentId | 1 | unsignedShort | Unique identifier for component of Service |
| @ComponentType | 1 | string | Component type |
| @ComponentName | 0..N | string | Human readable name of the component of Service |
| @StartTime | 0..1 | unsignedShort | Start time of the component |
| @Duration | 0..1 | unsignedShort | Duration of the component |
| @TargetScreen | 0..N | string | Targeting window of component (e.g. Secondary screen) |
| @URL | 0..N | any URI | URL of component in the Content Server |
| @ContentAdvisory | 0..N | string | Content advisory rating(s) for the component |
| @Genre | 0..N | string | Genre(s) of the component |

FIG. 19

| Service | Service Type | Service ID |
|---|---|---|
| ServiceSignaling | atsc3.0servicesignaling:1 | urn:atsc.org:serviceId:atsc3.0servicesignaling |

(a)

| Variable Name | Req/Opt | Data Type | Evented? |
|---|---|---|---|
| ServiceProperty | Required | String (XML, JSON, ...) | Yes |

(b)

| Name | Required/Optional |
|---|---|
| GetServiceProperty | Required |

(c)

| Argument | Direction | Related State Variable |
|---|---|---|
| ServiceProperty | OUT | ServiceProperty |

(d)

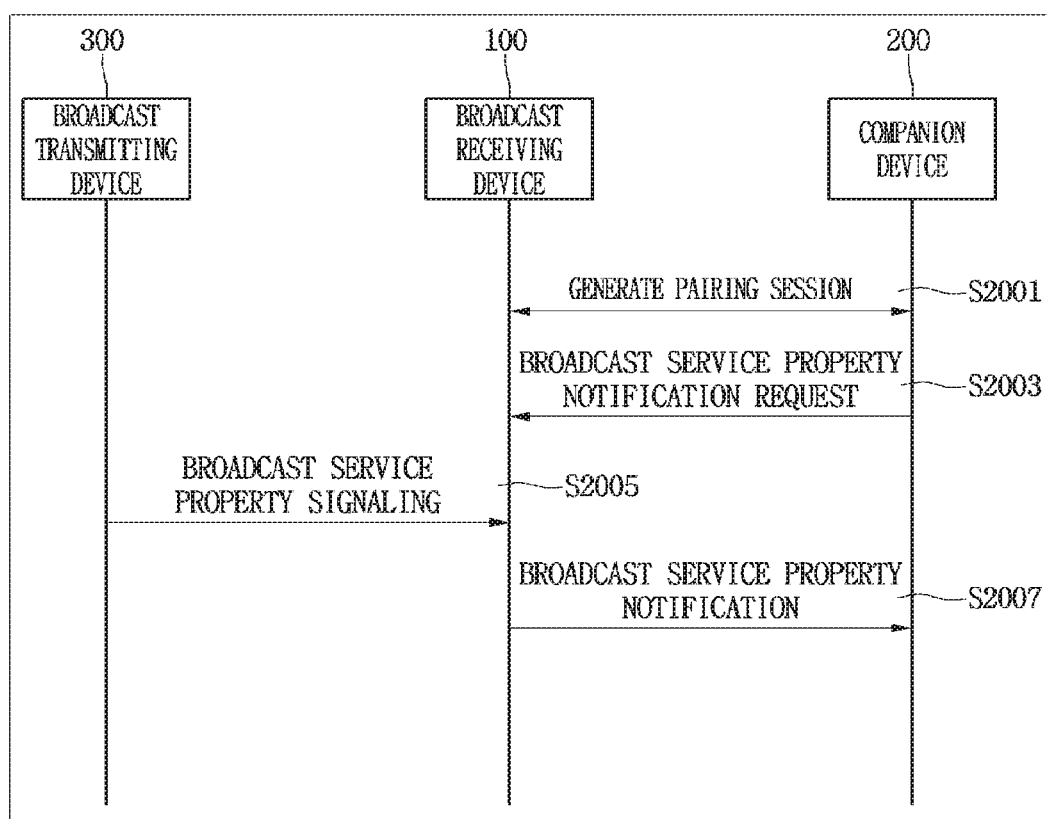

FIG. 21

```
<?xml Version="1.0"?>
< propertyset >
  <property>
    < ServiceId >a000001</ServiceId >
  </property>
  <property>
    < ServiceName >MBC Music</ServiceId>
  </property>
  <property>
    < ContentId >mbcradio002</ServiceId >
  </property>
  <property>
    < ContentName >Pop Chart</ServiceId>
  </property>
  <property>
    < MajorChanNum >11</ServiceId>
  </property>
  <property>
    < MinorChanNum >5</ServiceId>
  </property>
  ....
</propertyset >
```

(a)

```
<?xml Version="1.0"?>
< ServiceProperty>
  < ServiceId>a000001</ServiceId>
  < ServiceName>MBC Music</ServiceName>
  < ContentId>mbcradio002</ContentId>
  < ContentName>Pop Chart</ContentName>
  < MajorChanNum>11</MajorChanNum>
  < MinorChanNum>5</MinorChanNum>
  ....
  ....
</ServiceProperty>
```

(b)

```
<?xml Version="1.0"?>
< ServiceProperty (or ServiceInfo)
  ServiceId ="a000001" ServiceName="MBC Music" MajorChanNum="11" MinorChanNum="5" ...>
  < ComponentItem  ContentId ="mbcradio002" ComponentType="video" ComponentName =" afaefaef  ", ....>
  </ComponentItem>
</ServiceProperty (or /ServiceInfo)>
```

| Variable Name | Req/Opt | Data Type | Evented? |
|---|---|---|---|
| Service Property | Required | string | No |
| ServicePropertyName | Required | string | No |
| ServicePropertyChangeFlag | Required | boolean | Yes |

(a)

| Name | Required/Optional |
|---|---|
| GetServiceProperty | Required |

(b)

| Argument | Direction | Related State Variable |
|---|---|---|
| ServicePropertyName | IN | ServicePropertyName |
| ServiceProperty | OUT | ServiceProperty |

| Variable Name | Req/Opt | Data Type | Evented? |
|---|---|---|---|
| ServiceProperty | Required | string (XML) | No |
| A_ARG_TYPE_ServicePropertyName | Required | string (CSV) | No |
| A_ARG_TYPE_UpdatedServicePropertyValue | Required | string (XML) | No |
| UpdatedPropertyNames | Required | string (XML) | Yes |

(a)

```
<?xml Version="1.0"?>
<UpdatedPropertyNames>
  <propertyList>
    <propertyName>ContentId</propertyName>
    <propertyName>ContentName</propertyName>
    <propertyName>MajorChanNum</propertyName>
  </propertyList>
</UpdatedPropertyNames>
```

(b)

```
<?xml Version="1.0"?>
< UpdatedPropertyNames>
  <added>
    <propertyName>ContentId</propertyName>
    <propertyName>ContentName</propertyName>
  </added>
  <modified>
    <propertyName>Description</propertyName>
  </modified>
  <deleted>
    <propertyName>Genre</propertyName>
  </deleted>
</UpdatedPropertyNames>
```

```
<?xml version = "1.0" encoding = "UTF-8"?>
<alert xmlns = "http://www.incident.com/cap/1.0">
  <identifier>KSTO1055887203</identifier>
  <sender>KSTO@NWS.NOAA.GOV</sender>
  <sent>2003-06-17T14:57:00-07:00</sent>
  <status>Actual</status>
  <msgType>Alert</msgType>
  <scope>Public</scope>
  <info>
    <category>Met</category>
    <event>SEVERE THUNDERSTORM</event>
    <urgency>Immediate</urgency>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT...NATIONAL WEATHER SERVICE DOPPLER RADAR
INDICATED A SEVERE THUNDERSTORM OVER SOUTH CENTRAL ALPINE COUNTRY...OR ABOUT 18
MILES SOUTHEAST OF KIRKWOOD...MOVING SOUTHWEST AT 5 MPH. HAIL...INTENSE RAIN AND
STRONG DAMAGING WINDS ARE LIKELY WITH THIS STORM.</description>
    <instruction>TAKE COVER IN A SUBSTANTIAL SHELTER UNTIL THE STORM
PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME
NORTHEASTERN CALAVERAS COUNTY IN CALIFONIA, SOUTHWESTERN ALPINE COUNTY IN
CALIFORNIA</areaDesc>
      <polygon>38.47,-120.14 38.34,-119.95 38.52,-119.74 38.62,-119.89 38.47,
-120.14</polygon>
      <geocode>fips6=006109</geocode>
      <geocode>fips6=006009</geocode>
      <geocode>fips6=006003</geocode>
    </area>
  </info>
</alert>
```

FIG. 31

| Service | Service Type | Service ID |
|---|---|---|
| EmergencyAlert | atsc3.0:atsc3.0eas:1 | urn:atsc.org:service:atsc3.0eas |

(a)

| Variable Name | Req/Opt | Data Type | Evented? |
|---|---|---|---|
| EmergencyAlert | Required | string (XML, JSON, ...) | Yes |
| EmergencyAlertProperty | Required | string (XML, JSON, ...) | No or Yes |

(b)

```
<EmergencyAlert>

<dateTime>20140122T052000 </dateTime>
    <messageType>CAP</messageType>
    <version>1.1</version>
</EmergencyAlert>
```

(c)

| Name | Required/Optional |
|---|---|
| GetAllEmergencyAlertMessage | Required |

(d)

| Argument | Direction | Related State Variable |
|---|---|---|
| EmergencyAlertProperty | OUT | EmergencyAlertProperty |

```
<?xml version = "1.0" encoding = "UTF-8"?>
<alert xmlns = "http://www.incident.com/cap/1.0")
<identifier>KSTo1055887203<1identifier>
<sender>KSTo8NWS.NOAA.GOV</sender>
<3ent>2003-06-17T14:57:00-07:00</sent>
<status>Actual</status>
<mngype>Alert</mngype>
<scope>Public</scope>
<info>
<category>MEt<1category>
<event>SEVERE THUNDERSTORM</event>
<urgency>Immediate</urgency>
<severity>5evere</severity>
<certainty>Likely</certainty>
<eventCode>same=SVR<1eventCode>
<expires>2003-06-17Tl6=00:00-07:00</expire3>
<senderName>NATIONAL WEATHER SERVICE SACRAMENTO CA</3enderName>
<headline>SEVERE THUNDERSTORM WARNING</headline>
<description> AT 254 PM PDT...NATIONAL WEATHER SERVICE DOPPLER RADAR
INDICATED A SEVERE THUNDERSTORM OVER SOUTH CENTRAL ALPINE COUNTY...OR ABOUT 18
MILES SOUTHEAST OF KIRKWOOD...MOVING SOUTHWEST AT 5 MPH. HAIL...INTENSE RAIN AND
STRONG DAMAGING WINDS ARE LIKELY WITH THIS STORM.</description>
<instruction>TAKE COVER IN A SUBSTANTIAL SHELTER UNTIL THE STORM
PASSES.</instruction>
<contact>BARUFFALDI/JUSKIE</contact>
<area>
<areaDesc>EXTREME NORTH CENTRAL TUOLUMNE COUNTY IN CALIFORNIA, EXTREME
NORTHEASTERN CALAVERAS COUNTY IN CALIFORNIA, SOUTHWESTERN ALPINE COUNTY IN
CALIFORNIA</areaDesc>
<polygon>33.47,-120.14 38.34,-119.95 38.52,-119.74 38.62,-119.89 38.47,-
120.14</polygon>
<geocode>fipsé=006109</geocode>
<geocode>fips€=006009</geocode>
<geocode>fipsé:006003<1geocode>
</area>
</info>
</alert>
```

FIG. 34

| Variable Name | Req/Opt | Data Type | Evented? |
|---|---|---|---|
| EmergencyAlert | Required | string | Yes |
| EmergencyAlertProperty | Required | string | No |

(a)

| Name | Required/Optional |
|---|---|
| GetAllEmergencyAlertMessage | Required |

(b)

| Argument | Direction | Related State Variable |
|---|---|---|
| EmergencyAlertProperty | OUT | EmergencyAlertProperty |

| Variable Name | Req/Opt | Data Type | Evented? |
|---|---|---|---|
| EmergencyAlert | Required | string (XML JSON, ... ) | Yes |

(a)

```
<?xml Version="1.0"?>
< EmergencyAlert >
  < ServiceId>000011</ServiceId>
  < MessageId >KSTO1055887203</MessageId>
  < MessageURI > http://atsc.easinfo.com/</MessageURI>
</EmergencyAlert>
```

(b)

| Name | Required/Optional |
|---|---|
| GetEmergencyAlertInfo | Required |

(c)

| Argument | Direction | Related State Variable |
|---|---|---|
| EmergencyAlert | OUT | EmergencyAlert |

| Variable Name | Req/Opt | Data Type | Evented? |
|---|---|---|---|
| EmergencyAlert | Required | string (XML) | Yes or No |
| A_ARG_TYPE_EmergencyAlertURI | Required | string (XML) | Yes or No |

(a)

```
<?xml Version="1.0"?>
< EmergencyAlert >
  < dateTime>20140122T052000</dateTime >
  < ServiceId>000011</ServiceId>
  < MessageId>KSTO1055887203</MessageId>
  < URIList >
      <URI> file://EASmessageInfo/ui/full/index.html</URI>
      <URI> file://EASmessageInfo/ui/alternative/index.html</URI>
  </URIList >
</EmergencyAlert>
```

(b)

```
<?xml Version="1.0"?>
< EmergencyAlerURI >
  <URI>  file://EASmessageInfo/ui/index.html </URI>
</ EmergencyAlertURI >
```

| Name | Required/Optional |
|---|---|
| GetEmergencyAlert | Required |
| GetEmergencyAlertURI | Required |

(a)

| Argument | Direction | Related State Variable |
|---|---|---|
| EmergencyAlert | OUT | EmergencyAlert |

(b)

| Argument | Direction | Related State Variable |
|---|---|---|
| EmergencyAlertURI | OUT | A_ARG_TYPE_EmergencyAlertURI |

| Service | Service Type | Service ID |
|---|---|---|
| NRTDataSignaling | atsc3.0:nrtdatasignaling:1 | urn:atsc.org:serviceId:atsc3.0:nrtdatasignaling |

(a)

| XML Element/Attribute | Cardinality | Data Type | Description |
|---|---|---|---|
| NRTDataInfo | | | |
| @DataId | 1 | unsignedShort | Unique identifier for NRT Data |
| @ConsumptionModel | 1 | string | Consumption model for NRT Data |
| @DownloadingStatus | 0..1 | string | Downloading status of NRT Data: "Downloading", "Completed", or "Error" |
| ContentItem | 1..N | | Content Item Information of NRT Data |
| @ContentItemId | 1 | unsignedShort | Unique identifier of NRT Content Item |
| @ContentItemName | 0..N | string | Human reqdable name of NRT Content Item |
| @ContentItemSize | 1 | unsignedShort | Size of the NRT Content Item, in bytes |
| @PlaybackLength | 0..1 | unsignedShort | Playout time of the NRT Content Item |
| @URL | 0..N | any URI | URL of NRT Content Item in Content Server |

| Signaling message header | Signaling message data (binary or XML formatted) |
|---|---|

| Syntax | No. Bits | Format |
|---|---|---|
| signaling_message_header (){ | | |
|    signaling_id | 8 | uimsbf |
|    signaling_length | 16 | uimsbf |
|    signaling_id_extension | 16 | uimsbf |
|    version_number | 4 | uimsbf |
|    current_next_indicator | 1 | uimsbf |
|    indicator_flags { | | |
|       fragmentation_indicator | 1 | bslbf |
|       payload_format_indicator | 1 | bslbf |
|       expiration_indicator | 1 | bslbf |
|    } | | |
|    if(fragmentation_availability == '1'){ | | |
|       fragment_number | 4 | uimsbf |
|       last_fragment_number | 4 | uimsbf |
|    } | | |
|    if(payloadformat_availability == '1'){ | | |
|       payload_format | 8 | uimsbf |
|    } | | |
|    if(expiration_availability == '1'){ | | |
|       expiration | 32 | uimsbf |
|    } | | |
|    } | | |
| } | | |

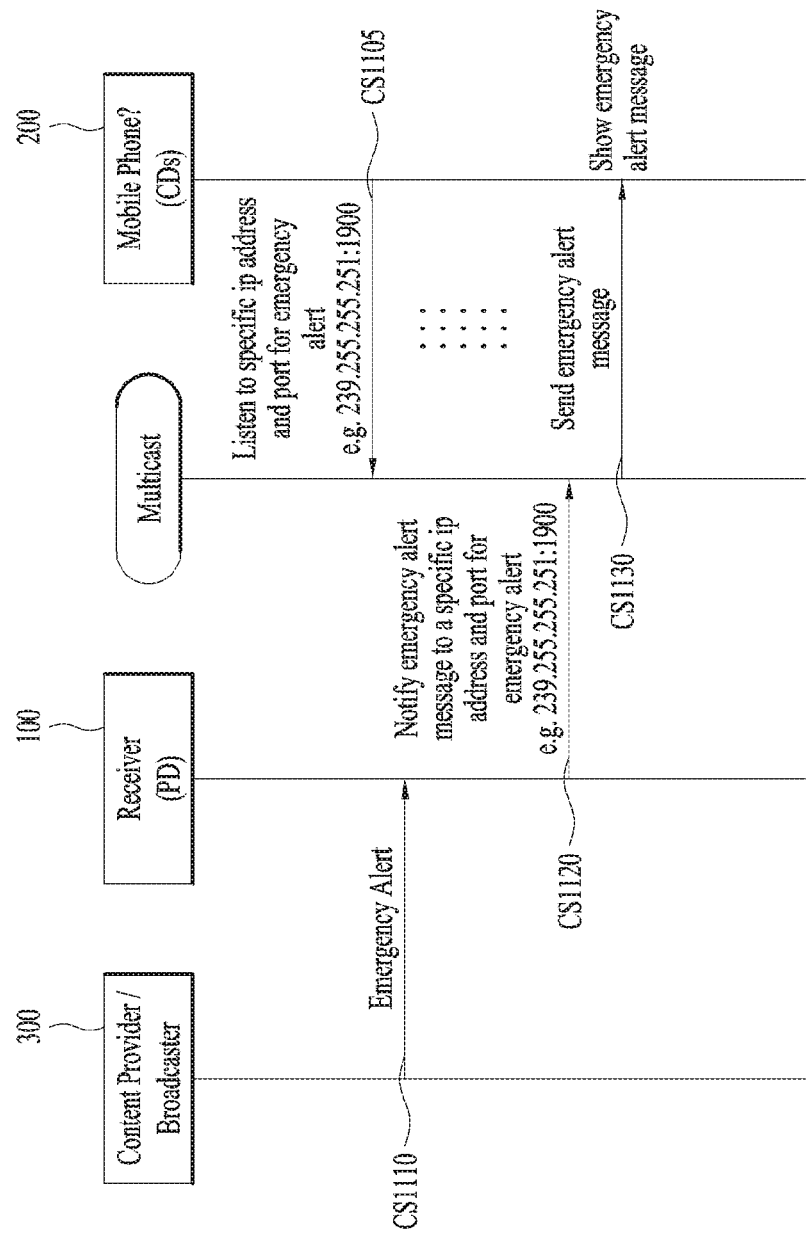

FIG. 59

```
NOTIFY * HTTP/1.1
HOST: 239.255.255.251:1900
CACHE-CONTROL: max-age = seconds until the multicast message expires
LOCATION: URL for the message
NOTIFICATION-TYPE: atsc:emergency
MESSAGE-TYPE: CAP
```

FIG. 60

```
<?xml version = "1.0" encoding = "UTF-8"?>
<alert xmlns = "http://www.incident.com/cap/1.0">
    <identifier>KSTO1055887203</identifier>
    <sender>KSTO@NOAA.GOV</sender>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT...NATIONAL WEATHER SERVICE DOPPLER RADAR INDICATED A SEVERE THINDERSTORM OVER SOUTH CENTRAL ALPINE COUNTY...OR ABOUT 18 MILES SOUTHEAST OF KIRKWOOD...MOVING SOUTHWEST AT 5 MPH. HALL... INTENSE RAIN AND STRONG DAMAGING WINDS ARE LIKELY WITH THIS STORM.</description>
    <instruction>TAKE COVER IN A SUBSTANTIAL SHELTER UNTIL THE STORM PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME NORTHEASTERN CALAVERAS COUNTY IN CALIFORNIA, SOUTHWESTERN ALPINE COUNTY IN CALIFORNIA</areaDesc>
        <polygon>38.47,-120.14 38.34,-119.95 38.52,-119.74 38.62,-119.89 38.47,-120.14</polygon>
-120.14</polygon>
        <geocode>fips6=006109</geocode>
        <geocode>fips6=006009</geocode>
        <geocode>fips6=006003</geocode>
      </area>
    </info>
  </alert>
```

FIG. 61

```
<?xml version = "1.0" encoding = "UTF-8"?>
<EmergencyAlertProperty>
    <identifier>KSTO1055887203</identifier>
    <category>Met</category>
    <urgency>Immediate</urgency>
    <severity>Severe</severity>
    <certainty>Likely</certainty>
    <description> AT 254 PM PDT...NATIONAL WEATHER SERVICE DOPPLER RADAR INDICATED A SEVERE THINDERSTORM OVER SOUTH CENTRAL ALPINE COUNTY...OR ABOUT 18 MILES SOUTHEAST OF KIRKWOOD...MOVING SOUTHWEST AT 5 MPH. </description>
    <areaDesc>EXTREME NORTH CENTRAL TOULUMNE COUNTY IN CALIFORNIA</areaDesc>
</EmergencyAlertProperty>
```

(a)

AT 254 PM PDT...NATIONAL WEATHER SERVICE DOPPLER RADAR INDICATED A SEVERE THINDERSTORM OVER SOUTH CENTRAL ALPINE COUNTY...OR ABOUT 18 MILES SOUTHEAST OF KIRKWOOD...MOVING SOUTHWEST AT 5 MPH (b)

FIG. 62

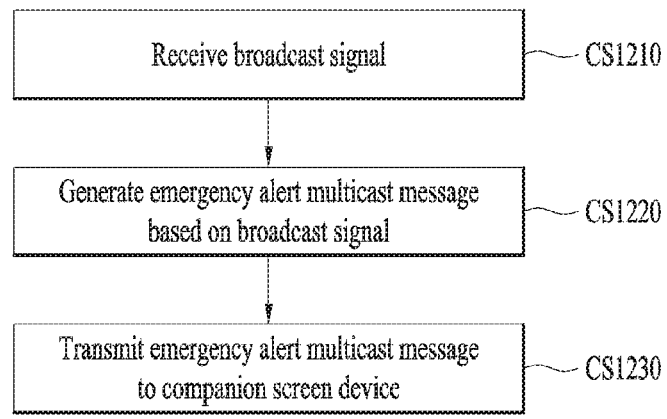

APPARATUS AND METHOD FOR MULTICASTING EMERGENCY ALERT MESSAGE IN BROADCAST SIGNAL TO COMPANION DEVICE

This application is a Continuation application of U.S. patent application Ser. No. 15/442,805, filed on Feb. 27, 2017, which is a Continuation Bypass of International Application No. PCT/KR2015/009113, filed Aug. 31, 2015 which claims the benefit of U.S. Provisional Application No. 62/044,954, filed on Sep. 2, 2014, the disclosures of which are incorporated herein by reference in their entirety.

TECHNICAL FIELD

The present invention relates to a broadcast reception device, a method of operating a broadcast reception device, a companion device for interoperating with a broadcast reception device and a method of operating a companion device.

BACKGROUND ART

With development of digital broadcast and communication environments, hybrid broadcasts using communication networks (for example, broadband) in addition to existing broadcast networks receive attentions. Additionally, such hybrid broadcasts provide applications or broadcast services interoperating with terminal devices such as smartphones or tablets. As the uses of terminal devices such as smartphones or tablets increase, it is necessary to provide broadcast services efficiently interoperating with the terminal devices.

Especially, broadcast services efficiently providing the properties of broadcast services or information such as an emergency alarm transmitted through broadcasts to terminal devices such as smartphones or tablets are required.

DISCLOSURE

Technical Problem

Embodiments provide a broadcast reception device providing broadcast services efficiently interoperating with terminal devices and an operating method thereof.

Embodiments also provide a broadcast reception device providing broadcast services efficiently transmitting information to terminal devices and an operating method thereof.

Embodiments also provide a terminal device efficiently interoperating with a broadcast reception device and efficiently receiving information from the broadcast reception device.

Embodiments also provide a method of delivering an emergency alert message to a companion device using a multicast method in a next-generation broadcast system.

Embodiments also provide a service signaling message format in a next-generation broadcast network.

Technical Solution

The object of the present invention can be achieved by providing a broadcast reception device including a broadcast interface configured to receive a broadcast signal including an emergency alert message and signaling information indicating metadata of the emergency alert message, a controller configured to generate an emergency alert multicast message including properties of the emergency alert message based on the broadcast signal, and a companion screen interface configured to transmit the emergency alert multicast message to at least one companion screen device using a multicast method.

The signaling information may include first information for providing discovery and acquisition of a service and at least one content component included in the service and second information including data related to fast channel joining and switching.

The signaling information may include at least one of a fragmentation_indicator indicating whether the signaling information is fragmented, a payload_format_indicator indicating whether information on a payload format is included in a header part of the signaling information, an expiration_indicator indicating whether an expiration time of the signaling information is included in the header part of the signaling information, a fragment_number attribute indicating the number of the fragmented signaling information, a last_fragment_number attribute indicating a last number of the numbers of the fragmented signaling information, a payload_format attribute indicating the payload format of the signaling information, and an expiration attribute indicating the expiration time of the signaling information.

The emergency alert multicast message may include a header message, and the header message may include at least one of a HOST field indicating an address and/or port capable of multicasting the emergency alert multicast message, a CACHE-CONTROL field indicating an expiration time of the emergency alert multicast message, a LOCATION field indicating a location of the emergency alert message, a NOTIFICATION-TYPE field indicating a type of the emergency alert multicast message and a MESSAGE-TYPE field indicating the type of the emergency alert message.

The emergency alert multicast message may include a body message and the body message includes all properties of the emergency alert message.

The emergency alert multicast message may include a body message, and the body message includes at least one of an identifier element for identifying an emergency alert, a category element indicating a category of the emergency alert, a description element indicating a description of the emergency alert, an areaDesc element indicating an area corresponding to the emergency alert, an urgency element indicating urgency of the emergency alert, a severity element indicating severity of disaster causing the emergency alert and a certainty element indicating the certainty of disaster causing the emergency alert.

The signaling information may include supplementary information of the emergency alert message, and the controller may generate the emergency alert multicast message including the supplementary information of the emergency alert message.

The supplementary information of the emergency alert message may include a MessageURI indicating an address of supplementary information related to the emergency alert.

The controller may generate a user interface of the emergency alert based on the emergency alert message and generate the emergency alert multicast message including user interface information indicating properties of the user interface.

The user interface information may include a URIList indicating a location of a page configuring the user interface.

According to another aspect of the present inventin, there is provided a broadcast reception method including receiving a broadcast signal including an emergency alert message and signaling information indicating metadata of the emergency alert message, generating an emergency alert multicast message including properties of the emergency alert message based on the broadcast signal, and transmitting the emergency alert multicast message to at least one companion screen device using a multicast method.

The signaling information may include first information for providing discovery and acquisition of a service and at least one content component included in the service and second information including data related to fast channel joining and switching.

The emergency alert multicast message may include a header message, and the header message includes at least one of a HOST field indicating an address and/or port capable of multicasting the emergency alert multicast message, a CACHE-CONTROL field indicating an expiration time of the emergency alert multicast message, a LOCATION field indicating a location of the emergency alert message, a NOTIFICATION-TYPE field indicating a type of the emergency alert multicast message and a MESSAGE-TYPE field indicating the type of the emergency alert message.

The emergency alert multicast message may include a body message, and the body message may include at least one of an identifier element for identifying an emergency alert, a category element indicating a category of the emergency alert, a description element indicating a description of the emergency alert, an areaDesc element indicating an area corresponding to the emergency alert, an urgency element indicating urgency of the emergency alert, a severity element indicating severity of disaster causing the emergency alert and a certainty element indicating the certainty of disaster causing the emergency alert.

Advantageous Effects

Provided is a broadcast reception device providing broadcast services efficiently interoperating with terminal devices and an operating method thereof.

Provided is a broadcast reception device providing broadcast services efficiently transmitting information to terminal devices and an operating method thereof.

Provide is a terminal device efficiently interoperating with a broadcast reception device and efficiently receiving information from the broadcast reception device.

Provided is a method of delivering an emergency alert message to a companion device using a multicast method in a next-generation broadcast system.

Provided is a service signaling message format in a next-generation broadcast network.

DESCRIPTION OF DRAWINGS

FIG. 6 is a view illustrating a broadcast service signaling table according to an embodiment of the present invention.

FIG. 7 is a view of a broadcast service signaling table according to another embodiment of the present invention.

FIG. 8 is a view illustrating broadcast service transmission path signaling information according to an embodiment of the present invention.

FIG. 9 is a view that broadcast service transmission path signaling information signals the transmission of a broadcast service through IP stream according to an embodiment of the present invention.

FIG. 17 is a view showing properties of a broadcast service signaled according to an embodiment of the present invention.

FIG. 19 is a view showing service signaling messages of a broadcast reception device and a companion device using an eventing method according to an embodiment of the present invention.

FIG. 20 is a ladder diagram showing operation for signaling a broadcast service property from a broadcast receiving device to a companion device according to an embodiment of the present invention.

FIG. 21 is a view showing the data format of a broadcast service property signaled from a broadcast receiving device to a companion device according to an embodiment of the present invention.

FIG. 22 is a view showing a variables indicating that the state of a broadcast service property signaled from a broadcast receiving device to a companion device, an action for the broadcast service property and an action argument according to an embodiment of the present invention.

FIG. 25 is a view showing a variable indicating the state of a broadcast service property signaled from a broadcast receiving device to a companion device according to another embodiment of the present invention.

FIG. 30 is a view showing the format of a CAP message according to an embodiment of the present invention.

FIG. 31 is a view showing a service type, a service ID, a variable indicating an emergency alert state, an emergency alert action and an action argument of an emergency alert service signaled by a broadcast receiving device according to an embodiment of the present invention.

FIG. 33 is a view showing information included in an emergency alert notification message of a broadcast receiving device according to an embodiment of the present invention.

FIG. 34 is a view showing a variable indicating the state of an emergency alert signaled by a broadcast reception device, an emergency alert action and an action argument according to another embodiment of the present invention.

FIG. 36 is a view showing a variable indicating the state of an emergency alert signaled by a broadcast receiving device, an emergency alert action and an action argument according to another embodiment of the present invention.

FIG. 38 is a view showing a variable indicating the state of an emergency alert signaled by a broadcast receiving device according to another embodiment of the present invention.

FIG. 39 is a view showing an action and action argument of an emergency alert signaled by a broadcast receiving device according to another embodiment of the present invention.

FIG. 42 is a view showing NRT data signaling information for a companion device according to an embodiment of the present invention.

FIG. 57 is a diagram showing the configuration of a service signaling message according to an embodiment of the present invention.

FIG. 58 is a ladder diagram showing operation for signaling an emergency alert from a broadcast reception device to a companion device according to an embodiment of the present invention.

FIG. 59 is a diagram showing a header message format for delivery of an emergency alert multicast message according to an embodiment of the present invention.

FIG. 60 is a diagram showing a body message format for delivery of an emergency alert multicast message according to an embodiment of the present invention.

FIG. 61 is a diagram showing a body message format for delivery of an emergency alert multicast message according to an embodiment of the present invention.

FIG. 62 is a flowchart illustrating of a broadcast reception device according to an embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The term "signaling" in the present invention may indicate that service information (SI) that is transmitted and received from a broadcast system, an Internet system, and/or a broadcast/Internet convergence system. The service information (SI) may include broadcast service information (e.g., ATSC-SI and/or DVB-SI) received from the existing broadcast systems.

The term "broadcast signal" may conceptually include not only signals and/or data received from a terrestrial broadcast, a cable broadcast, a satellite broadcast, and/or a mobile broadcast, but also signals and/or data received from bidirectional broadcast systems such as an Internet broadcast, a broadband broadcast, a communication broadcast, a data broadcast, and/or VOD (Video On Demand).

The term "PLP" may indicate a predetermined unit for transmitting data contained in a physical layer. Therefore, the term "PLP" may also be replaced with the terms 'data unit' or 'data pipe' as necessary.

A hybrid broadcast service configured to interwork with the broadcast network and/or the Internet network may be used as a representative application to be used in a digital television (DTV) service. The hybrid broadcast service transmits, in real time, enhancement data related to broadcast A/V (Audio/Video) contents transmitted through the terrestrial broadcast network over the Internet, or transmits, in real time, some parts of the broadcast A/V contents over the Internet, such that users can experience a variety of contents.

Figure 1:
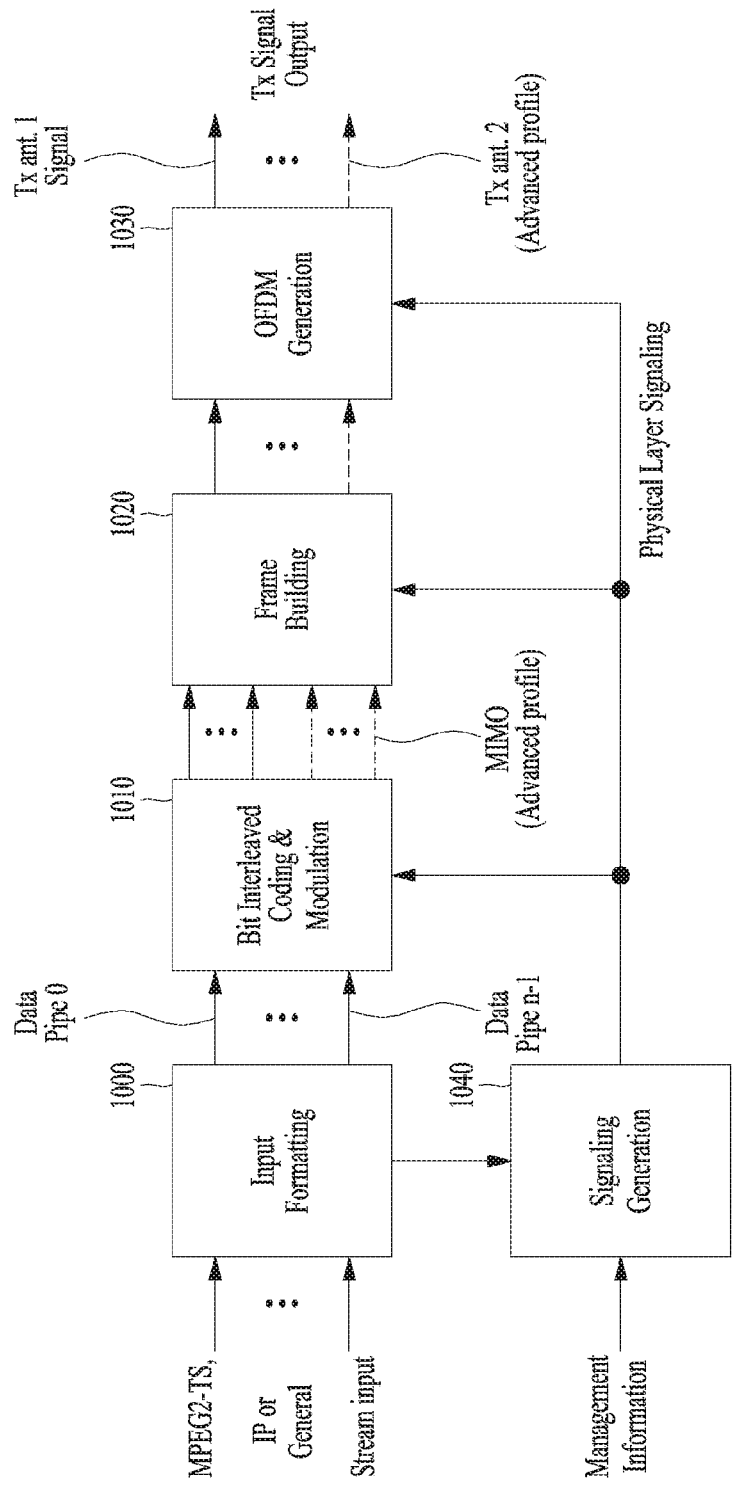
FIG. 1 illustrates a structure of an apparatus for transmitting broadcast signals for future broadcast services according to an embodiment of the present invention.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
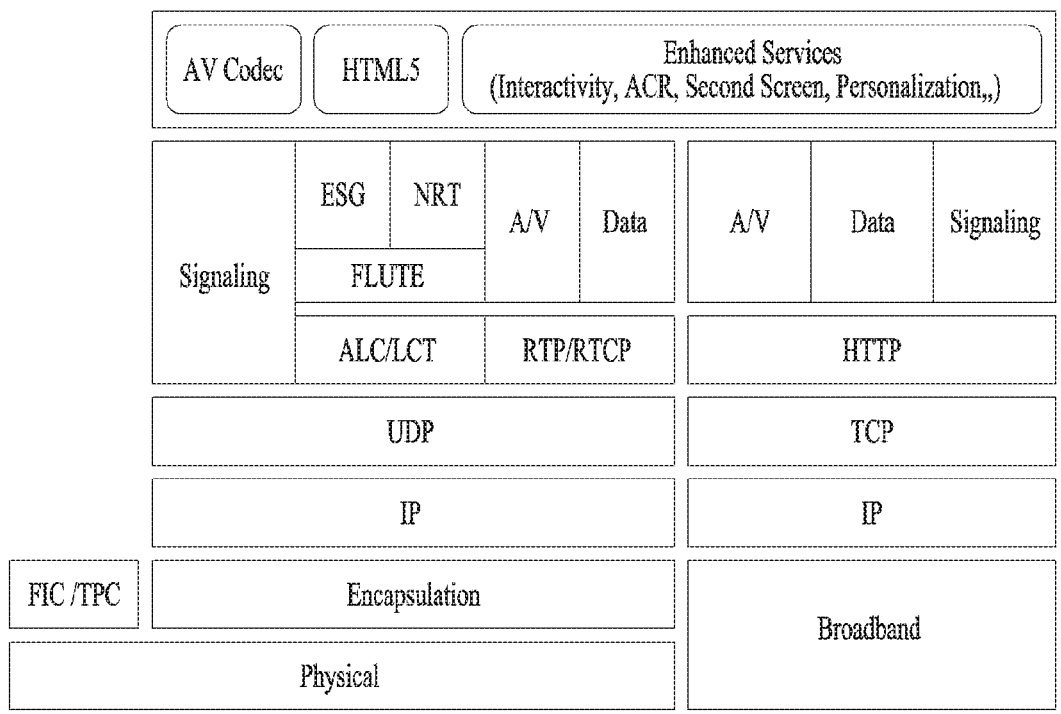
FIG. 2 is a view of a protocol stack for supporting a broadcast service according to an embodiment of the present invention.

FIG. 2 is a view of a protocol stack for supporting a broadcast service according to an embodiment of the present invention.

The broadcast service may provide adjunct services, for example, audio/video (A/V) data and HTML5 application, interactive service, ACR service, second screen service, and personalization service.

Such a broadcast service may be transmitted through a physical layer (i.e., broadcast signal) such as terrestrial wave and a cable satellite. Additionally, a broadcast service according to an embodiment of the present invention may be transmitted through an internet communication network (e.g., broadband).

When the broadcast service is transmitted through a physical layer, i.e., a broadcast signal such as terrestrial wave and a cable satellite, a broadcast reception device may extract an encapsulated MPEG-2 Transport Stream (TS) and an encapsulated IP datagram by demodulating the broadcast signal. The broadcast reception device may extract a user datagram protocol (UDP) datagram from the IP datagram. At this point, the signaling information may be in XML format. The broadcast reception device may extract signaling information from the UDP datagram. Additionally, the broadcast reception device may extract an Asynchronous Layered Coding/Layered Coding Transport (ALC/LCT) packet from the UDP datagram. The broadcast reception device may extract a File Delivery over Unidirectional Transport (FLUTE) packet from the ALC/LCT packet. At this point, the FLUTE packet may include Non-Real Time (NRT) data and Electronic Service Guide (ESG) data. Additionally, the broadcast reception device may extract a Real-time Transport Protocol (RTCP) packet and an RTP Control Protocol (RTCP) packet from the UDP datagram. The broadcast reception device may extract A/V data and enhanced data from the RTP/RTCP packet. At this point, at least one of NRT data, A/V data, and enhanced data may be in ISO Base Media File Format (ISO BMFF). Additionally, the broadcast reception device may extract signaling information such as NRT data, A/V data, and PSI/PSIP from an MPEG-2 TS packet or IP datagram.

When the broadcast service is transmitted through an internet communication network (e.g., broadband), the broadcast reception device may receive an IP packet from the internet communication network. The broadcast reception device may extract a TCP packet from the IP packet. The broadcast reception device may extract an HTTP packet from the TCP packet. The broadcast reception device may extract A/V data, enhanced data, and signaling information from the HTTP packet. At this point, at least one of A/V and enhanced data may be in ISO BMFF format. Additionally, the signaling information may in XML format.

Figure 3:
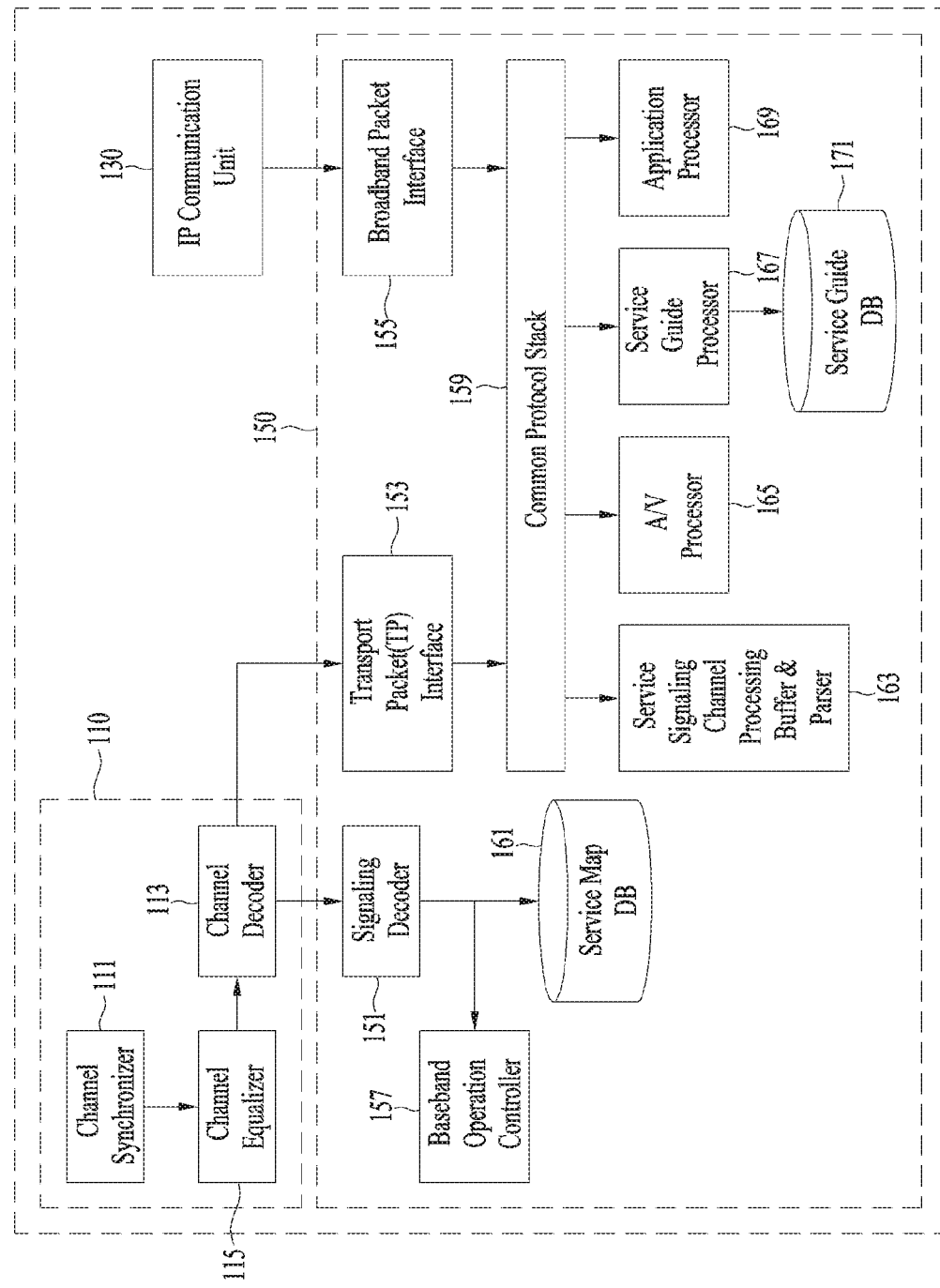
FIG. 3 is a view illustrating a configuration of a broadcast reception device according to an embodiment of the present invention.

FIG. 3 is a view illustrating a configuration of a broadcast reception device according to an embodiment of the present invention.

The broadcast reception device 100 of FIG. 3 includes a broadcast receiving unit 110, an internet protocol (IP) communication unit 130, and a control unit 150.

The broadcast receiving unit 110 includes a channel synchronizer 111, a channel equalizer 113, and a channel decoder 115.

The channel synchronizer 111 synchronizes a symbol frequency with a timing in order for decoding in a baseband where a broadcast signal is received.

The channel equalizer 113 corrects the distortion of a synchronized broadcast signal. In more detail, the channel equalizer 113 corrects the distortion of a synchronized signal due to multipath and Doppler effects.

The channel decoder 115 decodes a distortion corrected broadcast signal. In more detail, the channel decoder 115 extracts a transmission frame from the distortion corrected broadcast signal. At this point, the channel decoder 115 may perform forward error correction (FEC).

The IP communication unit 130 receives and transmits data through internet network. The control unit 150 includes a signaling decoder 151, a transport packet interface 153, a broadband packet interface 155, a baseband operation control unit 157, a common protocol stack 159, a service map database 161, a service signaling channel processing buffer and parser 163, an A/V processor 165, a broadcast service guide processor 167, an application processor 169, and a service guide database 171.

The signaling decoder 151 decodes signaling information of a broadcast signal. The transport packet interface 153 extracts a transport packet from a broadcast signal. At this point, the transport packet interface 153 may extract data such as signaling information or IP datagram from the extracted transport packet.

The broadcast packet interface 155 extracts an IP packet from data received from internet network. At this point, the broadcast packet interface 155 may extract signaling data or IP datagram from the IP packet.

The baseband operation control unit 157 controls an operation relating to receiving broadcast information from a baseband. The common protocol stack 159 extracts audio or video from a transport packet. The A/V processor 547 processes audio or video.

The service signaling channel processing buffer and parser 163 parses and buffers signaling information that signals broadcast service. In more detail, the service signaling channel processing buffer and parser 163 parses and buffers signaling information that signals broadcast service from the IP datagram.

The service map database 165 stores a broadcast service list including information on broadcast services. The service guide processor 167 processes terrestrial broadcast service guide data guiding programs of terrestrial broadcast service. The application processor 169 extracts and processes application related information from a broadcast signal. The serviced guide database 171 stores program information of a broadcast service.

Figure 4:
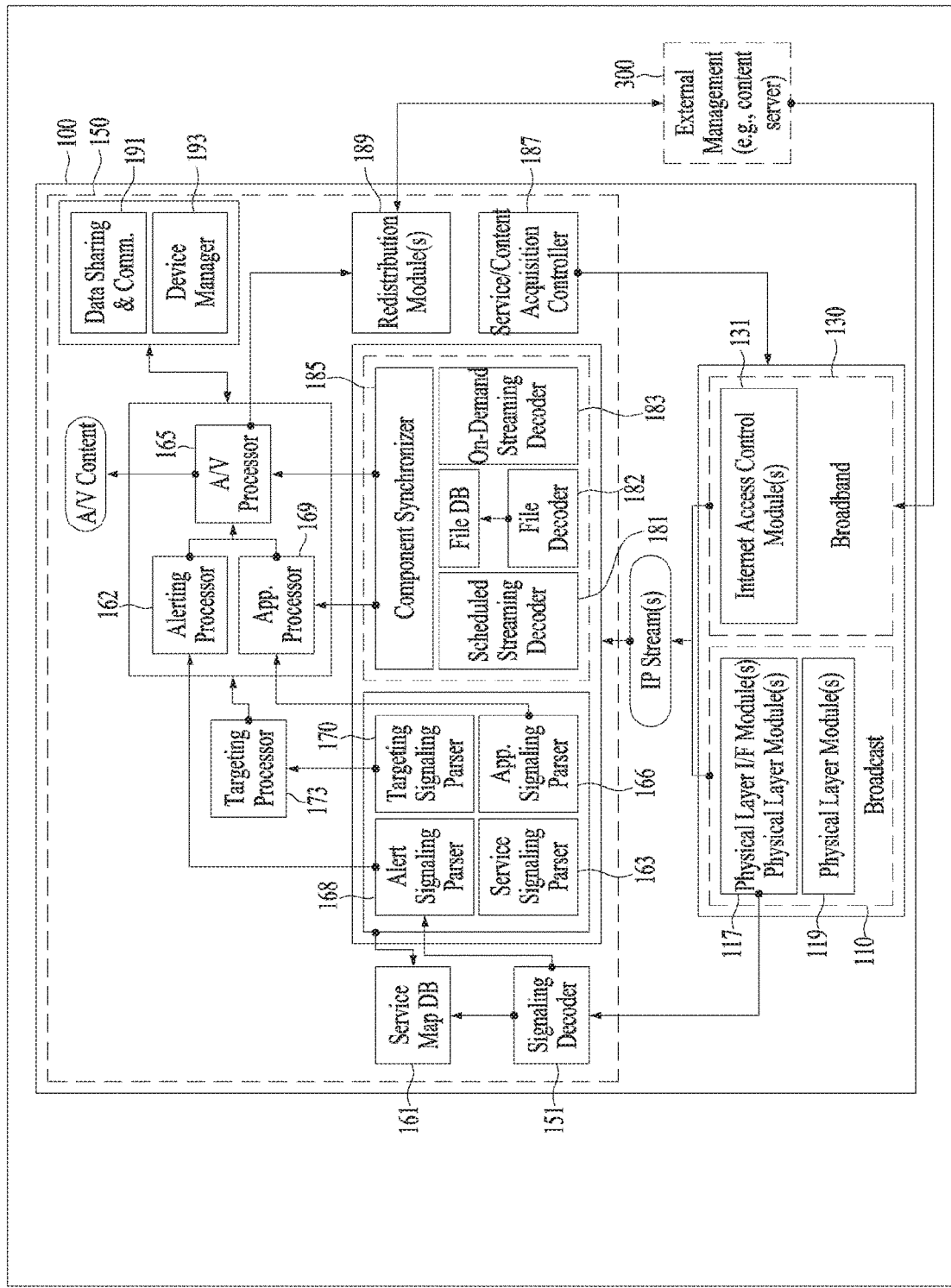
FIG. 4 is a view illustrating a configuration of a broadcast reception device according to another embodiment of the present invention.

FIG. 4 is a view illustrating a configuration of a broadcast reception device according to another embodiment of the present invention.

In an embodiment of FIG. 4, the broadcast reception device 100 includes a broadcast receiving unit 110, an internet protocol (IP) communication unit 130, and a control unit 150.

The broadcast receiving unit 110 may include one or more processors, one or more circuits, and one or more hardware modules, which perform each of a plurality of functions that the broadcast receiving unit 110 performs. In more detail, the broadcast receiving unit 110 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast receiving unit 110 may include a physical layer module 119 and a physical layer IP frame module 117. The physical layer module 119 receives and processes a broadcast related signal through a broadcast channel of a broadcast network. The physical layer IP frame module 117 converts a data packet such as an IP datagram obtained from the physical layer module 119 into a specific frame. For example, the physical layer module 119 may convert an IP datagram into an RS Frame or GSE.

The IP communication unit 130 may include one or more processors, one or more circuits, and one or more hardware modules, which perform each of a plurality of functions that the IP communication unit 130 performs. In more detail, the IP communication unit 130 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130 may include an internet access control module 131. The internet access control module 131 may control an operation of the broadcast reception device 100 to obtain at least one of service, content, and signaling data through an internet communication network (for example, broad band).

The control unit 150 may include one or more processors, one or more circuits, and one or more hardware modules, which perform each of a plurality of functions that the control unit 150 performs. In more detail, the control unit 150 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and a data sharing unit 191.

The service/content acquisition control unit 187 controls operations of a receiver to obtain services or contents through a broadcast network or an internet communication network and signaling data relating to services or contents.

The signaling decoder 151 decodes signaling information. The service signaling parser 163 parses service signaling information. The application signaling parser 166 extracts and parses service related signaling information. At this point, the service related signaling information may be service scan related signaling information. Additionally, the service related signaling information may be signaling information relating to contents provided through a service. The alert signaling parser 168 extracts and parses alerting related signaling information. The target signaling parser 170 extracts and parses information for personalizing services or contents or information for signaling targeting information. The targeting processor 173 processes information for personalizing services or contents.

The alerting processor 162 processes alerting related signaling information. The application processor 169 controls application related information and the execution of an application. In more detail, the application processor 169 processes a state of a downloaded application and a display parameter.

The A/V processor 161 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a content decoded by at least one of the scheduled streaming decoder 181, the file decoder 182, and the user request streaming decoder 183.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast reception device 100.

The data sharing unit 191 performs a data transmission operation between the broadcast reception device 100 and an external device and processes exchange related information. In more detail, the data sharing unit 191 may transmit AV data or signaling information to an external device. Additionally, the data sharing unit 191 may receive AV data or signaling information from an external device.

Figure 5:
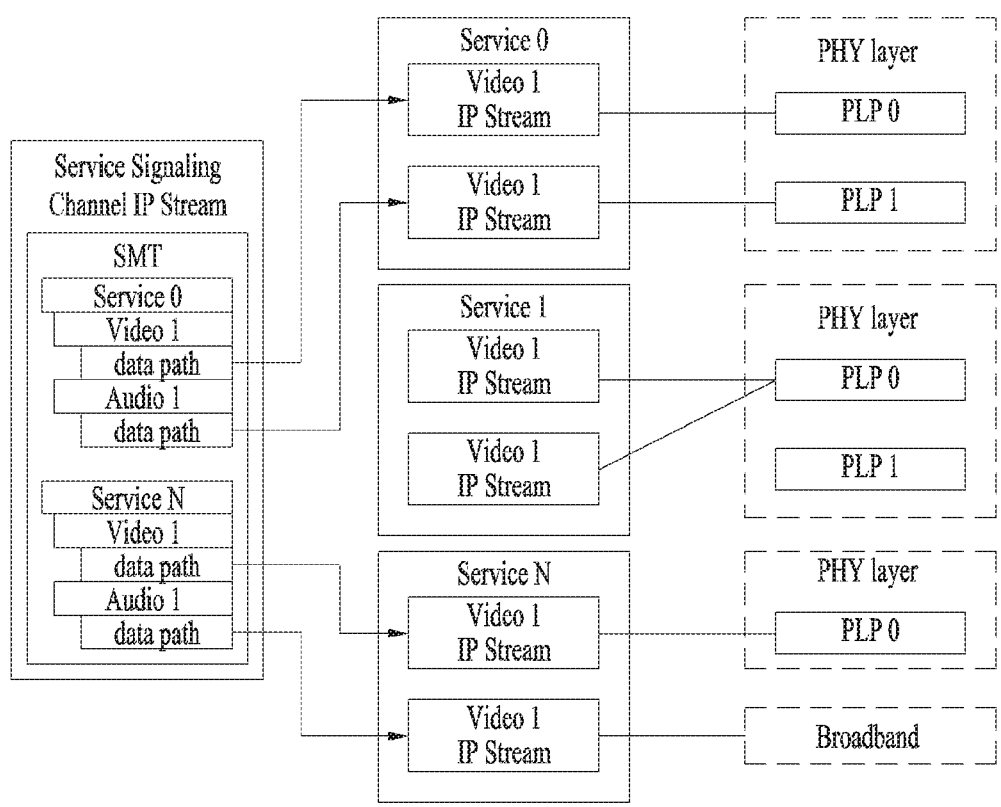
FIG. 5 is a view that a broadcast service signaling table and broadcast service transmission path signaling information signal broadcast service and a broadcast service transmission path.

FIG. 5 is a view that a broadcast service signaling table and broadcast service transmission path signaling information signal broadcast service and a broadcast service transmission path.

The broadcast service signaling table may signal broadcast service information. In more detail, the broadcast service signaling table may signal a media component that broadcast service includes. Additionally, the broadcast service signaling table may signal broadcast service and a transmission path of a media component that the broadcast service includes. For this, the broadcast service signaling table may include broadcast service transmission path signaling information. In the embodiment of FIG. 6, the broadcast service signaling table includes information on a plurality of broadcast services. At this point, the broadcast service signaling table includes media component signaling information signaling a plurality of media components respectively included in a plurality of broadcast services. Especially, the broadcast service signaling table includes broadcast service transmission path signaling information signaling transmission paths of a plurality of media components. For example, it is shown that the broadcast reception device 100 may transmit Video 1 in Service 0 through PLP 0 according to the signaling table. Additionally, it is shown that the broadcast reception device 100 may transmit Audio 1 in Service N through internet network according to the signaling table. At this point, the PLP is a series of logical data delivery paths identifiable on a physical layer. The PLP may be also referred to as a data pipe.

FIG. 6 is a view illustrating a broadcast service signaling table according to an embodiment of the present invention.

The broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

In more detail, as shown in the embodiment of FIG. 6, the broadcast service signaling table may include at least one of a table_id field, section_syntax_indicator field, a private_indicator field, a section_length field, a table_id_extension field, a version_number field, a current_next_indicator field, a section_number field, a last_section_numberr field, a num_services field, a service_id field, a service_status field, an SP_indicator field, a short_service_name_length field, a short_service_name field, a channel_number field, a service_category field, a num_components field, an essential_component_indicator field, a num_component_level_descriptor field, a component_level_descriptor field, a num_service_level_descriptors field, and a service_level_descriptor field.

The table_id field represents an identifier of a broadcast service signaling information table. At this point, a value of the table_id field may be one of reserved id values defined in ATSC A/65. According to a specific embodiment of the present invention, the table_id field may be an 8-bit field.

The section_syntax_indicator field represents whether the broadcast service signaling information table is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying a broadcast service signaling information table in combination with the table_id field. Especially, the table_id field may include an SMT_protocol_version field representing a protocol version of a service signaling information table. According to a specific embodiment of the present invention, the SMT_protocol_version field may be an 8-bit field.

The version_number field represents a version of a service signaling table. The broadcast reception device 100 may determine the availability of a service signaling information table on the basis of a value of the vserion_number field. In more detail, when a value of the version_number field is identical to a version of a previously received service signaling table, the information of the service signaling table may not be used. According to a specific embodiment of the present invention, the version_number field may be a 5-bit field.

The current_next_indicator field represents whether information of a broadcast service signaling table is currently available. In more detail, when a value of the current_next_indicator field is 1, it may represent that the information of the broadcast service signaling table is available. Moreover, when a value of the current_next_indicator field is 1, it may represent that the information of the broadcast service signaling table is available next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a broadcast service signaling table is large, it may be divided into a plurality of sections and then transmitted. At this point, the broadcast reception device 100 determines whether all sections necessary for a broadcast service signaling table are received on the basis of the section_number field and the last_section_number field. According to a specific embodiment of the present invention, the last_section_number field may be an 8-bit field.

The service_id field represents a service identifier for identifying a broadcast service. According to a specific embodiment of the present invention, the service_id field may be a 16-bit field.

The service_status field represents the current state of a broadcast service. In more detail, it may represent whether the broadcast service is available currently. According to a specific embodiment of the present invention, when a value of the service_status field is 1, it may represent that the broadcast service is available currently. According to a specific embodiment of the present invention, the broadcast reception device 100 may determine whether to display a corresponding broadcast service in a broadcast service list and a broadcast service guide on the basis of a value of the service_status field. For example, when a corresponding broadcast service is unavailable, the broadcast reception device 100 may not display the corresponding broadcast service in a broadcast service list and a broadcast service guide. According to another specific embodiment of the present invention, the broadcast reception device 100 may limit an access to a corresponding broadcast service on the basis of a value of the service_status field. For example, when a corresponding broadcast service is unavailable, the broadcast reception device 100 may limit an access to a corresponding broadcast service through a channel up/down key. According to a specific embodiment of the present invention, the service_status field may be a 2-bit field.

The SP_indicator field may represent whether service protection is applied to at least one component in a corresponding broadcast service. For example, when a value of SP_indicator is 1, it may represent that service protection is applied to at least one component in a corresponding broadcast service. According to a specific embodiment of the present invention, the SP_indicator field may be a 1-bit field.

The short_service_name_length field represents the size of the short_service_name field.

The short_service_name field represents the name of a broadcast service. In more detail, the short_service_name field may be displayed by summarizing the name of a broadcast service.

The channel_number field displays a virtual channel number of a corresponding broadcast service.

The service_category field represents a category of a broadcast service. In more detail, the service_category field may represent at least one of TV service, radio service, broadcast service guide, RI service, and emergency alerting. For example, in the case that a value of the service_category field is 0x01, it represents TV service. In the case that a value of the service_category field is 0x02, it represents radio service. In the case that a value of the service_category field is 0x03, it represents RI service. In the case that a value of the service_category field is 0x08, it represents service guide. In the case that a value of the service_category field is 0x09, it represents emergency alerting. According to a specific embodiment of the present invention, the service_category field may be a 6-bit field.

The num_component field represents the number of media components that a corresponding broadcast service includes. According to a specific embodiment of the present invention, the num_component field may be a 5-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_level_descriptor field represents the number of component_level_descrptor fields. According to a specific embodiment of the present invention, the num_component_level_descriptor field may be a 4-bit field.

The component_level_descriptor field includes an additional property for a corresponding component.

The num_service_level_descriptors field represents the number of service_level_descriptor fields. According to a specific embodiment of the present invention, the num_service_level_descriptors field may be a 4-bit field.

The service_level_descriptor field includes an additional property for a corresponding service.

The service signaling table may further include information on ensemble. When the same Forward Error Correction (FEC) is applied to at least one service and transmitted, the ensemble represents a collection of the at least one service.

FIG. 7 is a view of a broadcast service signaling table according to another embodiment of the present invention.

In more detail, as shown in the embodiment of FIG. 7, the broadcast service signaling table may further include a num_ensemble_level_descriptors field and an ensemble_level_descriptor field.

The num_ensemble_level_descriptors field represents the number of ensemble_level_descriptor fields. According to a specific embodiment of the present invention, the num_ensemble_level_descriptors field may be a 4-bit field.

The ensemble_level_descriptor field includes an additional property for a corresponding ensemble.

Additionally, the service signaling table may further include stream identifier information for identifying a media component. FIG. 8 is a view illustrating broadcast service transmission path signaling information according to an embodiment of the present invention.

The broadcast service transmission path signaling information may include information representing the type of a network transmitting a broadcast service and specific transmission information according to a broadcast transmission type. The type of a network transmitting a broadcast service may be one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of a different broadcaster, a network transmitting a broadcast service through MPEG-2 TS of different broadcasters, a network transmitting a broadcast service through a packet based stream of a different broadcaster, a network transmitting a broadcast service through a packet based stream transmitted from an IP based broadcast network, and a network for obtaining a broadcast service through URL.

According to a specific embodiment of the present invention, the broadcast service transmission path signaling information may include a descriptor_tag field, a description_length field, a delivery_network_type field, and a data_path field.

The delivery_network_type field represents the type of a transmission network transmitting a broadcast service. According to a specific embodiment of the present invention, a value of the delivery_network_type field may represent one of a network transmitting a broadcast service through an IP stream that the same broadcaster transmits, a network transmitting a broadcast service through an IP stream that a different broadcaster transmits, a network transmitting a broadcast service through a FLUTE session of the same broadcaster, a network transmitting a broadcast service through a FLUTE session of a different broadcaster, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. The data_path field includes specific transmission information according to the type of a transmission network transmitting a broadcast service. This data_path will be described in more detail with reference to FIGS. 9 to 10.

FIG. 9 is a view when broadcast service transmission path signaling information signals the transmission of a broadcast service through IP stream according to an embodiment of the present invention.

When a network transmitting a broadcast service is a network transmitting a broadcast service through an IP stream that the same broadcaster transmits, broadcast service transmission path signaling information may include at least one of information representing an IP version, information on whether it contains a source IP address, an source IP address, information on whether it contains a destination IP address, a destination IP address, information representing the number of UDP ports of an IP datagram flow transmitting a broadcast service, and information an UDP port number information.

According to a specific embodiment of the present invention, as shown in the embodiment of FIG. 9, the broadcast service transmission path signaling information may include at leas one among an IP_versioni_flag field, a source_IP_address_flag field, a destination_IP_address_flag field, a source_IP_address field, a port_num_count field, and a destination_UDP_port_number field.

The IP_versioni_flag field represents an IP address format of an IP datagram including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP_versioni_flag field may be a 1-bit field.

The source_IP_address_flag field represents whether an IP datagram including a broadcast service includes a source IP address. In more detail, when a value of the source_IP_address_flag field is 1, it represents that an IP datagram including a broadcast service includes a source IP address and when a value of the source_IP_address_flag field is 0, it represents that an IP datagram including a broadcast service does not include a source IP address. According to a specific embodiment of the present invention, the source_IP_address_flag field may be a 1-bit field.

The destination_IP_address_flag field represents that an IP datagram including a broadcast service includes a destination IP address. In more detail, when a value of the destination_IP_address_flag field is 1, it represents that an IP datagram including a broadcast service includes a destination IP address and when a value of the destination_I-

P_address_flag field is 0, it represents that an IP datagram including a broadcast service does not include a destination IP address. According to a specific embodiment of the present invention, the destination_IP_address_flag field may be a 1-bit field.

The source_IP_address field represents the source IP address of an IP datagram including a broadcast service. According to a specific embodiment of the present invention, the source_IP_address field may be a 32 or 128-bit field according to the IP version.

The destination_IP_address field represents the destination IP address of an IP datagram including a broadcast service. According to a specific embodiment of the present invention, the destination_IP_address field may be a 32 or 128-bit field according to the IP version.

The port_num_count field represents the number of ports of an IP datagram flow including a broadcast. According to a specific embodiment of the present invention, the port_num_count field may be an 8-bit field.

The destination_UDP_port_number field represents the UDP port number of an IP datagram including a broadcast service. According to a specific embodiment of the present invention, the destination_UDP_port_number field may be a 16-bit field.

Figures 10, 11:
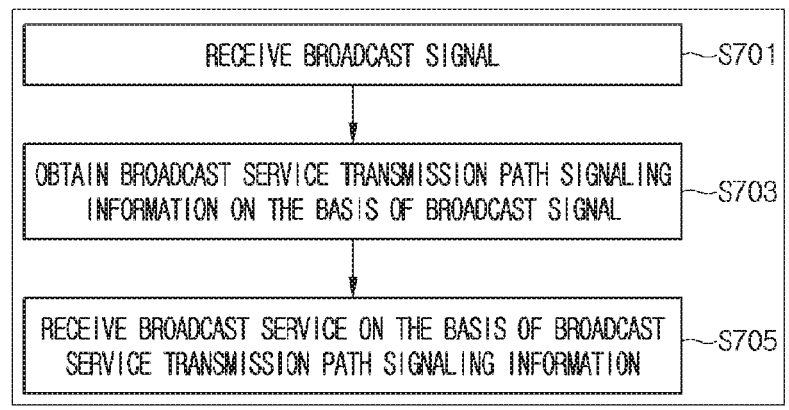
FIG. 10 is a view that broadcast service transmission path signaling information signals the transmission of a broadcast service through a FLUTE session according to an embodiment of the present invention.
FIG. 11 is a view when a broadcast reception device receives a broadcast service on the basis of a broadcast service transmission path according to an embodiment of the present invention.

FIG. 10 is a view when broadcast service transmission path signaling information signals the transmission of a broadcast service through a FLUTE session according to an embodiment of the present invention.

When a network transmitting a broadcast service is a network transmitting a broadcast service through a FLUTE session that the same broadcaster transmits, broadcast service transmission path signaling information may include at least one of information representing an IP version, information on whether it contains an IP address, a source IP address, a destination IP address, UDP port number information, and a Transport Session Identifier for identifying a FLUTE session transmitting a FLUTE packet including a broadcast service.

According to a specific embodiment of the present invention, as shown in the embodiment of FIG. 10, the broadcast service transmission path signaling information may include at leas one among an IP_versioni_flag field, a source_IP_address_flag field, a source_IP_address field, a destination_UDP_port_number field, and a flute_tsi field.

The IP_versioni_flag field represents an IP address format of an IP datagram transmitting a FLUTE packet including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP_versioni_flag field may be a 1-bit field.

The source_IP_address_flag field represents whether an IP datagram transmitting a FLUTE packet including a broadcast service includes a source IP address. In more detail, when a value of the source_IP_address_flag field is 1, it represents that an IP datagram including a broadcast service includes a source IP address and when a value of the source_IP_address_flag field is 0, it represents that an IP datagram including a broadcast service does not include a source IP address. According to a specific embodiment of the present invention, the source_IP_address_flag field may be a 1-bit field.

The source_IP_address field represents the source IP address of an IP datagram transmitting a FLUTE packet including a broadcast service. According to a specific embodiment of the present invention, the source_IP_address field may be a 32 or 128-bit field according to the IP version.

The destination_IP_address field represents the destination IP address of an IP datagram transmitting a FLUTE packet including a broadcast service. According to a specific embodiment of the present invention, the destination_IP_address field may be a 32 or 128-bit field according to the IP version.

The destination_UDP_port_number field represents the UDP port number of an IP datagram transmitting a FLUTE packet including a broadcast service. According to a specific embodiment of the present invention, the destination_UDP_port_number field may be a 16-bit field.

The flute_tsi field represents a Transport Session Identifier for identifying a FLUTE session transmitting a FLUTE packet including a broadcast service.

FIG. 11 is a view when a broadcast transmission device transmits broadcast service transmission path signaling information according to an embodiment of the present invention.

The broadcast reception device 100 receives a broadcast signal through the broadcast receiving unit 110 in operation S701.

The broadcast reception device 100 obtains broadcast service transmission path signaling information through the control unit 150 on the basis of the broadcast signal in operation S703.

The broadcast reception device 100 receives a broadcast service on the basis of the broadcast service transmission path signaling information through the control unit 150 in operation S705. In more detail, the broadcast reception device 100 may receive a media component of a broadcast service on the basis of the broadcast service transmission path signaling information through the control unit 150. The broadcast reception device 100 may receive a broadcast service through at least one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of different broadcasters, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. Especially, according to a specific embodiment of the present invention, the broadcast reception device 100 may receive a plurality of media components of a broadcast service through a plurality of networks. For example, the broadcast reception device 1100 may receive a video component of a broadcast service via a packet based stream through the broadcast receiving unit 1110 and may receive an audio component of a broadcast service via an IP based broadcast network through the IP communication unit 130.

The content component is a component including metadata relating to one kind of media. In more detail, the content component may be one of a video track, an audio track, a closed caption, a video enhanced layer, a webpage, and a bi-directional application.

The continuous component is a component played on a continuous stream.

A broadcast service may include a program which is a temporal segment having a scheduled start time and playback length. More specifically, a radio service includes a radio program or an audio program. In addition, a TV service may include a TV program. In addition, a user request content service may include a user request program. In addition, a stand-alone NRT data service may include a data program.

Such a program may be divided according to broadcast service time. In addition, a broadcast time of a radio service is equal to a sum of durations of radio programs. A broadcast time of a TV service is equal to a sum of durations of TV programs. The duration of a user request content service does not indicate a playback time of specific content but indicates a time when a user request content service is possible. Accordingly, the playback time of individual content depends on the user. While a content item is provided, a start time and a length are restricted according to program. Accordingly, a content item provided through the user request content service may be included in a catalog. At this time, the catalog may be an application for providing a user interface to provide a service.

Operations of a broadcast transmission device and the broadcast reception device 100 transmitting/receiving the properties of a program and a segment will be described with reference to FIGS. 12 and 13.

Figure 12:
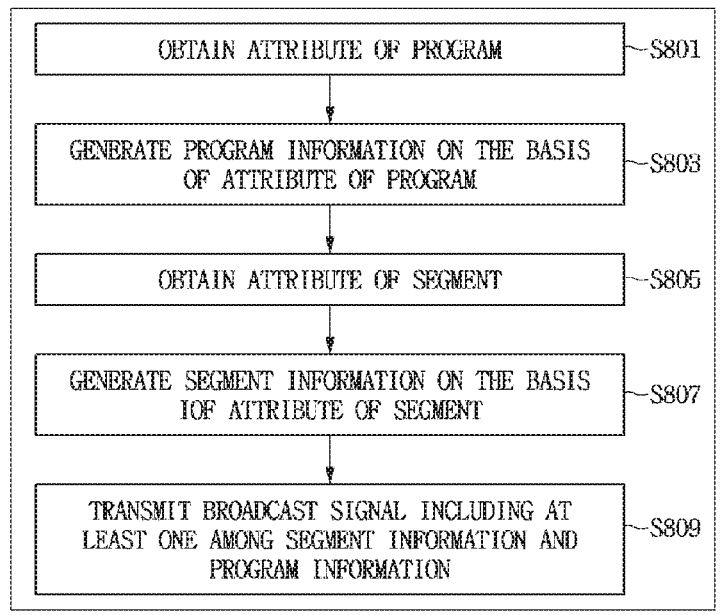
FIG. 12 is a view when a broadcast transmission device transmits broadcast signal including at least one of program information and segment information according to an embodiment of the present invention.

FIG. 12 is a view showing a broadcast transmission device transmitting a broadcast signal including at least one of program information and segment information according to an embodiment of the present invention.

The broadcast transmission device obtains the property of a program that a broadcast service includes through a control unit (S801). As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast transmission device generates program information signaling a program on the basis of the property of a program through a control unit (S803). The program information may include at least one of the above-described program information and program information block.

The broadcast transmission device obtains the property of a segment that a program includes through a control unit (S805). As described above, the property of a segment may include at least one as one property among a unique identifier for identifying a segment, a list of media components played during a time interval of a corresponding segment, a start time and the duration of a segment, a segment type, and a targeting/personalization property, and a contents advisory rating.

The broadcast transmission device generates segment information on the basis of the property of a program through a control unit (S807). The segment information may include at least one of the above-mentioned segment information, segment information block, and segment targeting set information.

The broadcast transmission device transmits a broadcast signal including at least one of segment information and program information through a transmitting unit (S809).

Figure 13:
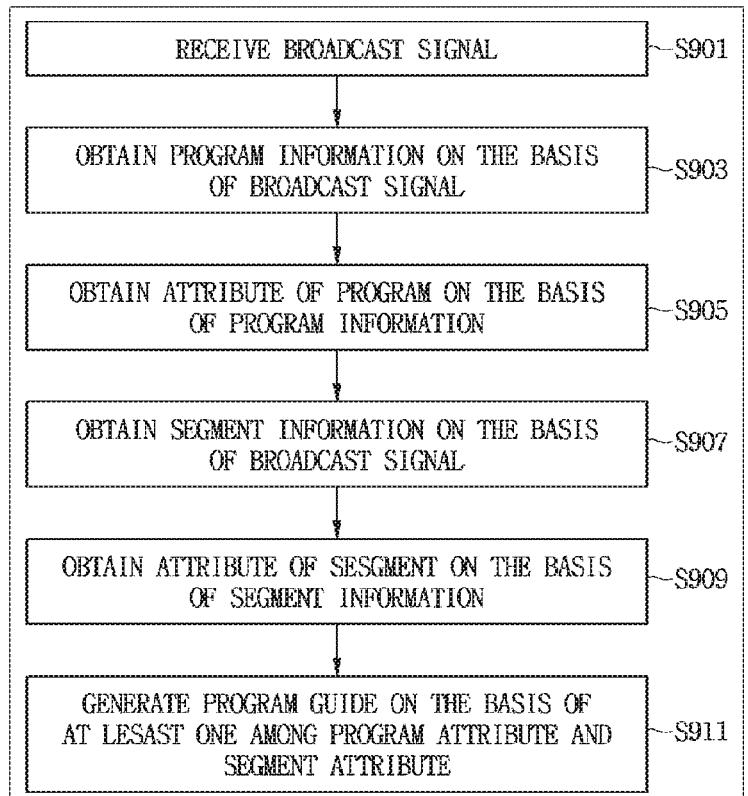
FIG. 13 is a view when a broadcast reception device receives broadcast signal including at least one of program information and segment information according to an embodiment of the present invention.

FIG. 13 is a view showing a broadcast reception device receiving broadcast signal including at least one of program information and segment information according to an embodiment of the present invention.

The broadcast reception device 100 receives a broadcast signal through the broadcast receiving unit 110 (S901).

The broadcast reception device 100 obtains program information on the basis of a broadcast signal through the control unit 150 (S903). In more detail, the broadcast reception device 100 may obtain broadcast information from the broadcast signal. At this point, the program information may include at least one of the above-described program information and program information block.

The broadcast reception device 100 obtains the property of a program on the basis of the program information through the control unit 150 (S905). As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast reception device 100 obtains segment information on the basis of a broadcast signal through the control unit 150 (S907). In more detail, the broadcast reception device 100 may obtain segment information from the broadcast signal. The segment information may include at least one of the above-mentioned segment information, segment information block, and segment targeting set information.

The broadcast reception device 100 obtains the property of a segment on the basis of the segment information through the control unit 150 (S909). The segment information may include at least one of the above-mentioned segment information, segment information block, and segment targeting set information.

The broadcast reception device 100 generates a service guide for displaying the property of a program on the basis of at least one of the program property and the segment property (S911). According to an embodiment of the present invention, a service guide may also display the property of a segment that a program includes. In more detail, a service guide may display the property of a show segment included in a program together. For example, a service guide may display the start time and length of a show segment included in a program and another program information including the same show segment in addition to a program property.

As described above, a broadcast service according to an embodiment of the present invention divides the property of a media component and again divides a program representing a time span of the broadcast service into segments, so as to effectively signal the format of the broadcast service that become more complex and various. This will be described below in more detail.

A broadcast service according to an embodiment of the present invention may be described as an object model including a kind of class, an inheritance relationship between classes, a containment relationship between classes, and an another association between classes.

Figure 14:
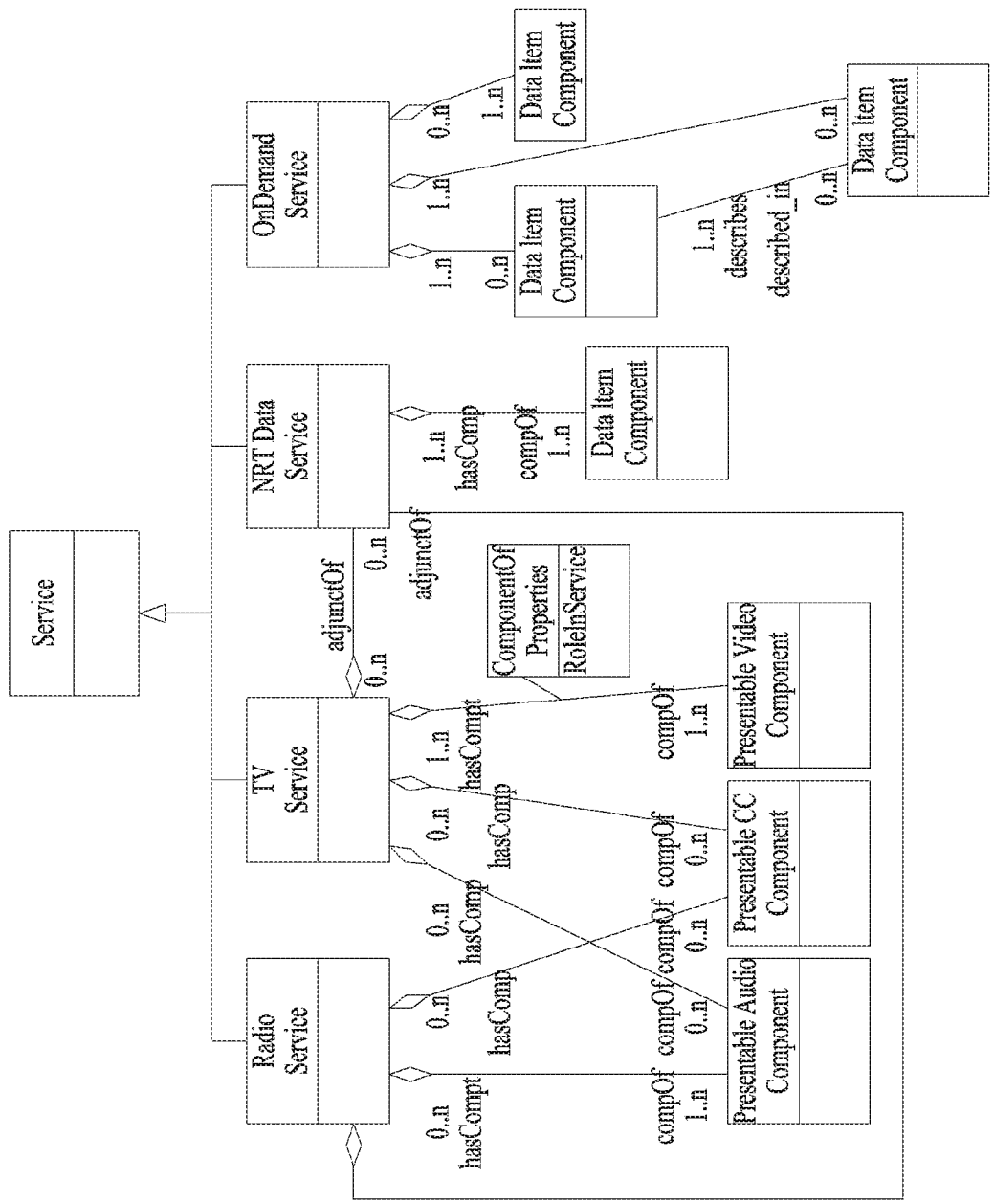
FIG. 14 is a view illustrating an inheritance relationship with a sub-property according to the type of broadcast service according to an embodiment of the present invention.

FIG. 14 is a view illustrating an inheritance relationship with sub-attribute according to the type of broadcast service according to an embodiment of the present invention.

FIG. 14 is a view illustrating an adjunct service relationship between the above-mentioned different types of services, different types of components included in each service, and each service. The radio service may include one or more presentable audio components. Additionally, the radio component may include one or more closed caption components. Additionally, the radio component may include one or more enhanced NRT data services. The TV service may include one or more presentable video components. Additionally, the TV service may include one or more presentable audio components. Additionally, the TV service may include one or more presentable closed caption components. Additionally, the TV service may include one or more enhanced NRT data services. The NRT data service may include one or more presentable data item components. Additionally, the NRT data service may be stand-alone data service. Additionally, the NRT data service may be an adjunct NRT data service of radio service or TV service. Additionally, the NRT data service may be an adjunct NRT data service of radio service or TV service. The OnDemand service may include one or more OnDemand offerings. Additionally, the OnDemand service may include one or more catalogs describing offering. Additionally, the OnDemand service may be a UI application service providing a user interface of a service. At this point, the user interface may be customized by a service provider. Additionally, the user interface may be customized by a user.

Figure 15:
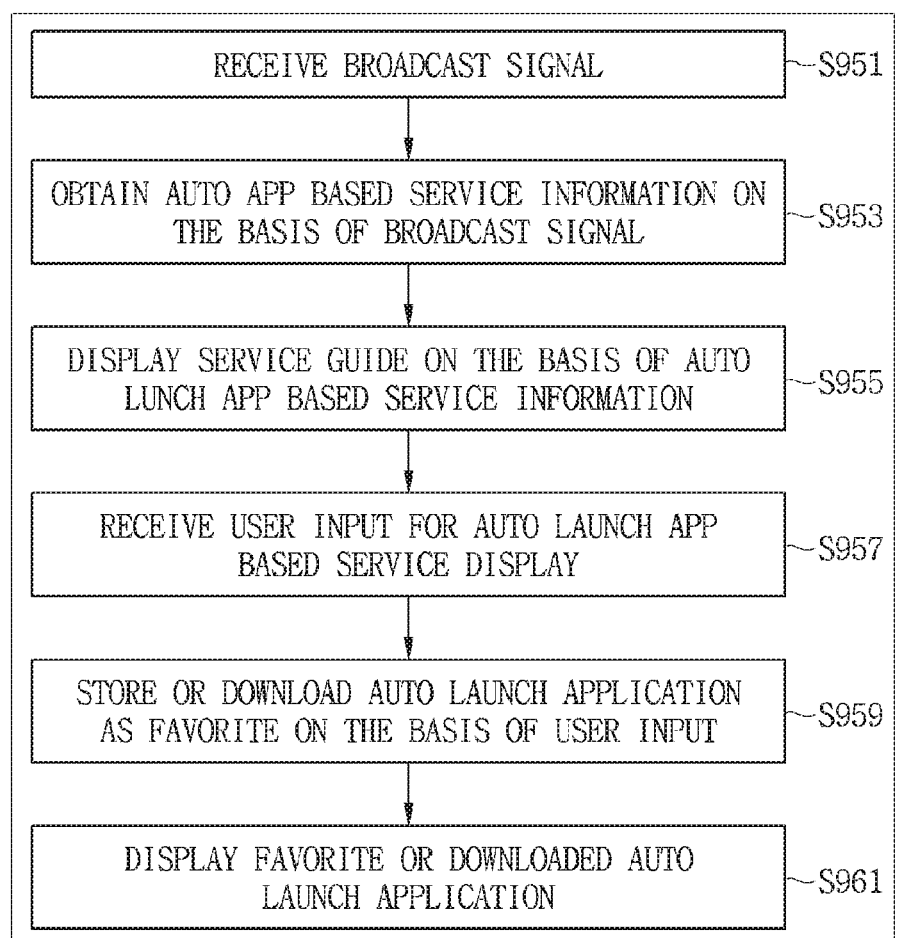
FIG. 15 is a flowchart illustrating operations when a broadcast reception device displays an auto-launch app based service through a broadcast service guide and stores it as a favorite or downloads it.

FIG. 15 is a flowchart illustrating operations when a broadcast reception device displays an auto-launch app based service through a broadcast service guide and stores it as a favorite or downloads it.

The broadcast reception device 100 receives a broadcast signal through the broadcast receiving unit 110 in operation S951.

The broadcast reception device 100 obtains auto-launch app based service information through the control unit 150 on the basis of the broadcast signal in operation S953. In a specific embodiment, the broadcast reception device 100 may obtain the auto-launch app based service information from the broadcast signal. For example, the broadcast reception device 100 may obtain the auto-launch app based service information from the above-described service information or program information.

The broadcast reception device 100 displays a service guide through the control unit 150 on the basis of the auto-launch app based service information in operation S955. In a specific embodiment, the broadcast reception device 100 may display the auto-launch app based service information in addition to the program information. Especially, the broadcast reception device 100 may display both the auto-launch app based service information and the program information relating to auto-launch app based service.

The broadcast reception device 100 receives a user input for auto-launch app based service through the control unit 150 in operation S957. In more detail, the broadcast reception device 100 may receive a user input for selecting auto-launch app based service. In more detail, the broadcast reception device 100 may receive a user input for storing an auto-launch application as a favorite. In another specific embodiment, the broadcast reception device 100 may receive a user input for downloading an auto-launch application.

The broadcast reception device 100 stores an auto-launch application as a favorite or downloads it through the control unit 150 on the basis of a user input in operation S959. In more detail, the broadcast reception device 100 may store an auto-launch application of a selected auto-launch app based service as a favorite or may download it.

The broadcast reception device 100 displays an auto-launch application stored as a favorite or a downloaded auto-launch application through the control unit 150 in operation S961. In more detail, the broadcast reception device 100 may display an auto-launch application stored as a favorite or a downloaded auto-launch application. In a specific embodiment, the broadcast reception device 100 may display an auto-launch application stored as a favorite or a downloaded auto-launch application through an icon. Additionally, the broadcast reception device 100 may receive a user input for an auto-launch application stored as a favorite or a downloaded auto-launch application and may then download or launch an auto-launch application. Through this, the broadcast reception device 100 may allow a broadcast service guide to serve as an application store of a smartphone.

In conventional broadcasting, a sign language screen for hearing-impaired person is directly inserted to a broadcast video. Accordingly, users that have no hearing impairment and thus do not need to see a sign language screen are forced to view the sign language inconveniently. Additionally, the sign language screen is fixed constantly so that this may block a scene that general users want to see intensively. Broadcasters may need to perform an encoding process for inserting a sign language screen into general content in order to transmit the sign language screen. In order to solve this inconvenience, required are a broadcast transmission device and an operating method thereof, and a broadcast reception device and an operating method thereof.

A broadcast transmission device may transmit a sign language screen through an additional video different from a video including a general content. The broadcast reception device 100 may overlay an additional video including a sign language screen on a video not including a general content and a sign language screen. Additionally, the broadcast reception device 100 may receive information representing a location at which a sign language screen is displayed and may display an additional video including a sign language screen on the basis of the information representing the location. Or, the broadcast reception device 100 may display an additional video including a sign language screen on the basis of a user input for a location at which a sign language is to be displayed. Additionally, there are various kinds of sign languages used in many countries in addition to general languages. Accordingly, a broadcast transmission device may transmit a plurality of videos respectively including a plurality of sign language screens for one general content. At this point, the broadcast reception device 100 may display one of a plurality of videos respectively including a plurality of sign language screens. At this point, the broadcast reception device 100 may display one of a plurality of videos respectively including a plurality of sign language screens on the basis of a user input. A method of signaling the transmission of such a sign language screen is required.

In a specific embodiment, a video signaling a sign language screen may be signaled as an additional component. Especially, a sign language screen may be signaled efficiently through the above-mentioned object model.

Especially, a sign language component may include information representing a location at which a sign component is to be displayed. Additionally, a sign language component may include information representing the type of a sign language.

A continuous component transmitting a sign language screen may be referred to as a sign language component. At this point, a sign language component class may include as an attribute at least one of a codec representing encoding codec of a sign language screen, a resolution representing the resolution of a sign language screen, coordinates representing a location at which a sign language screen is displayed, an aspect ratio of a sign language screen representing the aspect ratio of a sign language screen, a scanning method representing a scanning method of an image, a frame rate representing the frame rate of a sign language screen, a still picture mode, other encoding parameters, and the type of a sign language. The resolution may be expressed by pixel units of width×height. The coordinates may be displayed by using a pixel at which a sign language screen is displayed.

For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108. Additionally, the scanning method may be one of an interlaced method and a progressive method. Additionally, other encoding parameters may be determined according to codec. Additionally, the type of a sign language may represent one of American Sign Language (ASL), Panamanian Sign Language (LSP), Mexican Sign Language (LSM), and Korean Sign Language (KSL).

At this point, the presentable video component class may have AssociatedSignLanguage relationship with Presentable SignLanguage Component class as relationship. AssociatedSignLanguage relationship with Presentable SignLanguage Component class may represent that displaying a presentable video component and a presentable sign language component simultaneously is suitable. In more detail, the presentable sign language component may overlay on a presentable video component.

The presentable sign language component class represents a presentable component including a sign language content.

Additionally, the above-mentioned TV service class may include Containment Relationship with Presentable Sign Language Component Class as relationship.

Additionally, the above-mentioned TV program class may include Containment relationship with Presentable Sign Language Component Class as relationship.

Figure 16:
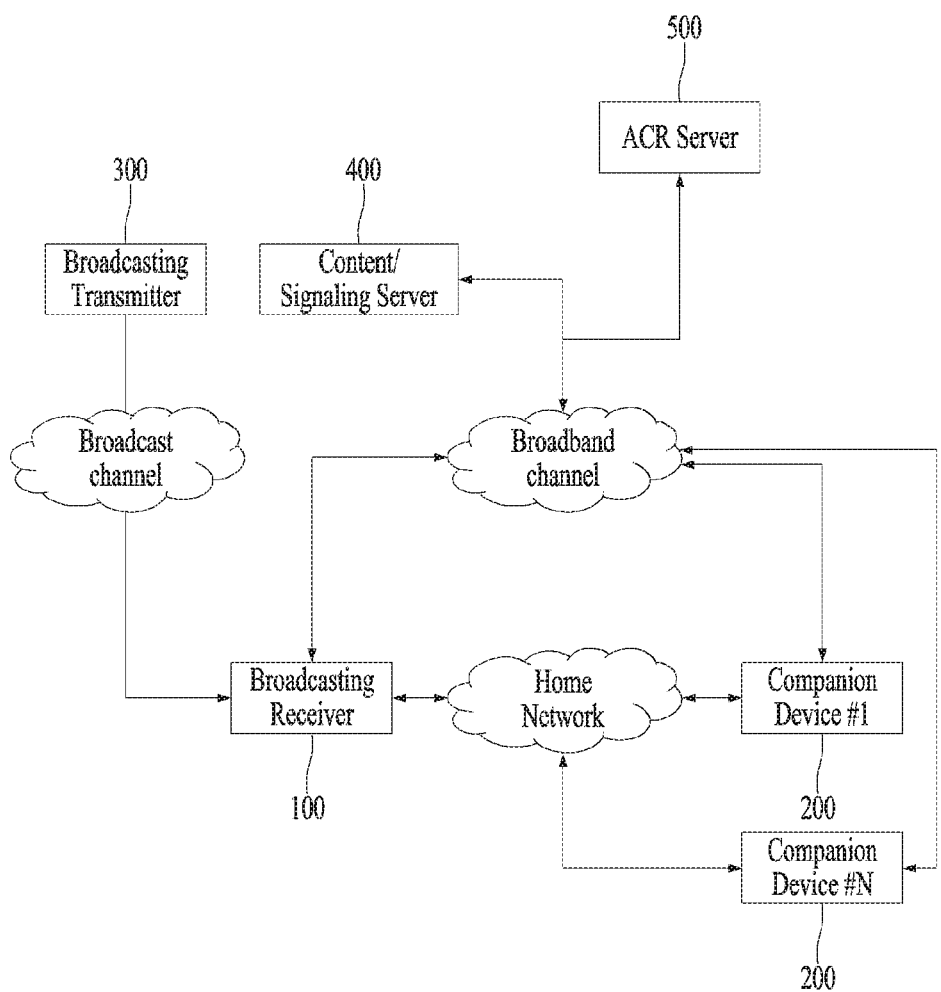
FIG. 16 is a view showing a broadcast system for providing a broadcast service interoperating with a companion device according to an embodiment of the present invention.

FIG. 16 is a view showing a broadcast system for providing a broadcast service interoperating with a companion device according to an embodiment of the present invention.

The broadcast system according to the embodiment includes a broadcasting receiver 100, a companion device 200, a broadcasting transmitter 300, a content/signaling server 400 and an automatic content recognition (ACR) server 500. Hereinafter, the broadcasting receiver 100 may be referred to as a primary device (PD) and the companion device 200 may be referred to as a companion device (CD).

The broadcasting transmitter 300 indicates a broadcast server for transmitting a broadcast service. At this time, the broadcasting receiver 100 receives the broadcast service from the broadcasting transmitter 300 through a broadcast channel. In addition, the broadcasting receiver 100 may receive information for signaling the broadcast service from the broadcasting transmitter 300 through the broadcast channel. In addition, the broadcasting receiver 100 may receive supplementary information for the broadcast service, such as a trigger, a trigger parameter table (TPT) or a trigger declarative object (TDO) from the broadcasting transmitter 300 through the broadcast channel.

The content/signaling sever 400 generates and manages content of the broadcast service. At this time, the broadcasting receiver 100 may receive at least one of supplementary information of the broadcast service and signaling information of the broadcast service from the content/signaling server 400 through a broadband channel.

The ACR server 500 manages ACR related data of the broadcast service. At this time, the broadcasting receiver 100 may receive at least one of an application of the broadcast service and a trigger from the ACR server 500 through the broadband channel.

The companion device 200 interoperates with the broadcasting receiver 100 over a home network and executes a supplementary function related to the broadcast service. More specifically, the companion device 200 may acquire at least one of an application and file related to the broadcast service. In addition, the companion device 200 may execute the application and file related to the broadcast service. At this time, the companion device 200 may use a mobile communication network such as 3GPP or an HTTP proxy server instead of a home network. In addition, in a detailed embodiment, if the application and file related to the broadcast service are transmitted through file delivery over unidirectional transport (FLUTE), the companion device 200 may receive at least one of the application and file related to the broadcast service from the broadcasting receiver 100. In addition, the companion device 200 may be a second screen device. In addition, the companion device 200 may include at least one of a smartphone, a tablet and a laptop. More specifically, the companion device 200 may be a terminal device not having a broadcast reception function through a broadcast channel and having a communication function of a network. In addition, there may be one or a plurality of companion devices 200. The companion device 200 may include a controller for controlling overall operation of the companion device 200 and a communication unit for performing communication with an external device. In addition, the broadcasting receiver 100 may be referred to as a primary device.

In addition, according to an embodiment, at least two of the broadcasting transmitter 300, the content/signaling server 400 and the ACR server 500 may be integrated into one server. As described above, the broadcasting receiver 100 may receive the signaling information of the broadcast service from the broadcasting transmitter 300. Alternatively, the broadcasting receiver 100 may receive the signaling information of the broadcast service from the content/signaling server 400. At this time, the signaling information of the broadcast service may include properties of the broadcast service, which will be described in detail with reference to FIG. 17.

FIG. 17 is a view showing properties of a broadcast service signaled according to an embodiment of the present invention.

The signaling information of the broadcast service received by the broadcasting receiver 100 may include the properties of the broadcast service. At this time, the properties of the broadcast service may include at least one of a broadcast service ID for identifying the broadcast service, a name of the broadcast service, a channel number of the broadcast service, a description of the broadcast service, a genre of the broadcast service, an icon indicating the broadcast service, a primary language of the broadcast service, usage report information of the broadcast service, targeting properties indicating information on a device capable of providing the broadcast service, protection properties of the broadcast service, an advisory rating and information on a media component included in the broadcast service. The targeting properties indicate a device for providing a service and may indicate at least one of the primary device or the companion device 200. The channel number of the broadcast service may include a major channel and a minor channel. The information on the media component may include at least one of an ID for identifying the media component, a type of the media component, a name of the media component, a start time of the media component, a presentation duration of the media component, information indicating a screen targeted by the media component, a URL capable of receiving the media component, an advisory rating of the media component and a genre of the media component. At this time, the screen targeted by the media component may represent the companion device 200. More specifically, the screen targeted by the media component may represent at least one of no companion device, all devices, a smartphone, a tablet PC, a TV and a PC. The tablet PC may indicate a mobile device having no communication function through a mobile communication network, such as LTE, and having a display.

The properties of the broadcast service may be signaled in XML as shown in FIG. 17. The signaling format of the properties of the broadcast service is not limited thereto and the properties of the broadcast service may be signaled in other formats such as a bit stream. FIG. 17 shows an embodiment of an XML schema for a service signaling service properties, which may be an embodiment of an XML schema structure for service properties according to the following embodiments of the present invention. In some embodiments, fields may be omitted or new fields may be added. The service signaling service properties may include information on the properties of the provided service. The broadcasting transmitter 300 or the content/signaling server 400 may deliver the XML schema to the broadcasting receiver 100. The broadcasting receiver 100 may deliver the received XML schema to the companion device 200. The broadcasting receiver 100 may deliver the XML scheme to the companion device 200 with or without change or may deliver only desired fields or changed fields to the companion device 200.

More specifically, the information for signaling the properties of the broadcast service may include at least one of ServiceID, ServiceName, MajorChanNum, MinorChanNum, Description, Genre, Icon, Language, UsageReportingInfo, Targeting, ServiceProtection, AdvisoryRating and ComponentItem. This information may be defined at the serviceInfo level.

The ServiceID indicates a broadcast service identifier for identifying a service. At this time, there may be only one ServiceID. In addition, in a detailed embodiment, the ServiceID may have an unsigned short data type. More specifically, the broadcasting receiver 100 and the companion device 200 may identify the broadcast service based on the ServiceID.

The ServiceName indicates the name of the broadcast service. There may not be ServiceName or there may be one or a plurality of ServiceNames. In a detailed embodiment, the ServiceName may have a string data type. More specifically, the broadcasting receiver 100 and the companion device 200 may represent the name of the broadcast service based on the ServiceName.

The MajorChanNum and the MinorChanNum indicate the major number and the minor number of the channel number of the broadcast service, respectively.

The Description indicates the description of the broadcast service. The Genre indicates the genre of the broadcast service.

The Icon indicates an icon indicating the broadcast service.

The Language indicates the primary language of the broadcast service. The UsageReportingInfo indicates usage report information related to the broadcast service. There may not be UsageReportingInfo or there may be one or a plurality of pieces of UsageReportingInfo. More specifically, the UsageReportingInfo may be used as a parameter for a usage information report. For example, the UsageReportingInfo may include at least one of a URL for a usage information report and a report period. A broadcast service provider may acquire usage information of the broadcast service and payment information of the broadcast service through the usage information report. More specifically, the broadcasting receiver 100 and the companion device 200 may report the usage information of the broadcast service based on the UsageReportingInfo.

The Targeting indicates the targeting properties of the broadcast service. There may not be a targeting property or there may be one or a plurality of targeting attributes. More specifically, the Targeting may have a string data type. More specifically, the Targeting may indicate whether the broadcast service is for the primary device such as the broadcasting receiver 100 or for the companion device 200. If the broadcast service is for the companion device 200, the broadcasting receiver 100 may deliver the XML schema received from the service provider to the companion device 200. More specifically, the broadcasting receiver 100 and the companion device 200 may determine whether the broadcast service is displayed based on the Targeting.

The ServiceProtection indicates the protection properties of the broadcast service. There may not be ServiceProtection property or there may be one ServiceProtection property. More specifically, the ServiceProtection may have a string data type.

The AdvisoryRating indicates the advisory rating of the service. There may not be an AdvisoryRating or there may be one or a plurality of AdvisoryRatings. More specifically, the AdvisoryRating may have a string data type. More specifically, the broadcasting receiver 100 and the companion device 200 may interrupt the broadcast service based on the advisory rating and personalization information. A user may not select an undesired service through the AdvisoryRating information. A user may interrupt a service of a specific rating through personalization.

The ComponentItem indicates information on a media component included in the broadcast service. Here, the component means content and indicates information on content provided by the service corresponding to service information. One ComponentItem may have information on one piece of content. More specifically, the ComponentItem may include at least one of componentId, ComponentType, ComponentName, StartTime, Duration, TargetScreen, URL, ContentAdvisory and Genre.

The ComponentId indicates an identifier for identifying the media component. The ComponentType indicates the type of the media component.

The ComponentName indicates the name of the media component. The StartTime indicates the start time of the media component.

The Duration indicates the presentation duration of the media component. The TargetScreen indicates a target screen of the media component. More specifically, there may not be a target screen or there may be one or a plurality of target screens. More specifically, the TargetScreen may have a string data type. More specifically, the broadcasting receiver 100 and the companion device 200 may determine whether the media component needs to be presented based on the TargetScreen. The TargetScreen indicates whether the component is for the primary device (PD) including the broadcasting receiver 100 or the companion device (the companion device (CD)). If the component is for the CD, the PD may deliver the XML schema received from the service provider to the CD. In a detailed embodiment, the TargetScreen may indicate that there is no CD corresponding to the media component or that the media component is for all devices. In addition, the TargetScreen may indicate that the media component is for any one of a smartphone, a tablet PC, a TV and a PC. If the value of the TargetScreen is 0x00, this may mean a reserved URI. The TargetScreen may indicate that there is no CD corresponding to the media component. At this time, the URI may identify a resource of a remote server capable of downloading information on a companion device application. In this case, the broadcasting receiver may recognize the URI as a location and acquire the resource from the location. If the value of the TargetScreen is 0x01, the TargetScreen may indicate that the media component is targeted at all device classes. Here, the TargetScreen may be a generic URI. If the value of the TargetScreen is 0x02, the TargetScreen may indicate that the media component is targeted at a smartphone class. Here, the TargetScreen may be a specific URI. If the value of the TargetScreen is 0x03, the TargetScreen may indicate that the media component is targeted at a tablet PC class. Here, the TargetScreen may be a specific URI. If the value of the TargetScreen is 0x04, the TargetScreen may indicate that the media component is targeted at a TV class. Here, the TargetScreen may be a specific URI. If the value of the TargetScreen is 0x05, the TargetScreen may indicate that the media component is targeted at a PC class. Here, the TargetScreen may be a specific URI.

The URL may indicate an address for receiving the media component. More specifically, there may not be URL or there may be one or a plurality of URLs. More specifically, the URL may have a URL data type. More specifically, the URL may indicate the address of the content/signaling server 400. More specifically, the broadcasting receiver 100 and the companion device 200 may receive the media component based on the URL.

The ContentAdvisory indicates the advisory rating of the media component. The Genre indicates the genre of the media component.

Next, a protocol applicable between the PD and the CD will be described. One embodiment of the present invention is not limited to a specific protocol.

A. In the present invention, device-to-device communication is represented by exchange of a message, a command, a call, an action or a request/response.

B. In the present invention, in order to stably deliver a message used upon device-to-device communication to a desired target device, various protocols such as Internet protocol (IP), Internet control message protocol (ICMP), and Internet group management protocol (IGMP) are applicable, without being limited to a specific protocol.

C. In the present invention, in order to stably deliver a message used upon device-to-device communication, control a message flow, solve collision or congestion among a plurality of messages or support multiplexing, various protocols such as transmission control protocol (TCP), user datagram protocol (UDP), datagram congestion control protocol (DCCP) and stream control transmission protocol (SCTP) are applicable without being limited to a specific protocol.

D. In the present invention, in order to deliver a variety of information included in a message used upon device-to-device communication for various purposes, various protocols such as hypertext transfer protocol (HTTP), real-time transport protocol (RTP), extensible messaging and presence protocol (XMPP) and file transfer protocol (FTP) are applicable without being limited to a specific protocol.

E. In the present invention, when a message used upon device-to-device communication is delivered through the various protocols, desired message data may be included and delivered in the various message components such as a message header or a message body among the message components defined in each protocol without being limited to a specific message component.

F. In the present invention, when a message used upon device-to-device communication is delivered through the various protocols, data to be delivered may be delivered in various types defined in each protocol (string, integer, floating point, Boolean, character, array, list, etc.). In order to structurally express, deliver and store complex data, a markup format such as extensible markup language (XML), hypertext markup language (HTML), extensible hypertext markup language (XHTML), javascript object notation (JSON), etc. or a text or image format is applicable without being limited to a specific format.

G. In the present invention, data included in a message used upon device-to-device communication may be delivered by applying various data compression technologies such as "gzip" (RFC 1952), "deflate" (RFC 1950), "compress" (RFC 2616), without being limited to specific technology.

A UPnP protocol which is a device-to-device communication protocol applied to the embodiment of the present invention is a device-to-device communication protocol which is a combination of TCP/IP and UDP-HTTP among technologies of various layers of B to G.

A UPnP action proposed by the present invention is one of various device-to-device communication protocols and delivers data to a control URL acquired in a UPnP discovery and description process in an HTTP POST message body delivered in XML using a POST method defined in HTTP. In the case of a UPnP protocol, since the action name of each action is defined and the action name is also delivered in the HTTP POST message body delivered in XML, only one URL for a communication target device is present and infinite types of actions (messages) may be exchanged using only one HTTP POST method. This will be described with reference to the figure related to a UPnP action mechanism.

As another embodiment, device-to-device communication proposed by the present invention is applicable without defining an action name, when several methods such as GET, HEAT, PUT, DELETE, TRACE, OPTIONS, CONNECT and PATCH are used in addition to POST among HTTP methods and a plurality of URIs accessing the communication target device is defined. Data which needs to be delivered may be appended to a corresponding URI or may be included in an HTTP body in various formats. This will be described below with reference to the figure related to an REST MECHANISM. The plurality of URIs necessary for such an REST mechanism may be acquired in a discovery or description process.

All UPnP actions proposed by the present invention are applicable through various combinations of technologies of various layers of B to G and all proposals of the present invention are not limited to the UPnP protocol.

As described above, the broadcasting receiver 100 and companion device 200 may interoperate through at least one of a home network, a mobile communication network such as 3GPP and an HTTP proxy server. At this time, communication between the broadcasting receiver 100 and the companion device 200 may be performed using various protocols. More specifically, communication between the broadcasting receiver 100 and the companion device 200 may be performed using a universal plug and play (UPnP) protocol.

UPnP distinguishes between a control point (CP) and controlled devices (CDs). The control point controls the controlled devices using the UPnP protocol. In a detailed embodiment, the broadcasting receiver 100 may be one of the controlled devices. In addition, the companion device 200 may be a control point. In UPnP, discovery, description, control and eventing protocols are defined. The discovery protocol refers to a protocol for enabling a control point to find controlled devices. The description protocol refers to a protocol for enabling a control point to acquire information on controlled devices. The control protocol refers to a protocol for enabling a control point to invoke a predetermined action with respect to controlled devices. The eventing protocol refers to a protocol for enabling a controlled device to deliver asynchronous notifications to a control point. The broadcasting receiver 100 and the companion device 200 according to the embodiment of the present invention may interoperate with at least one of the discovery, description, control and eventing protocols of the UPnP protocol. For example, the broadcasting receiver 100 may find the companion device 200 using the discovery protocol.

Figure 18:
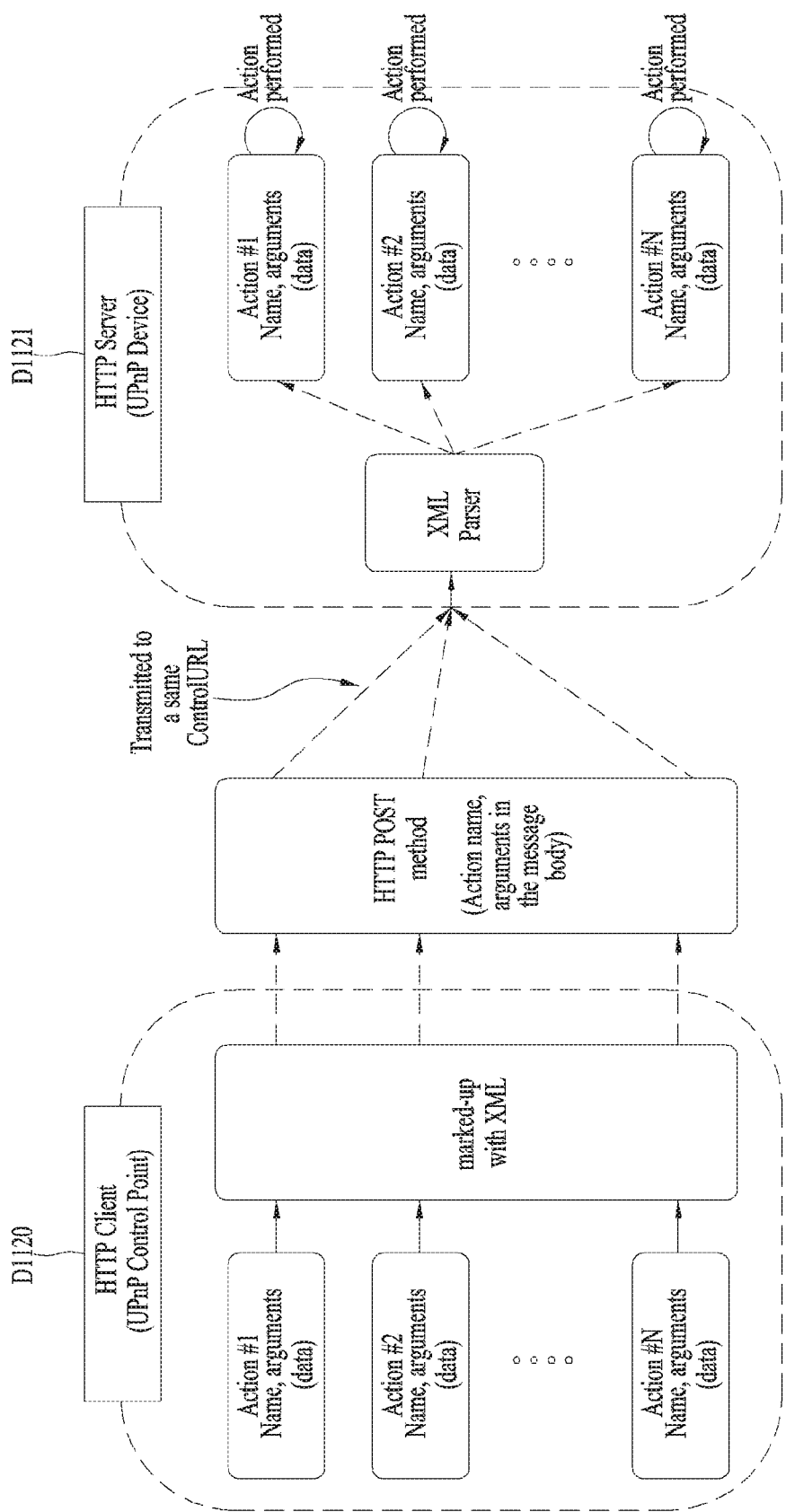
FIG. 18 is a view showing a UPnP action mechanism according to an embodiment of the present invention.

FIG. 18 is a view showing a UPnP action mechanism according to an embodiment of the present invention.

The UPnP protocol which is a device-to-device communication protocol applied to the embodiment of the present invention is a device-to-device communication protocol obtained by combining TCP/IP and UDP-HTTP.

A UPnP action proposed by the present invention is one of various device-to-device communication protocols and delivers data to a control URL acquired in a UPnP discovery and description process in an HTTP POST message body delivered in XML using a POST method defined in HTTP. In the case of a UPnP protocol, since the action name of each action is defined and the action name is also delivered in the HTTP POST message body delivered in XML, only one URL for a communication target device is present and infinite types of actions (messages) may be exchanged using only one HTTP POST method.

An HTTP client D1120 is a UPnP control point and may control an HTTP server D1121. At this time, the HTTP server may operate as a UPnP device. The HTTP client D1120 may define each action using a name and arguments in order to deliver various actions. At least one action may include a name corresponding to an identifier and arguments corresponding to data. As shown in the figure, each of action 1 to action N may include a name and arguments, which may be described in XML. The described XML message may be delivered to the HTTP server D1121 using an HTTP POST method. The name and arguments of each action may be included and delivered in the body of an HTTP POST message. At this time, the HTTP POST message including at least one action may be delivered to the same controlURL and each action may be identified by the name.

The HTTP server D1121 may parse the XML message included in the received HTTP POST message using an XML parser. The HTTP server D1121 may identify at least one action included in the XML message and perform actions according to the arguments of each action.

FIG. 19 is a view showing service signaling messages of a broadcast receiving device and a companion device using an eventing method according to an embodiment of the present invention.

The eventing method may be based on the UPnP protocol. A service type and a service ID defined in the eventing method are shown in (a) of FIG. 19. That is, the service type of service signaling may be atsc3.0servicesignaling:1 and the service ID may be defined as urn:atsc.org:serviceId: atsc3.0servicesignaling. The service type and the service ID may have different values according to transmission method.

The broadcast receiving device 100 may transmit the properties of a broadcast service to the companion device 200 using one variable indicating the properties of the broadcast service. One variable indicating the properties of the broadcast service may include the properties of a current broadcast service. More specifically, in the embodiment shown in (b) of FIG. 19, the properties of the broadcast service may be transmitted using a variable "ServiceProperty". In an embodiment, ServiceProperty is a required variable and may have a string data type. For example, ServiceProperty may be described in XML, JSON, HTML or TEXT. That is, ServiceProperty may correspond to ServiceInfo defined in XML schema of the above-described Service Signaling Service. In an embodiment, ServiceProperty may not have an action related thereto.

In addition, the Service Signaling Service may have an action and an argument as shown in (c) and (d) of FIG. 19. A GetServiceProperty action may be used for the companion device 200 to acquire service property information of the currently provided service when the companion device 200 is connected to the broadcast receiving device 100 while a service is being provided by the broadcast receiving device 100. A GetServiceProperty argument may have the format shown in (d) of FIG. 19. The broadcast receiving device 100 may include and return information on the currently provided service in a ServiceProperty argument as a return value in response to the GetServiceProperty action from the companion device 200.

If subscription to the ServiceProperty is requested, the broadcast receiving device 100 may transmit a ServiceProperty to the companion device.

FIG. 20 is a ladder diagram showing operation for signaling a broadcast service property from a broadcast receiving device to a companion device according to an embodiment of the present invention.

The broadcast receiving device 100 and the companion device 200 generate a pairing session (S2001). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. More specifically, the broadcast receiving device 100 and the companion device 200 may generate a pairing session using a UPnP protocol. In a detailed embodiment, the broadcast receiving device 100 may find the companion device 200 using the discovery protocol of a UPnP. For example, the broadcast receiving device 100 may multicast a discovery message for finding a companion device for interoperation through a well-known IP address. At this time, the companion device 200, which has received the multicast message, may request a description from the broadcast receiving device 100. The broadcast receiving device 100 may provide the description to the companion device 200 based on the request for the description of the companion device 200. The companion device 200 may access the broadcast receiving device 100 based on the description. In another detailed embodiment, the companion device 200 may find the broadcast receiving device 100 using the discovery protocol of the UPnP. For example, the companion device 200 may multicast a message for finding the broadcast receiving device 100 for interoperation through a well-known IP address. At this time, the broadcast receiving device may respond to the multicast message using a discovery message. At this time, the companion device 200, which has received the discovery message, may request a description from the broadcast receiving device 100. The broadcast receiving device 100 may provide the description to the companion device 200 based on the request for the description of the companion device 200. The companion device 200 may access the broadcast receiving device 100 based on the description.

The companion device 200 may request broadcast service property notification from the broadcast receiving device 100 (S2003). More specifically, the companion device 200 may request broadcast service property notification from the broadcast receiving device 100 through a controller. More specifically, the companion device 200 may request broadcast service property notification from the broadcast receiving device 100 using a UPnP protocol. In a detailed embodiment, the companion device 200 may request subscription to an event for the broadcast service property from the broadcast receiving device 100 based on an eventing protocol.

The broadcast receiving device 100 receives information for signaling the broadcast service property based on the broadcast service (S2005). More specifically, the broadcast receiving device 100 may receive information for signaling the broadcast service property from the broadcast transmitting device 300 through a broadcast reception unit 110.

The broadcast receiving device 100 notifies the companion device 200 of the broadcast service property based on the information for signaling the broadcast service property (S2007). In the case of a UPnP based architecture, the broadcast service property may be notified according to the eventing protocol. More specifically, the broadcast receiving device 100 notifies the companion device 200 of the broadcast service property through a controller 150 based on the information for signaling the broadcast service property. More specifically, the broadcast receiving device 100 may determine whether the broadcast service property is changed. If the broadcast service property is changed, the broadcast receiving device 100 may notify the companion device 200 of the broadcast service property. In a detailed embodiment, the broadcast receiving device 100 may notify the companion device 200 of the broadcast service property through a variable indicating the broadcast service property. In a detailed embodiment, the variable indicating the broadcast service property may be the ServiceProperty of FIG. 19. The data format of the variable indicating the broadcast service property will be described in detail with reference to FIG. 21.

FIG. 21 is a view showing the data format of a broadcast service property signaled from a broadcast receiving device to a companion device according to an embodiment of the present invention.

The data of the broadcast service property may be an XML as shown in FIG. 21. However, the data format of the broadcast service property is not limited thereto. That is, as shown in (a) of FIG. 21, the broadcast service property may be defined in a propertyset with respect to each property. In addition, as shown in (b) of FIG. 21, the broadcast service property may be defined as a ServiceID, a ServiceName, a Content ID, and a CotentName in the ServiceProperty. In addition, as shown in (c) of FIG. 21, the broadcast service property may be described such that a ServiceProperty (ServiceInfo) element and a ComponentItem element included therein include respective properties.

In the embodiment of FIG. 21, the data format of the broadcast service property may include all the properties of the above-described broadcast service. Accordingly, even when only some of the properties of the broadcast service are changed, the broadcast receiving device 100 should transmit all the properties of the broadcast service and the companion device 200 should receive all the properties of the broadcast service. In this case, the amount of data exchanged between the broadcast receiving device 100 and the companion device 200 increases. In addition, the companion device 200 should check which property of the broadcast service is changed. Accordingly, there is a need for a method of efficiently signaling the broadcast service property from the broadcast receiving device 100 to the companion device 200. This will be described with reference to FIGS. 22 to 23.

FIG. 22 is a view showing a variables indicating the state of a broadcast service property signaled from a broadcast receiving device to a companion device, an action for the broadcast service property and an action argument according to an embodiment of the present invention.

The service type and the service ID of the broadcast service signaled from the broadcast receiving device to the companion device may be equal to those of the above-described embodiment. That is, the service type of service signaling may be atsc3.0servicesignaling:1 and the service ID may be defined as urn:atsc.org:serviceId: atsc3.0servicesignaling. The service type and the service ID may have different values according to the transmission method.

In another embodiment of the present invention, the variable indicating the broadcast service property may include at least one of a variable indicating a broadcast service property, a variable indicating a broadcast service property name and a variable indicating whether the broadcast service property is changed. More specifically, if the companion device 200 requests a specific broadcast service property, the broadcast receiving device 100 may transmit the broadcast service property based on the request of the companion device 200. More specifically, the broadcast receiving device 100 may transmit the specific broadcast service property requested by the companion device 200. For example, the broadcast receiving device 100 may notify the companion device 200 of whether the broadcast service property is changed through the variable indicating whether the broadcast service property is changed. At this time, the companion device 200 may request a necessary broadcast service property through the variable indicating the broadcast service property name. The broadcast receiving device 100 may notify the companion device of the broadcast service property through the variable indicating the broadcast service property.

In a detailed embodiment, the variable indicating the broadcast service property may include any one of a ServiceProperty, a ServicePropertyName and a ServicePropertyChangeFlag. The ServiceProperty includes the broadcast service property. In a detailed embodiment, the ServiceProperty is a required variable and may have a string data type. In particular, the ServiceProperty may be described in XML.

The ServicePropertyName indicates the name of the broadcast service property. That is, this may indicate the name of the XML element as each field included in the ServiceProperty. The ServicePropertyName is a required variable and may have a string data type. In particular, the ServicePropertyName may be described in CSV. The variable ServicePropertyChangeFlag indicates whether the broadcast service property is changed. In a detailed embodiment, the ServicePropertyChangeFlag is a required variable and may have a Boolean data type or an integer type. The ServicePropertyChangeFlag is a variable indicating whether the service property is changed. If the ServicePropertyChangeFlag is of a Boolean data type, true indicates that the service property is changed and false indicates that the service property is not changed. Alternatively, if the ServicePropertyChangeFlag is of an integer type, the value thereof increases by 1 whenever the service property is changed and is evented. In addition, if the companion device 200 requests subscription to the ServicePropertyChangeFlag, the broadcast receiving device 100 may transmit the ServicePropertyChangeFlag to the companion device.

The companion device 200 may use an action called GetServiceProperty in order to request the broadcast service property through the variable indicating the name of the broadcast service property. The GetServiceProperty is a required action. At this time, the GetServiceProperty may have a ServiceProgpertyName as an input argument. In addition, the GetServiceProperty may have a ServiceProperty as an output argument. In a detailed embodiment, if the companion device 200 sets the broadcast service property to be acquired from the broadcast receiving device 100 to a SevicePropertyName and transmits a GetServiceProperty action, the companion device 200 may receive the broadcast service property corresponding to the ServicePropertyName as the ServiceProperty. That is, ServicePropertyName is an input argument and may be used when the companion device 200 acquires the service property value of a desired property name. The ServiceProperty may be used when the broadcast receiving device 100 returns service information, that is, a service property to the companion device 200 in response to the desired property name.

Figure 23:
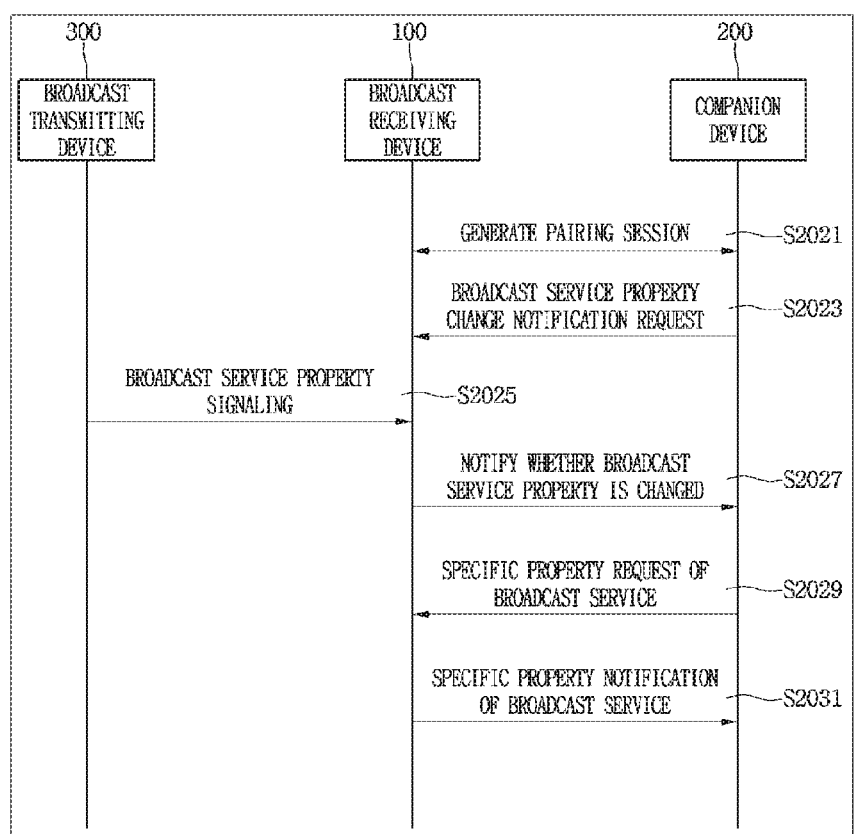
FIG. 23 is a ladder diagram showing operation for signaling a broadcast service property from a broadcast receiving device to a companion device according to another embodiment of the present invention.

FIG. 23 is a ladder diagram showing operation for signaling a broadcast service property from a broadcast receiving device to a companion device according to another embodiment of the present invention.

The broadcast receiving device 100 and the companion device 200 generate a pairing session (S2021). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described embodiment.

The companion device 200 may request broadcast service property change notification from the broadcast receiving device 100 (S2023). More specifically, the companion device 200 may request broadcast service property change notification from the broadcast receiving device 100 through a controller. Detailed operation of the companion device 200 may be equal to that of the above-described embodiment. That is, the companion device 200 may subscribe to the service signaling service of the broadcast receiving device 100.

The broadcast receiving device 100 receives information for signaling the broadcast service property from the broadcast receiving device 100 based on the broadcast service (S2025). More specifically, the broadcast receiving device 100 may receive information for signaling the broadcast service property from the broadcast receiving device 100 through a broadcast reception unit 110. A broadcast transmitting device 300 may notify the broadcast receiving device 100 that the service property is changed.

The broadcast receiving device 100 notifies the companion device 200 of whether the broadcast service property is changed based on the information for signaling the broadcast service property (S2027). In the case of a UPnP based architecture, the broadcast receiving device 100 may notify the companion device of whether the broadcast service property is changed according to an "eventing" protocol. More specifically, the broadcast receiving device 100 may notify the companion device 200 of whether the broadcast service property is changed based on the information for signaling the broadcast service property through a controller 150. More specifically, the broadcast receiving device 100 may determine whether the broadcast service property is changed. If the broadcast service property is changed, the broadcast receiving device 100 may notify the companion device 200 that the broadcast service property is changed. More specifically, the broadcast receiving device 100 may determine whether the broadcast service property is changed depending on whether the version of the information for signaling the broadcast service property is changed. In addition, in a detailed embodiment, the broadcast receiving device 100 may notify the companion device 200 of whether the broadcast service property is changed through the variable indicating whether the broadcast service property is changed. In a detailed embodiment, the variable indicating whether the broadcast service property is changed may be a ServicePropertyChangedFlag.

The companion device 200 requests a specific broadcast service property from the broadcast receiving device 100 (S2029). The companion device 200 may request a changed service property field using "GetServiceProperty" if the changed property field is an interesting field. At this time, the name of the changed service property field may be included in the ServiceProPertyName argument to make a request from the broadcast receiving device 100. For example, if the field to be acquired by the companion device 200 is a genre and a language, a request is made using GetServiceProperty ("genre, language").

The specific broadcast service property may be any one or a plurality of properties of the broadcast service properties included in the information for signaling the broadcast service property. The companion device 200 may request a specific broadcast service property from the broadcast receiving device 100 through a controller. More specifically, if the broadcast receiving device 100 transmits broadcast service property change notification, the companion device 200 may request the specific broadcast service property from the broadcast receiving device 100. At this time, the specific broadcast service property may be a broadcast service property necessary for the companion device 200 to provide supplementary services related to the broadcast service. In addition, the companion device 200 may request the specific broadcast service property based on the type of the changed broadcast service property. More specifically, the companion device 200 may request the specific broadcast service property if the specific broadcast service property is changed. The specific broadcast service property may be a property necessary for the companion device 200 to provide supplementary services related to the broadcast service. For example, if the companion device 200 determines whether the broadcast service is presented based on the targeting properties of the broadcast service, the companion device 200 may request the targeting properties of the broadcast service when the targeting properties of the broadcast are changed.

The broadcast receiving device 100 notifies the companion device 200 of the specific broadcast service property (S2031). That is, the companion device 200 may receive the changed field information from the broadcast receiving device 100 in response to the "GetServiceProperty" action. The ServiceProperty argument may be delivered to the companion device 200 as the output of the "GetServiceProperty" action. Here, the companion device 200 may receive information on the field for the specific property requested thereby. That is, the companion device 200 may receive information indicating that the changed genre is Sports and the language is KOR.

More specifically, the broadcast receiving device 100 may notify the companion device 200 of the specific broadcast service property through the controller 150. More specifically, the broadcast receiving device 100 may notify the companion device 200 of the specific broadcast service property based on the request of the companion device 200. For example, the broadcast receiving device 100 may transmit the specific broadcast service property requested by the companion device 200 to the companion device 200.

Such an embodiment may require continuous communication between the broadcast receiving device 100 and the companion device 200. In particular, if the broadcast receiving device 100 interoperates with a plurality of companion devices 200, continuous communication may cause overload of the operation of the broadcast receiving device 100. This problem may be solved by enabling the companion device 200 to receive the broadcast service property from the content/signaling server 400.

If the broadcast service property is changed, the broadcast receiving device 100 may notify the companion device 200 of the changed property and whether the broadcast service property is changed. To this end, the variable indicating the state of the broadcast service property may include information indicating the changed service property. To this end, the variable indicating whether the broadcast service property is changed may have a string type represented by a binary hexadecimal type. If a request for subscription to the ServicePropertyChangedFlag is made, the broadcast receiving device 100 may transmit the ServicePropertyChangedFlag to the companion device.

Figure 24:
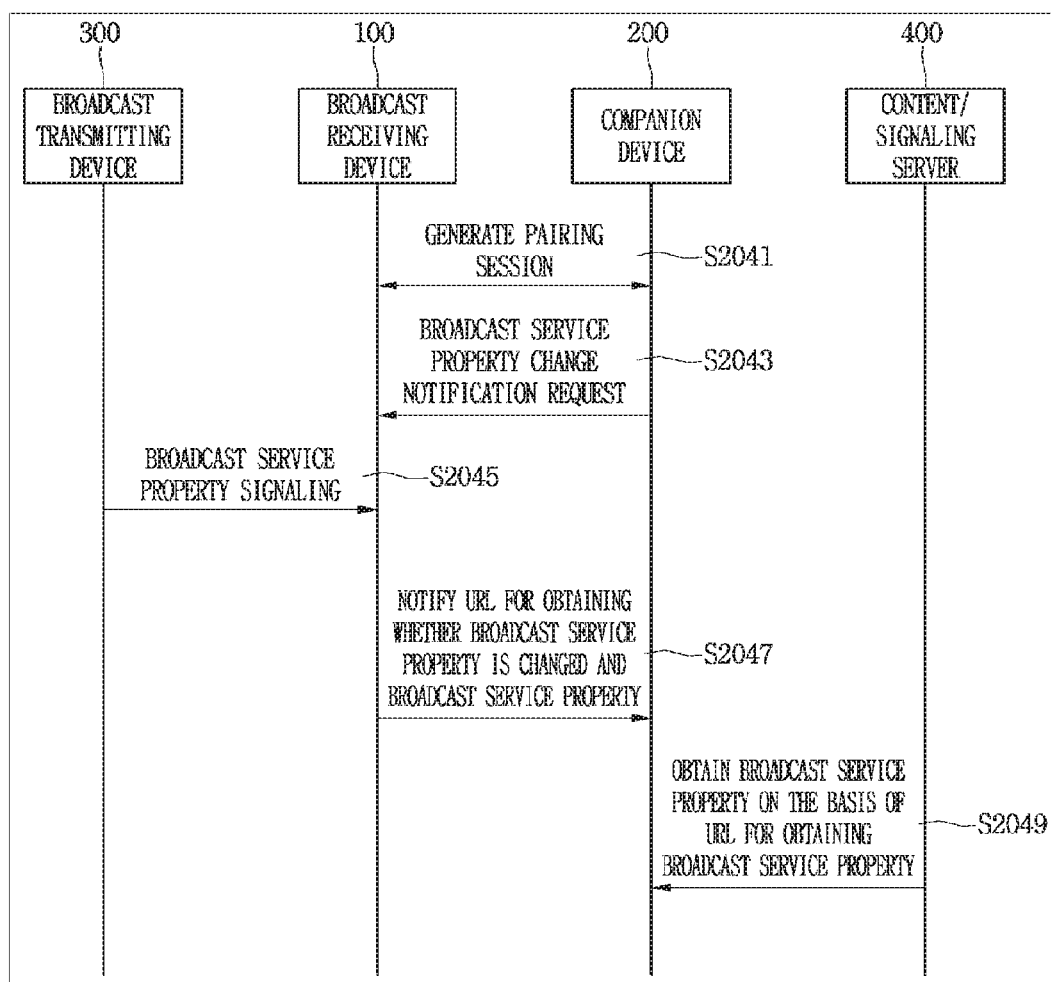
FIG. 24 is a ladder diagram showing operation for signaling a broadcast service property from a broadcast receiving device to a companion device according to another embodiment of the present invention.

FIG. 24 is a ladder diagram showing operation for signaling a broadcast service property from a broadcast receiving device to a companion device according to another embodiment of the present invention.

The broadcast receiving device 100 and the companion device 200 generate a pairing session (S2041). More specifically, the broadcast receiving device 100 may generate a pairing session with the companion device 200 through an IP communication unit 130. More specifically, the companion device 200 may generate a pairing session with the broadcast receiving device 100 through a communication unit. As described above, the broadcast receiving device 100 and the companion device 200 may generate a pairing session for bidirectional communication.

The companion device 200 requests broadcast service property notification from the broadcast receiving device 100 (S2043). More specifically, the companion device 200 may request broadcast service property notification from the broadcast receiving device 100 through a controller. The detailed operation of the companion device 200 may be equal to that of the embodiment of FIG. 23.

The broadcast receiving device 100 receives information for signaling the broadcast service property based on the broadcast service (S2045). More specifically, the broadcast receiving device 100 may receive the information for signaling the broadcast service property from a broadcast transmitting device 300 through a broadcast reception unit 110.

The broadcast receiving device 100 notifies the companion device 200 of whether the broadcast service property is changed and of a URL capable of acquiring the broadcast service property based on the information for signaling the broadcast service property (S2047). More specifically, the broadcast receiving device 100 may notify the companion device 200 of whether the broadcast service property is changed and of a URL capable of acquiring the broadcast service property based on the information for signaling the broadcast service property through the controller 150. Here, the URL may mean location information capable of acquiring service property information on a content server. More specifically, a ServicePropertyURL which is the above-described property location information may be used. In the case of a UPnP based architecture, the broadcast receiving device 100 may notify the companion device of the ServicePropertyURL according to an "eventing" protocol.

More specifically, the broadcast receiving device 100 may determine whether the broadcast service property is changed. More specifically, the broadcast receiving device 100 may determine whether the broadcast service property is changed depending on whether the version of the information for signaling the broadcast service property is changed. In addition, if the broadcast service property is changed, the broadcast receiving device 100 may notify the companion device 200 that the broadcast service property is changed and of the URL capable of acquiring the broadcast service property. In a detailed embodiment, the broadcast receiving device 100 may notify the companion device 200 of whether the broadcast service property is changed through a variable indicating whether the broadcast service property is changed. In a detailed embodiment, the variable indicating whether the broadcast service property is changed may be the ServicePropertyChangeFlag. In addition, the broadcast receiving device 100 may notify the companion device 200 of whether the broadcast service property is changed through the variable indicating the URL capable of acquiring the broadcast service property. In a detailed embodiment, the variable indicating the URL capable of acquiring the broadcast service property may be the above-described ServicePropertyURL.

The companion device 200 acquires the broadcast service property based on the URL capable of acquiring the broadcast service property (S2049). More specifically, the companion device 200 may acquire the broadcast service property based on the URL capable of acquiring the broadcast service property through a controller. More specifically, the companion device 200 may acquire the broadcast service property from the content/signaling server 400 based on the URL capable of acquiring the broadcast service property. More specifically, the companion device 200 may request the broadcast service property from the content/signaling server 400 based on the URL capable of acquiring the broadcast service property and acquire the broadcast service property from the content/signaling server 400. Therefore, it is possible to reduce the load of the broadcast receiving device 100 due to communication between the broadcast receiving device 100 and the companion device 200. However, in this case, the broadcast receiving device 100 should notify the companion device whether the broadcast service property is changed even when the broadcast service property which is not required by the companion device 200 is changed. Accordingly, the broadcast receiving device 100 should perform unnecessary operation. If the companion device 200 pre-sets a necessary broadcast service property upon requesting notification from the broadcast receiving device 100, the unnecessary operation of the broadcast receiving device 100 can be reduced. This will be described with reference to FIG. 25.

FIG. 25 is a view showing a variable indicating the state of a broadcast service property signaled from a broadcast receiving device to a companion device according to another embodiment of the present invention. In this embodiment, the broadcast receiving device 100 may notify the companion device 200 of only updated property names.

The service type and the service ID signaled from the broadcast receiving device to the companion device may be equal to those of the above-described embodiment. That is, the service type of service signaling may be atsc3.0servicesignaling:1 and the service ID may be defined as urn:atsc.org:serviceId:atsc3.0servicesignaling. The service type and the service ID may have different values according to transmission method.

(a) of FIG. 25 shows the variable indicating the state of the broadcast service property. The variable indicating the state of the broadcast service property may include a service property variable, a service property name variable, an updated service property variable and an updated property name variable.

The service property variable may be represented by a ServiceProperty. The service property variable is equal to the above-described service property variable and, in the present embodiment, an eventing method may not be used.

The service property name variable may be expressed by an A_ARG_TYPE_ServicePropertyName. The service property name variable is a state variable associated with a ServicePropertyName which is an input argument of a GetServicePropertyValue action.

The updated service property variable may be represented by an A_ARG_TYPE_UpdatedServicePropertyValue. The updated service property variable is a state variable associated with an UpdatedServiceProperty which is an output argument of a GetServicePropertyValue action.

The updated property name variable may be represented by UpdatedPropertyNames. The updated property name variable may indicate the names of the service properties. This may be delivered from the broadcast receiving device to the CD using the eventing method and the data format may be equal to (b) or (c) of FIG. 25.

That is, as shown in (b) of FIG. 25, the updated property name variable may include the name of the changed property in the property list. For example, the updated property name variable may include property names such as ContentId, ContentName and MajorChanNum.

In addition, in another embodiment, as shown in (c) of FIG. 25, the updated property name variable may also include information on a method of updating the property names. For example, the name of an added property may be included in an added syntax, the name of a modified property may be included in a modified syntax and the name of a deleted property may be included in a deleted syntax.

Figure 26:
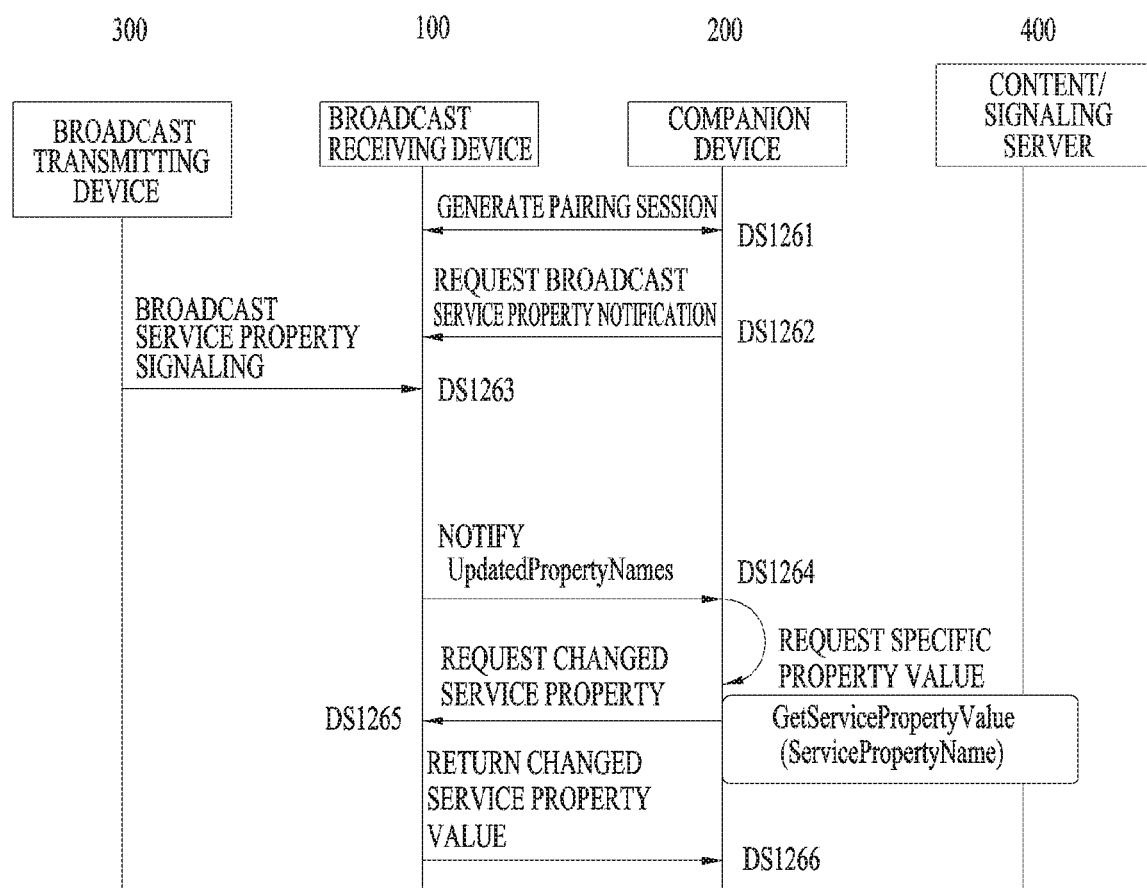
FIG. 26 is a ladder diagram showing operation for signaling a broadcast service property from a broadcast receiving device to a companion device according to another embodiment of the present invention.

FIG. 26 is a ladder diagram showing operation for signaling a broadcast service property from a broadcast receiving device to a companion device according to another embodiment of the present invention. In this embodiment, an updated property name variable and a GetServicePropertyValue among the variables indicating the state of the broadcast service property may be used.

The broadcast receiving device 100 and the companion device 200 generate a pairing session (DS1261). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the above-described embodiment.

The companion device 200 may request broadcast service property change notification from the broadcast receiving device 100 (DS1262). More specifically, the companion device 200 may request broadcast service property notification from the broadcast receiving device 100 through a controller. Detailed operation of the companion device 200 may be equal to that of the above-described embodiment.

The broadcast receiving device 100 receives information for signaling the broadcast service property from the broadcast receiving device 100 based on the broadcast service (DS1263). More specifically, the broadcast receiving device 100 may receive information for signaling the broadcast service property from the broadcast transmitting device 300 through a broadcast reception unit 110. The broadcast transmitting device 300 may notify the broadcast receiving device 100 that the service property is changed. The broadcast receiving device 100 may change an existing broadcast service property based on the received broadcast service property. In addition, the broadcast receiving device 100 may change the variable indicating the state of the broadcast service property.

The broadcast receiving device 100 may notify the companion device 200 of an UpdatedPropertyNames state variable (DS1264). This may be notified according to an "eventing" protocol in the case of a UPnP based architecture. Here, the broadcast receiving device 100 may deliver only the changed property to the companion device 200 through UpdatedPropertyNames, if the service property is changed.

The companion device 200 may request the value of a changed service property (DS1264). That is, the companion device may request the value of a desired service property using a GetServicePropertyValue. The companion device 200 may include the name of a service property field, which desires to be acquired, in a ServicePropertyName argument and request the service property field from the broadcast receiving device 100. The companion device 200 may acquire a desired property value among the changed property fields. In addition, there may be a plurality of fields in which the companion device 200 is interested. For example, the companion device 200 may be interested in @advisoryRating and @language. If at least one of the plurality of interesting fields is changed, the companion device 200 requests and receives all changed fields.

For example, a request is made using a GetServiceProperty ("advisoryRating", "language"). The broadcast receiving device 100 may receive the GetServicePropertyValue from the companion device 200.

The companion device 200 may receive changed field information from the broadcast receiving device 100 in response to the "GetServicePropertyValue" action. An UpdatedServicePropertyValue argument may be delivered to the companion device 200 as an output of the "GetServicePropertyValue" action.

Figure 27:
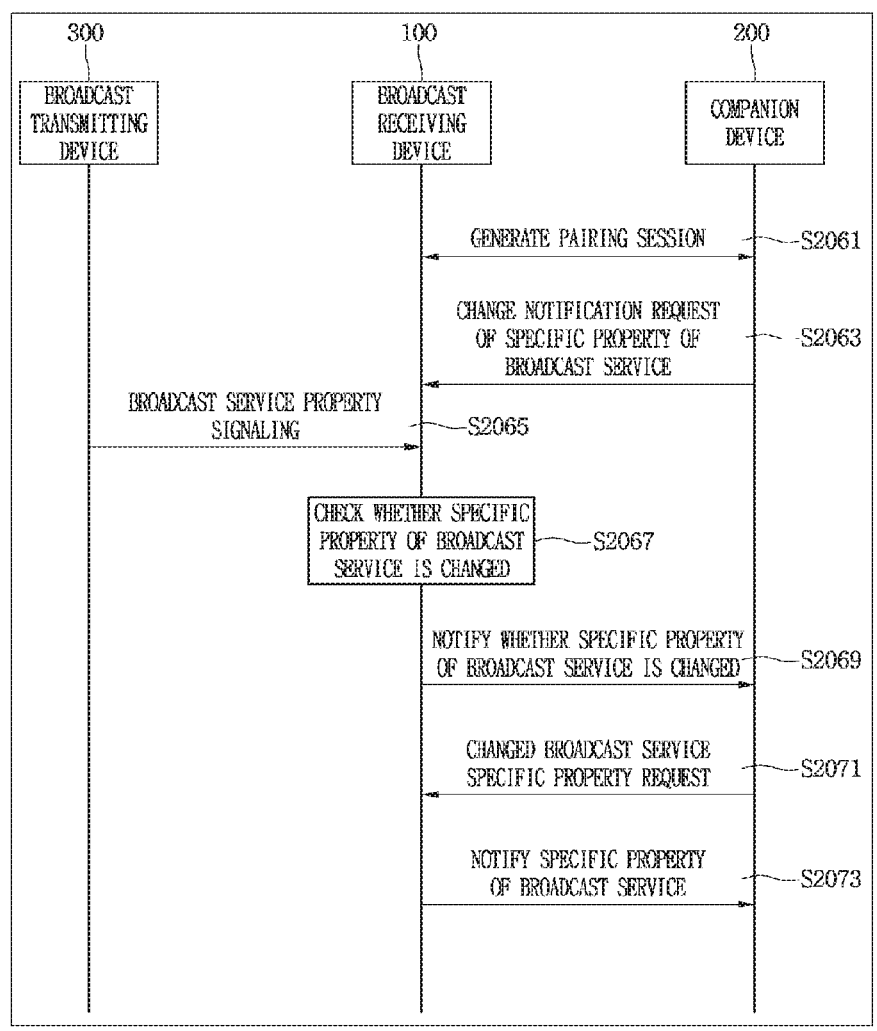
FIG. 27 is a ladder diagram showing operation for signaling a broadcast service property from a broadcast receiving device to a companion device according to another embodiment of the present invention.

FIG. 27 is a ladder diagram showing operation for signaling a broadcast service property from a broadcast receiving device to a companion device according to another embodiment of the present invention.

The broadcast receiving device 100 and the companion device 200 generates a pairing session (S2061). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication.

The companion device 200 may request specific broadcast service property change notification from the broadcast receiving device 100 (S2063). More specifically, the companion device 200 may request specific broadcast service property change notification from the broadcast receiving device 100 through a controller. The companion device 200 may request specific broadcast service property change notification necessary to provide supplementary information associated with the broadcast service. In a detailed embodiment, the companion device 200 may request specific broadcast service property change notification through an action for requesting only specific property change notification. At this time, an action for requesting only specific property change notification may be the above-described SetServiceProperty. Operation for requesting specific property change notification from the broadcast receiving device 100 at the companion device 200 may include the following operations. The companion device 200 may request subscription to service property change notification from the broadcast receiving device 100. The broadcast receiving device 100 may transmit an acceptance message and a subscription ID (SID) for identifying a subscription request to the companion device 200 if the request for subscription to service property change notification is accepted. The companion device 200 may request only specific broadcast service property change notification from the broadcast receiving device 100 based on the SID. More specifically, the companion device 200 may transmit a specific broadcast service property, change of which desires to be notified, along with the SID. At this time, the companion device may use the above-described SetServiceProperty action. In an embodiment, the SetServiceProperty( ) delivered from the companion device 200 to the broadcast receiving device 100 may be represented by SetServiceProperty (SID, "genre", "language"). That is, the SID, that is, a SessionID may also be transmitted as the parameter of the SetServiceProperty action.

As another embodiment, SetServiceProperty( ) delivered from the companion device 200 to the broadcast receiving device 100 may be represented by SetServiceProperty ("genre", "language"). Since the broadcast receiving device 100 may confirm the SID upon pairing with the companion device 200, the SID may not be transmitted as a separate parameter.

Since the SID of the companion device 200 is mapped to the ServicePropertyName, the broadcast receiving device 100 may notify the companion device 200 that the service property is changed like the following data format.

In addition, the companion device 200 may request notification of change of a plurality of specific properties of the broadcast service from the broadcast receiving device 100. At this time, the companion device 200 may request the plurality of specific properties of the broadcast service in the form of a list.

The broadcast receiving device 100 receives information for signaling the broadcast service property based on the broadcast service (S2065). More specifically, the broadcast receiving device 100 may receive information for signaling the broadcast service property from the broadcast transmitting device 300 through the broadcast reception unit 110.

The broadcast receiving device 100 checks whether the specific broadcast service property is changed (S2067). More specifically, the broadcast receiving device 100 may check whether the specific broadcast service property is changed through a controller 150. More specifically, the broadcast receiving device 100 may determine whether the specific broadcast service property is changed. More specifically, the broadcast receiving device 100 may compare previous and current values of the specific broadcast service property and determine whether the specific broadcast service property is changed.

If the specific broadcast service property is changed, the broadcast receiving device 100 notifies the companion device 200 of whether the specific broadcast service property is changed based on information for signaling the broadcast service property (S2069). More specifically, if the specific broadcast service property is changed, the broadcast receiving device 100 may notify the companion device 200 of whether the specific broadcast service property is changed based on information for signaling the broadcast service property through the controller 150.

The companion device 200 requests the specific broadcast service property from the broadcast receiving device 100 (S2071). More specifically, the companion device 200 may request the specific broadcast service property from the broadcast receiving device 100 through a controller. More specifically, if the broadcast receiving device 100 transmits specific broadcast service property notification, the companion device 200 may request the specific broadcast service property from the broadcast receiving device 100.

The broadcast receiving device 100 notifies the companion device 200 of the specific broadcast service property (S2073). The broadcast receiving device 100 may notify the companion device 200 of the specific broadcast service property through the controller 150. More specifically, the broadcast receiving device 100 may notify the companion device of the specific broadcast service property based on the request of the companion device 200. For example, the broadcast receiving device 100 may transmit the specific broadcast service property requested by the companion device 200 to the companion device 200.

In addition, the companion device 200 may acquire a URL capable of acquiring the broadcast service property and acquire the specific broadcast service property based on the URL capable of acquiring the broadcast service property, instead of acquiring the specific broadcast service property from the broadcast receiving device 100. Through such operation, it is possible to prevent the broadcast receiving device 100 from unnecessarily notifying the companion device 200 that the broadcast service property is changed.

The broadcast receiving device 100 may receive an emergency alert of natural disaster, terrorist attack or war through a broadcast network. In addition, the broadcast receiving device 100 may notify a user of the emergency alert of natural disaster, terrorist attack or war. Accordingly, several persons can rapidly and efficiently confirm national disaster. However, if a user does not continuously view the broadcast receiving device 100, the user may not confirm such an emergency alert. Even when the user does not continuously view the broadcast receiving device 100, the user is highly likely to always hold the companion device such as a mobile phone or a tablet. Accordingly, if the broadcast receiving device 100 transmits an emergency alert to the companion device 200 and the companion device 200 displays the emergency alert, the user can rapidly and efficiently confirm the national disaster.

Figure 28:
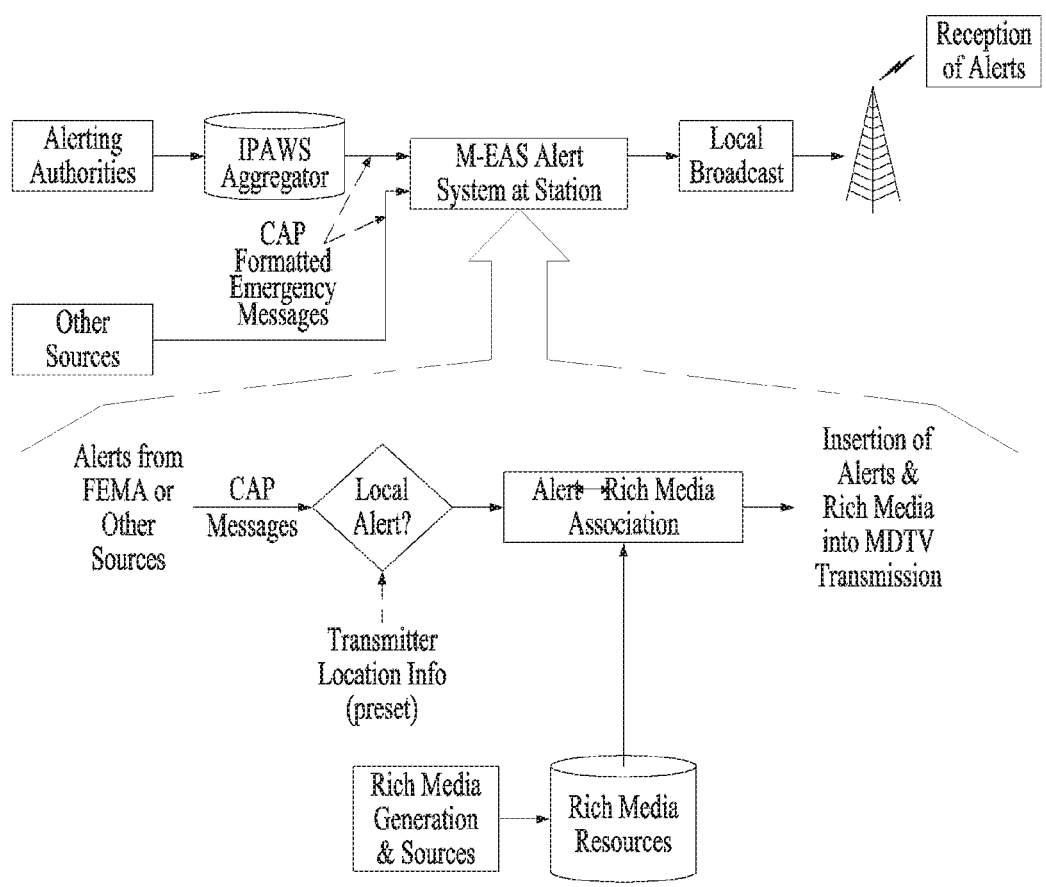
FIG. 28 is a view showing a process of generating and transmitting an emergency alert over a broadcast network according to an embodiment of the present invention.

FIG. 28 is a view showing a process of generating and transmitting an emergency alert over a broadcast network according to an embodiment of the present invention.

An alert system for managing an emergency alert through a broadcast service enables authorities having rights to issue an emergency alert to input emergency information through an integrated public alert & warning system (IPWS) or to receive a common alerting protocol (CAP) message from the other sources. The alert system determines whether the CAP message corresponds to a current area. If the CAP message corresponds to the current area, the CAP message is inserted into a broadcast signal. Accordingly, the CAP message is transmitted through the broadcast signal. Operation for receiving the broadcast signal and transmitting the emergency alert to the user at the broadcast receiving device 100 will now be described.

Figure 29:
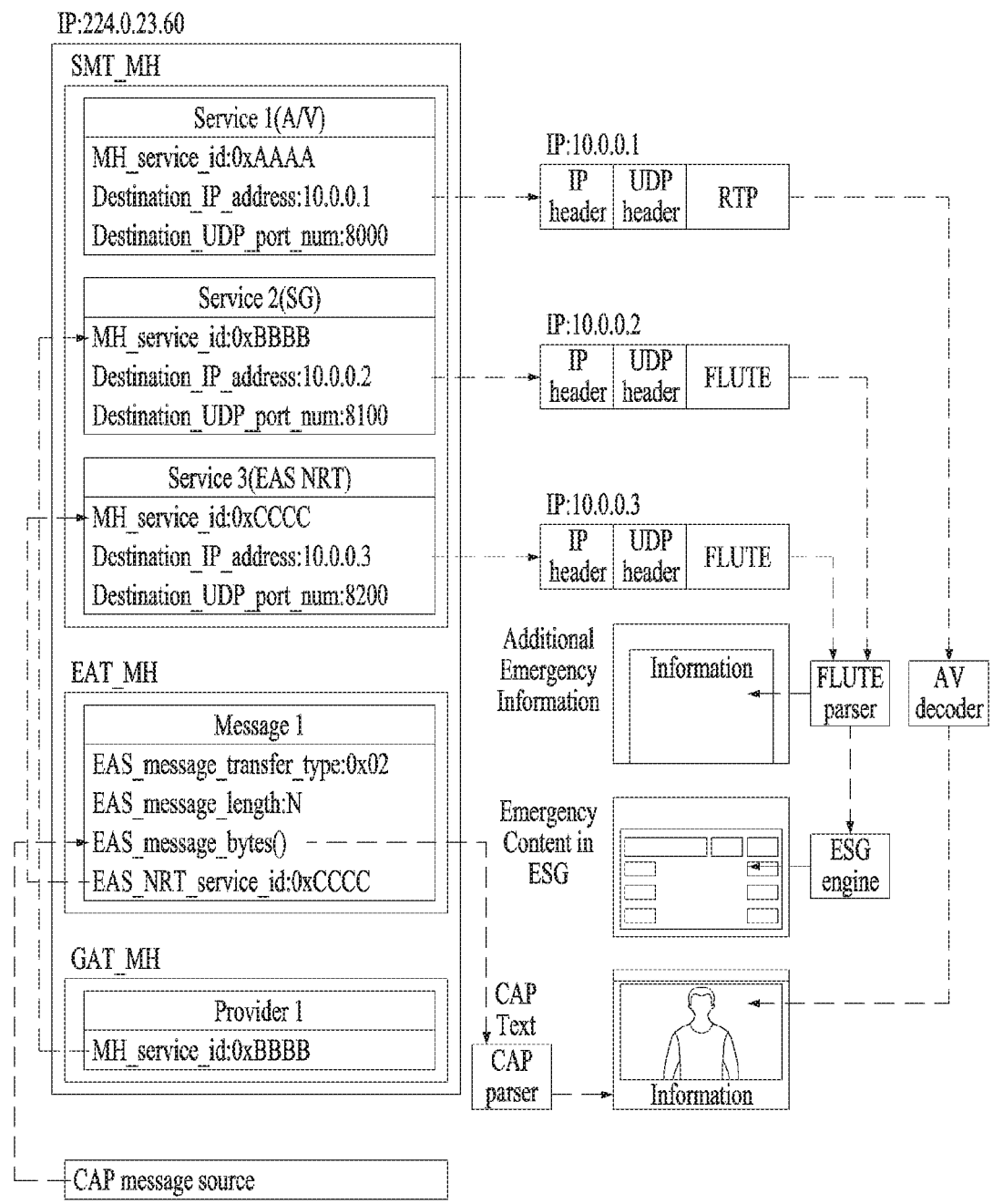
FIG. 29 is a view showing extraction and display of an emergency alert signaled by a broadcast receiving device over a broadcast network according to an embodiment of the present invention.

FIG. 29 is a view showing extraction and display of an emergency alert signaled by a broadcast receiving device over a broadcast network according to an embodiment of the present invention.

A broadcast transmitting device 300 may extract an emergency alert table (EAT) based on a broadcast signal and extract a CAP message from the EAT. In addition, the broadcast transmitting device 300 may acquire additional information related to the emergency alert based on a non-real-time service identifier included in the EAT. More specifically, the broadcast receiving device 100 may acquire the additional information related to the emergency alert based on an EAS_NRT_service_id field in the EAT. More specifically, the broadcast receiving device 100 may acquire information on a FLUTE session for transmitting the additional information related to the emergency alert from a table for signaling a non-real-time service based on the non-real-time service identifier included in the EAT. At this time, the table for signaling the non-real-time service may be a service map table (SMT). The broadcast receiving device 100 may receive the additional information related to the emergency alert from the FLUTE session based on the information on the FLUTE session. The broadcast receiving device 100 may receive an emergency alert and display the emergency alert in a service guide for displaying information on a broadcast service and a broadcast service program. More specifically, the broadcast receiving device 100 may extract a service identifier from a guide access table (GAT), extract information corresponding to the service identifier from the table for signaling the non-real-time service, and receive the emergency alert. In a detailed embodiment, the broadcast receiving device 100 may acquire the information on the FLUTE session of the service corresponding to the service identifier extracted from the GAT. Thereafter, the broadcast receiving device 100 may receive an emergency alert message based on the information on the FLUTE session and display the emergency alert message in the service guide. The format of the CAP is shown in FIG. 30.

FIG. 31 is a view showing a service type, a service ID, a variable indicating an emergency alert state, an emergency alert action and an action argument of an emergency alert service signaled by a broadcast receiving device according to an embodiment of the present invention.

The broadcast receiving device 100 may deliver an emergency alert message to the companion device 200 and the broadcast receiving device 100 may deliver the received message to the companion device 200 without change or deliver only some of the messages received by the broadcast receiving device 100 to the companion device 200.

A UPnP device type of an embodiment of the present invention may be "urn:atsc.org"device:atsc3.0rcvr" and a service type of an EAS UPnP capable of receiving EAS data may be "urn:atsc.org:service:atsc3.0:eas:1".

As shown in (a) of FIG. 31, in an embodiment of the present invention, the service type of an emergency alert service signaled from the broadcast receiving device to the companion device may have a value of atsc3.0:atsc3.0eas:1. In addition, the Service ID information may have a value of urn:atsc.org:service:atsc3.0eas.

As a first embodiment, there is a method of delivering an emergency alert message received by a broadcast receiving device to a companion device without change. The broadcast receiving device may deliver the whole of the received message to the companion device. In this case, the companion device needs to parse the message according to Emergency Alert Message Type.

(b), (d) and (e) of FIG. 31 show the state variable, the action and the argument of the EAS UPnP service of the first embodiment.

As shown in (b) of FIG. 31, in the first embodiment, the state variable may include a variable (EmergencyAlert) indicating an emergency alert and a variable (EmergencyAlertProperty) indicating an emergency alert property. The EmergencyAlert is a required string type state variable and may be described in XMLor JSON, like elements shown in (c) of FIG. 31. In (c) of FIG. 31, the EmergencyAlert may include received time information, message type information and version information.

The received time information may be represented by <dateTime> and may store information on a time when the broadcast receiving device receives the emergency message. The message type information may be represented by <messageType> and may indicate whether the message is of a CAP type or a CMAS type. The version information may be represented by <version> and indicate version information per message type.

The broadcast receiving device may receive and parse the emergency alert message and notify the companion device of the EmergencyAlert state variable in the above-described data format using the eventing protocol. Using the above-described element information, the companion device may parse the emergency alert message according to type.

The EmergencyAlertProperty state variable is a required string type state variable and may be represented in XML or JSON. The EmergencyAlertProperty may have information on the emergency alert property of the emergency alert service. That is, in addition to the type information of the message described in the embodiment of the above-described emergency alert message format, the EmergencyAlertProperty may have actual emergency alert message information. When the EmergencyAlertProperty is delivered to the companion device, an eventing protocol may or may not be used.

As shown in (d) of FIG. 31, the action of the first embodiment may include an action for requesting all emergency alert properties. This action may be represented by a GetAllEmergencyAlertProperty. This action is a required action and is used to acquire all emergency alert messages. This action may be used to acquire a changed emergency alert property. Since the action for requesting all emergency alert properties is used to acquire the content of the emergency alert message, the name of this action may be a GetAllEmergencyAlertMes sage.

As shown in (e) of FIG. 31, the argument for the action of the first embodiment may include an emergency alert property. This may be represented by an EmergencyAlertProperty argument. In the above-described GetAllEmergencyAlertMessage, there may be an EmergencyAlertProperty argument. When the companion device uses a GetAllEmergencyAlertMessage action in order to acquire the content of the emergency alert message received by the broadcast receiving device, the broadcast receiving device may return the content of the emergency alert message through the EmergencyAlertProperty argument.

Figure 32:
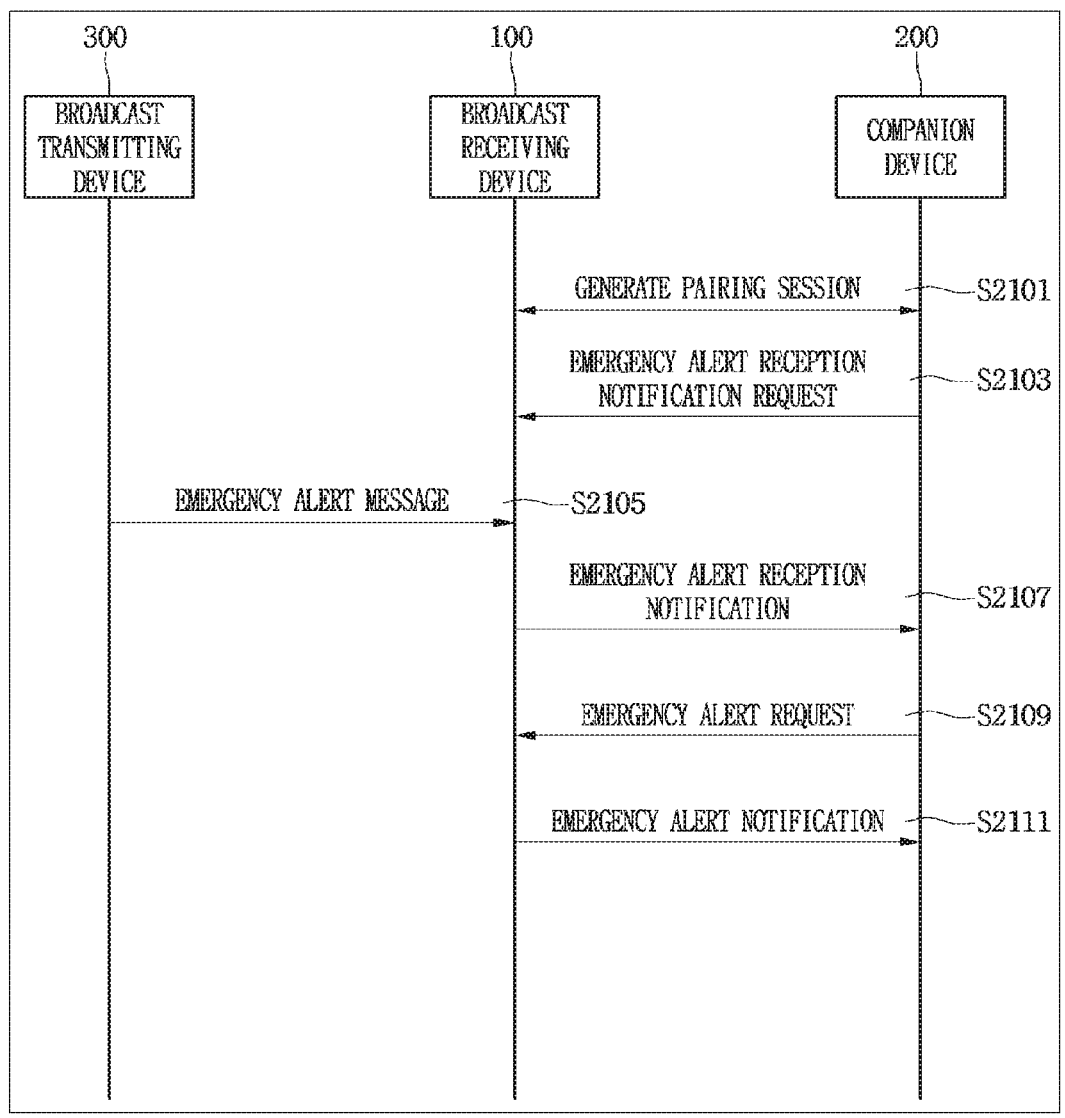
FIG. 32 is a ladder diagram showing operation for signaling an emergency alert from a broadcast receiving device to a companion device according to an embodiment of the present invention.

FIG. 32 is a ladder diagram showing operation for signaling an emergency alert from a broadcast receiving device to a companion device according to an embodiment of the present invention.

The broadcast receiving device 100 and the companion device 200 generates a pairing session (S2101). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the embodiment of FIG. 23.

The companion device 200 requests emergency alert reception notification from the broadcast receiving device 100 (S2103). More specifically, the companion device 200 may request emergency alert reception notification from the broadcast receiving device 100 through a controller. More specifically, the companion device 200 may request emergency alert reception notification from the broadcast receiving device 100 using a UPnP protocol. In a detailed embodiment, the companion device 200 may request subscription to an event for emergency alert reception notification from the broadcast receiving device 100 based on an eventing protocol, in order to receive information indicating that the emergency alert state variable of the emergency alert service is changed.

The broadcast receiving device 100 receives a message including the emergency alert from the broadcast transmitting device 300 (S2105). More specifically, the broadcast receiving device 100 may receive the emergency alert message from the broadcast transmitting device 300 through the broadcast reception unit 110.

The broadcast receiving device 100 notifies the companion device 200 of information on the emergency alert message based on the emergency alert message (S2107). More specifically, the broadcast receiving device 100 may notify the companion device 200 of information on the emergency alert message based on the emergency alert message through the controller 150. In a detailed embodiment, the broadcast receiving device 100 may notify the companion device 200 of the information on the emergency alert message through a variable indicating the information on the emergency alert message. In a detailed embodiment, a variable indicating the information on the emergency alert message may be EmergencyAlert.

The companion device 200 requests the information on the emergency alert from the broadcast receiving device 100 (S2109). More specifically, the companion device 200 may request the information on the emergency alert from the broadcast receiving device 100 through the controller. In a detailed embodiment, the companion device 200 may request the emergency alert through an action for requesting the emergency alert. In a detailed embodiment, the action for requesting the emergency alert may be GetAllEmergencyAlertMes sage.

The broadcast receiving device 100 notifies the companion device 200 of information on the emergency alert including all emergency alert messages (S2111). More specifically, the broadcast receiving device 100 may notify the companion device 200 of information on the emergency alert including all emergency alert messages through the controller 150. However, in this case, since all the emergency alert messages should be received, a load may be caused in operation of the broadcast receiving device 100 and the companion device 200. Accordingly, there is a need for a method of efficiently transmitting the emergency alert message to the companion device 200.

The broadcast receiving device 100 may extract and transmit information necessary for the companion device 200 from the emergency alert message. In a detailed embodiment, the broadcast receiving device 100 may extract at least one of an ID for identifying the emergency alert, information indicating the category of the emergency alert, information indicating the description of the emergency alert, information indicating the area corresponding to the emergency alert, information indicating the urgency of the emergency alert, information on the severity of disaster causing the emergency alert and information indicating the certainty of disaster causing the emergency alert, from the emergency alert message. In a detailed embodiment, the broadcast receiving device 100 may extract at least one of an identifier which is an element for identifying the emergency alert, a category which is an element indicating the category of the emergency alert, a description which is an element indicating the description of the emergency alert, an areaDesc which is an element indicating the area corresponding to the emergency alert, urgency which is an element indicating the urgency of the emergency alert, severity which is an element indicating the severity of disaster causing the emergency alert and certainty which is an element indicating the certainty of disaster causing the emergency alert, from the emergency alert message.

FIG. 33 is a view showing information included in an emergency alert notification message of a broadcast receiving device according to an embodiment of the present invention. In the ladder diagram of the first embodiment, the companion device may request the emergency alert from the broadcast receiving device and may deliver a GetAllEmergencyAlertMessage( ), for example. The broadcast receiving device may return all information included in the emergency alert message to the companion device in response to the GetAllEmergencyAlertMessage( ).

The companion device 200 may determine priority based on the values of the information indicating the urgency of the emergency alert, the information on the severity of disaster causing the emergency alert and the information indicating the certainty of disaster causing the emergency alert. At this time, the companion device 200 may determine the priority of the emergency alert according to information having highest priority among the information indicating the urgency of the emergency alert, the information on the severity of disaster causing the emergency alert and the information indicating the certainty of disaster causing the emergency alert. In a detailed embodiment, the companion device 200 may divide the priority of the emergency alert into three urgency levels according to the information indicating the urgency of the emergency alert, the information on the severity of disaster causing the emergency alert and the information indicating the certainty of disaster causing the emergency alert. For example, the companion device 200 may determine that an urgency element corresponding to Immediate or Expected has highest priority, an urgency element corresponding to Future has middle priority lower than highest priority and higher than lowest priority, an urgency element corresponding to Past has lowest priority and an urgency element corresponding to Unknown corresponds to an initial value. At this time, the initial value may be middle priority lower than highest priority and higher than lowest priority. In addition, the companion device 200 may determine that a severity element corresponding to Extreme or Severe has highest priority, a severity element corresponding to Moderate has middle priority lower than highest priority and higher than lowest priority, a severity element corresponding to Minor has lowest priority and a severity element corresponding to Unknown corresponds to an initial value. At this time, the initial value may be middle priority lower than highest priority and higher than lowest priority. In addition, the companion device 200 may determine that a certainty element corresponding to Very likely or likely has highest priority, a certainty element corresponding to Possible has middle priority lower than highest priority and higher than lowest priority, a certainty element corresponding to Unlikely has lowest priority and an urgency element corresponding to Unknown corresponds to an initial value. At this time, the initial value may be middle priority lower than highest priority and higher than lowest priority.

In another embodiment, the companion device 200 may give a point of the priority of the emergency alert based on the values of the information indicating the urgency of the emergency alert, the information on the severity of disaster causing the emergency alert and the information indicating the certainty of disaster causing the emergency alert and determine the priority of the emergency alert according to a sum of points. In a detailed embodiment, the companion device 200 may give a point to the information indicating the urgency of the emergency alert, the information on the severity of disaster causing the emergency alert and the information indicating the certainty of disaster causing the emergency alert with the same weight. For example, the companion device 200 may give a point of 5 to the urgency element corresponding to Immediate, give a point of 4 to the urgency element corresponding to Expected, give a point of 3 to the urgency element corresponding to Future, give a point of 2 to the urgency element corresponding to Past, and give a point of 1 to the urgency element corresponding to Unknown. In addition, the companion device 200 may give a point of 5 to the severity element corresponding to Extreme, give a point of 4 to the severity element corresponding to Severe, give a point of 3 to the severity element corresponding to Moderate, give a point of 2 to the severity element corresponding to Minor, and give a point of 1 to the urgency element corresponding to Unknown. In addition, the companion device 200 may give a point of 5 to the certainty element corresponding to Very likely, give a point of 4 to the certainty element corresponding to likely, give a point of 3 to the certainty element corresponding to Possible, give a point of 2 to the certainty element corresponding to Unlikely, and give a point of 1 to the certainty element corresponding to Unknown. At this time, the companion device 200 may determine that the emergency alert has highest priority if the sum of points is greater than 10 or less than or equal to 15. In addition, the companion device 200 may determine that the emergency alert has middle priority lower than highest priority and higher than lowest priority if the sum of points is greater than 5 or less than or equal to 10. In addition, the companion device 200 may determine that the emergency alert has lowest priority if the sum of points is greater than 0 or less than or equal to 5.

In another detailed embodiment, the companion device may give a point to the information indicating the urgency of the emergency alert, the information on the severity of disaster causing the emergency alert and the information indicating the certainty of disaster causing the emergency alert with different weights. For example, the companion device 200 may give a point of 9 to the urgency element corresponding to Immediate, give a point of 8 to the urgency element corresponding to Expected, give a point of 7 to the urgency element corresponding to Future, give a point of 5 to the urgency element corresponding to Past, and give a point of 0 to the urgency element corresponding to Unknown. In addition, the companion device 200 may give a point of 5 to the severity element corresponding to Extreme, give a point of 4 to the severity element corresponding to Severe, give a point of 3 to the severity element corresponding to Moderate, give a point of 2 to the severity element corresponding to Minor, and give a point of 0 to the urgency element corresponding to Unknown. In addition, the companion device 200 may give a point of 6 to the certainty element corresponding to \Teri likely, give a point of 5 to the certainty element corresponding to likely, give a point of 4 to the certainty element corresponding to Possible, give a point of 3 to the certainty element corresponding to Unlikely, and give a point of 0 to the certainty element corresponding to Unknown. At this time, the companion device 200 may determine that the emergency alert has highest priority if the sum of points is greater than 10 or less than or equal to 15. In addition, the companion device 200 may determine that the emergency alert has middle priority lower than highest priority and higher than lowest priority if the sum of points is greater than 5 or less than or equal to 10. In addition, the companion device 200 may determine that the emergency alert has lowest priority if the sum of points is greater than 0 or less than or equal to 5.

The companion device 200 may display the emergency alert based on the priority of the emergency alert. In a detailed embodiment, the companion device 200 may change at least one of alarm sound, alarm duration, the number of alarms and an emergency alert display time based on the priority of the emergency alert. For example, the companion device 200 may increase alarm sound as the priority of the emergency alert increases. In addition, the companion device 200 may maintain alarm for a longer period of time as the priority of the emergency alert increases.

In the first embodiment of the present invention, the broadcast receiving device 100 should transmit the whole of the emergency alert message to the companion device. However, the companion device 200 may need some information of the emergency alert message. Accordingly, there is a method of, at the broadcast receiving device 200, transmitting only some information required by the companion device 200 of the emergency alert message. This will be described in the following second embodiment.

FIG. 34 is a view showing a variable indicating the state of an emergency alert signaled by a broadcast reception device, an emergency alert action and an action argument according to another embodiment of the present invention. The following description may correspond to the second embodiment. The UPnP device type of the present invention may be "urn:atsc.org"device:atsc3.0rcvr" and the service type of the EAS UPnP service capable of receiving EAS data may be "urn:atsc.org:service:atsc3.0:eas:1". The Service Type and the Service ID are equal to those of the first embodiment.

The companion device 200 may specify specific information of the emergency alert to be acquired while requesting information on the emergency alert from the broadcast receiving device 100. The specific information of the emergency alert may be one or more of a plurality of pieces of information included in an emergency alert message. At this time, the broadcast receiving device 100 may transmit the specific information of the emergency alert to the companion device 200. To this end, the companion device 200 may use an action for requesting the specific information of the emergency alert. At this time, the action may have a variable for identifying the specific information of the emergency alert as an input argument.

(a) of FIG. 34 shows state variables belonging to the EAS UPnP service of the second embodiment. As shown in the figure, the state variables belonging to the EAS UPnP service may include EmergencyAlert, EmergencyAlertProperty and EmergencyAlertField state variables.

The EmergencyAlert is a required string type state variable and is equal to that of the first embodiment. The EmergencyAlert may have an XML or JSON string type.

The EmergencyAlertProperty is a required string type state variable and a desired field of the message may be received as the EmergencyAlertProperty by inputting the desired field in the EmergencyAlertField. The EmergencyAlertProperty may have an XML or JSON string type.

One or more fields may be input to the EmergencyAlertField, the value of the input field may be received as EmergencyAlertProperty, the whole of the message may be received as EmergencyAlertProperty if the value of the EmergencyAlertField is not given. If the whole of the message is returned, the EmergencyAlertProperty is equal to that of the first embodiment. The EmergencyAlertField may have a CSV, XML or JSON string type.

As shown in (b) of FIG. 34, in the second embodiment, the action for requesting the specific information of the emergency alert may be a GetEmergencyAlertProperty. The GetEmergencyAlertProperty is a required action and is an action for acquiring the whole of the message of the emergency alert. This action may be used to acquire a changed Emergency Alert Property. If this action is used to acquire information included in the emergency alert message, the name of the action may be represented by a GetEmergencyAlertMessage.

As shown in (c) of FIG. 34, in the second embodiment, the GetEmergencyAlertMessage may include EmergencyAlertProperty and EmergencyAlertField arguments. If the GetEmergencyAlertMessage action is used for the companion device to acquire the whole or some of the information included in the emergency alert message received by the broadcast receiving device, only desired alert message information may be requested using an EmergencyAlertField parameter. The broadcast receiving device may return the whole or some of the information included in the emergency alert message through the EmergencyAlertProperty argument.

Figure 35:
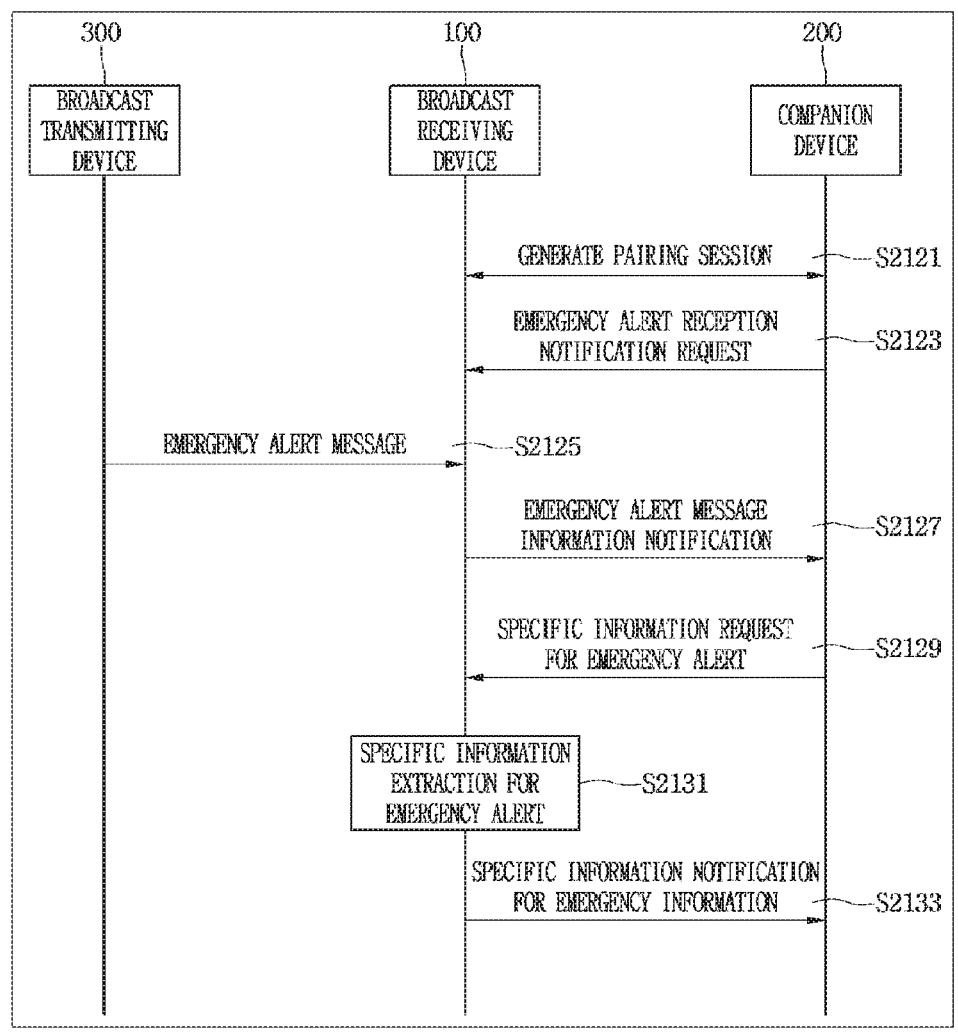
FIG. 35 is a ladder diagram showing operation for signaling an emergency alert from a broadcast receiving device to a companion device according to another embodiment of the present invention.

FIG. 35 is a ladder diagram showing operation for signaling an emergency alert from a broadcast receiving device to a companion device according to another embodiment of the present invention, that is, the method of receiving the emergency alert state variable at the broadcast receiving device and the companion device according to the second embodiment.

The broadcast receiving device 100 and the companion device 200 generate a pairing session (S2121). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described first embodiment.

The companion device 200 requests emergency alert reception notification from the broadcast receiving device 100 (S2123). More specifically, the companion device 200 may request emergency alert reception notification from the broadcast receiving device 100 through the controller, in order to receive information indicating that the emergency alert state variable has changed. Detailed operation of the companion device 200 is equal to that of the first embodiment.

The broadcast receiving device 100 receives an emergency alert message including an emergency alert based on the broadcast service (S2125). More specifically, the broadcast receiving device 100 may receive the emergency alert message including an emergency alert from the broadcast transmitting device 300 through broadcast reception unit 110.

The broadcast receiving device 100 notifies the companion device 200 of information on the emergency alert message based on the emergency alert message (S2127). More specifically, the broadcast receiving device 100 may notify the companion device 200 of the information on the emergency alert message based on the emergency alert message through the controller 150. In addition, in a detailed embodiment, the broadcast receiving device 100 may notify the companion device 200 of the information on the emergency alert message through a variable indicating the information on the emergency alert message. In a detailed embodiment, the broadcast receiving device 100 may notify the companion device 200 of the information on the emergency alert message through a variable indicating the information on the emergency alert message. In a detailed embodiment, the variable indicating the information on the emergency alert message may be the EmergencyAlert.

The companion device 200 requests the specific information of the emergency alert from the broadcast receiving device 100 (S2129). The companion device 200 may request the specific information of the emergency alert from the broadcast receiving device 100 through the controller. At this time, the specific information of the emergency alert may be information on the emergency alert necessary for the companion device 200 to provide an additional function for the emergency alert. In a detailed embodiment, the companion device 200 may request at least one of an ID for identifying the emergency alert, information indicating the category of the emergency alert, information indicating the description of the emergency alert, information indicating the area corresponding to the emergency alert, information indicating the urgency of the emergency alert, information on the severity of disaster causing the emergency alert and information indicating a certainty of disaster causing the emergency alert of the emergency alert message, from the broadcast receiving device 100. In a detailed embodiment, the broadcast receiving device 100 may request at least one of an identifier which is an element for identifying the emergency alert, a category which is an element indicating the category of the emergency alert, a description which is an element indicating the description of the emergency alert, an areaDesc which is an element indicating the area corresponding to the emergency alert, urgency which is an element indicating the urgency of the emergency alert, severity which is an element indicating severity of disaster causing the emergency alert and certainty which is an element indicating the certainty of disaster causing the emergency alert of the emergency alert message, from the broadcast receiving device 100. In a detailed embodiment, the companion device 200 may request the specific information of the emergency alert from the broadcast receiving device 100 using the above-described GetEmergencyAlertMessage and the EmergencyAlertField. For example, the companion device may include a desired field name in an input parameter like a GetEmergencyAlertMessage ("identifier, category, urgency, severity, certainty, description") to perform the GetEmergencyAlertMessage action in order to request some of the emergency alert message from the broadcast receiving device, for example.

The companion device may perform the GetEmergencyAlertMessage action without including a desired field name in an input parameter like a GetEmergencyAlertMessage (" ") in order to request some of the emergency alert message from the broadcast receiving device. That is, an empty string may be used. The broadcast receiving device 100 extracts the specific information of the emergency alert based on the emergency alert message (S2131). More specifically, the broadcast receiving device 100 may extract the specific information of the emergency alert based on the emergency alert message through the controller 150. More specifically, the broadcast receiving device 100 may request the specific information of the emergency alert from the emergency alert message through the controller 150. If the companion device requests the whole of the emergency alert message, the broadcast receiving device may not perform the step of extracting the specific information.

The broadcast receiving device 100 notifies the companion device 200 of the specific information of the emergency alert (S2133). More specifically, the broadcast receiving device 100 may notify the companion device 200 of the specific information of the emergency alert through the controller 150. More specifically, the broadcast receiving device 100 may notify the companion device 200 of the specific information of the emergency alert based on the request of the companion device 200. That is, in response to the GetEmergencyAlertMessage( ) which is the request for the information of the emergency alert of the companion device 200, the broadcast receiving device may deliver the whole or some of the emergency alert message to the companion device. The operation for returning the whole of the emergency alert message at the broadcast receiving device is equal to that of the first embodiment. FIG. 36 is a view showing a variable indicating the state of an emergency alert signaled by a broadcast receiving device, an emergency alert action and an action argument according to another embodiment of the present invention. The following description may correspond to a third embodiment of the present invention.

In addition to delivery of the emergency alert message described in the first and second embodiments, the broadcast receiving device may deliver emergency alert related supplementary information to the companion device. The broadcast receiving device may receive supplementary information other than the message through a service provided by a next-generation hybrid broadcast system. The broadcast receiving device may deliver a Service ID and an Emergency Message ID to the companion device. In addition, the broadcast receiving device may deliver an URL to the companion device and the companion device may receive the emergency alert related supplementary information through a content provider or a broadcast server using the received URL. The service Type and the Service ID are equal to those of the first embodiment.

As shown in (a) of FIG. 36, the state variable may include an EmergencyAlert. The EmergencyAlert is a required variable and may have an XML or JSON string type. For example, the EmergencyAlert may be XML having the element shown in (b) of FIG. 36. <ServiceId> may indicate the ID of the service which is being provided by the PD. <MessageId> may indicate the ID of the emergency alert message received by the PD. <MessageURI> may indicate the URL of the emergency alert related supplementary information on the content server. In addition, <MessageURI> may indicate the location of the emergency alert related supplementary information in the broadcast receiving device when the broadcast receiving device receives the emergency alert related supplementary information through a protocol such as FLUTE. In this case, the embodiment of the URI may be equal to "file://EAS/messageFiles/". If the start of the URI is http:// or https://, the URL of the content server may be indicated and, otherwise the location of the PD may be indicated.

As shown in (c) of FIG. 36, the action for the emergency alert may include an action for requesting the emergency alert information. This may be represented by GetEmergencyAlertInfo. The GetEmergencyAlertInfo action may be used for the companion device to request a ServiceId, a MessageId and a MessageURI for the emergency alert message related supplementary information from the broadcast receiving device after the broadcast receiving device is paired with the companion device.

As shown in (d) of FIG. 36, the action argument may include an emergency alert argument. When the companion device requests a GetEmergencyAlertInfo action, the broadcast receiving device may return the ServiceId, the MessageId and the MessageURI for the emergency alert message related supplementary information through the EmergencyAlert argument.

Figure 37:
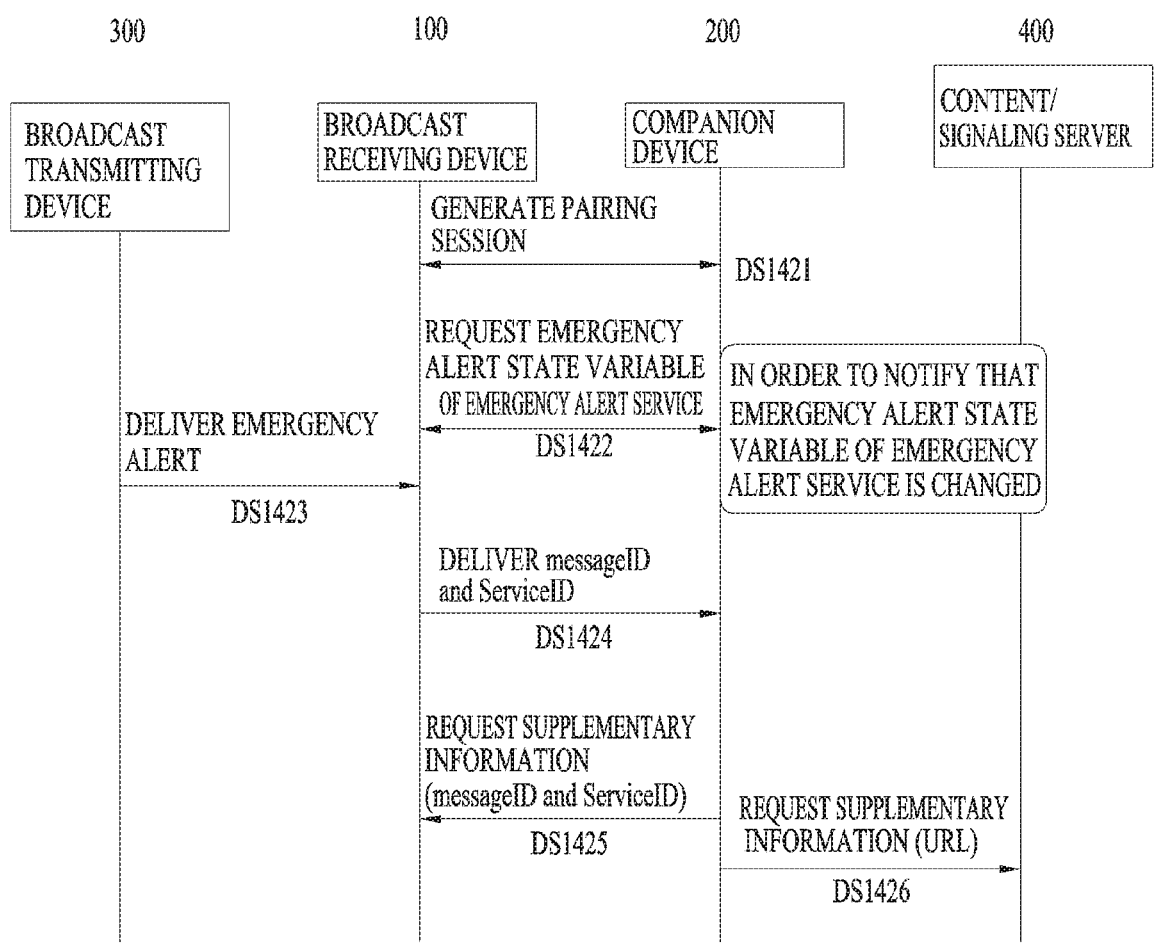
FIG. 37 is a ladder diagram showing operation for signaling an emergency alert from a broadcast receiving device to a companion device according to another embodiment of the present invention.

FIG. 37 is a ladder diagram showing operation for signaling an emergency alert from a broadcast receiving device to a companion device according to another embodiment of the present invention, that is, the method of, at the broadcast receiving device and the companion device, receiving the emergency alert state variable according to the third embodiment.

The broadcast receiving device 100 may generate a pairing session through discovery of and pairing with the companion device 200 such as a mobile phone (DS1421). Discovery and pairing may be equal to those of the above-described embodiment.

The companion device 200 may request subscription to the emergency alert information from the broadcast receiving device 100 (DS1422). The companion device may make a request for notifying the companion device of the emergency alert state variable of the emergency alert service from the broadcast receiving device.

The broadcast transmitting device 300 may notify the broadcast receiving device 100 of the emergency alert message (DS1423).

The broadcast receiving device 100 may notify the companion device 200 of an emergency alert state variable (EmergencyAlert state variable) (DS1424). In the case of a UPnP based architecture, the broadcast receiving device 100 may notify the companion device of the emergency alert state variable according to an "eventing" protocol. Here, the emergency alert state variable may include a messageId, a ServiceId and a messageURL as described above.

The companion device 200 may request supplementary information stored in the broadcast receiving device 100 using the received messageId and ServiceId (DS1425). In addition, the companion device 200 may request the supplementary information through the URL of the content server 400 using the messageURL (DS1426).

The method of delivering the emergency alert message related supplementary information from the companion device 200 through the URI of the content server 400 or the URI of the broadcast receiving device 100 may be equal to that of the above-described embodiment.

FIG. 38 is a view showing a variable indicating the state of an emergency alert signaled by a broadcast receiving device according to another embodiment of the present invention. The following description may correspond to a fourth embodiment.

The broadcast receiving device may configure a UI to be displayed to a user after receiving the emergency alert message. In addition, the emergency alert UI configured by the broadcast receiving device may be displayed on the companion device. In this case, the broadcast receiving device may configure a separate UI for the companion device. An embodiment of using a UPnP will be described.

The fourth embodiment is different from the third embodiment in that the UI configured by the broadcast receiving device may be displayed on the companion device without delivering the emergency alert message received by the broadcast receiving device.

After the broadcast receiving device configures the UI, for example, the broadcast receiving device delivers a UI page configured in relation to the emergency alert message, that is, the URI of a html page, to the companion device and then companion device may access the html page and view the UI related to the emergency alert message.

The service type and the service ID are equal to those of the first embodiment.

(a) of FIG. 38 shows the state variable belonging to the EAS UPnP service of the fourth embodiment. The state variable may include a state variable indicating an emergency alert. This may be represented by an EmergencyAlert. The EmergencyAlert is a required state variable and may have an XML string type. The EmergencyAlert may be used to notify the companion device that the broadcast receiving device receives the emergency alert message. The EmergencyAlert may be XML having the element shown in (b) of FIG. 38. The state variable indicating the emergency alert may include information on a service identifier, a message identifier and a location list.

The service identifier may be represented by <ServiceId> and may indicate the identifier of the service which is being provided by the broadcast receiving device. The message identifier may be represented by <MessageId> and may indicate the identifier of the emergency alert message received by the broadcast receiving device. The location list may be represented by <URIList> and may indicate the list of URIs indicating the location of the html page using the emergency alert message received by the broadcast receiving device. The location information included in the location list may be represented by <URI> and may indicate the location of the html page configuring the UI using the emergency alert message received by the broadcast receiving device. The location information may be included in <URIList> and there may be one or more pieces of location information. The state variable indicating the emergency alert may be used for the broadcast receiving device to receive and deliver the emergency alert message to the companion device.

In addition, the state variable may include a state variable indicating an emergency alert location. The state variable indicating the emergency alert location may be represented by an A_ARG_TYPE_EmergencyAlertURI. The A_ARG_TYPE_EmergencyAlertURI may be associated with an output argument of an action for the location of the emergency alert and the embodiment of the data format is shown in (c) of FIG. 38.

FIG. 39 is a view showing an action and action argument of an emergency alert signaled by a broadcast receiving device according to another embodiment of the present invention. The following description may correspond to the action and action argument for the emergency alert used in the fourth embodiment of the present invention.

As shown in (a) of FIG. 39, the action for the emergency alert used in the fourth embodiment may include an action for requesting the emergency alert and an action for requesting the location of the emergency alert.

The action for requesting the emergency alert may be represented by a GetEmergencyAlert action. The companion device may check whether the broadcast receiving device receives the emergency using the GetEmergencyAlert action alert message after pairing. The companion device may use the GetEmergencyAlert action after the broadcast receiving device has received the emergency alert message.

The action for requesting the location of the emergency alert may be represented by GetEmergencyAlertURI action. The companion device may acquire the URI of the UI page configured by the broadcast receiving device using the GetEmergencyAlertURI action.

As shown in (b) and (c) of FIG. 39, the argument of the action for emergency alert used in the fourth embodiment may include an emergency alert argument and an emergency alert location argument.

The emergency alert argument may be represented by an EmergencyAlert argument. When the companion device executes the GetEmergencyAlert action, the broadcast receiving device may deliver emergency alert message related information through the EmergencyAlert argument.

The emergency alert location argument may be represented by an EmergencyAlertURI argument. When the companion device executes the GetEmergencyAlertURI action, the broadcast receiving device may deliver URI information of the UI configured by the broadcast receiving device to the companion device through the EmergencyAlertURI argument. Although this URI information may be obtained through eventing of GetEmergencyAlert( ) action or EmergencyAlert state variable, since the GetEmergencyAlertURI( ) action does not deliver information other than the URI, transmission efficiency may increase. Alternatively, an A_ARG_TYPE_EmergencyAlertURI state variable may be defined as an eventing variable and may be delivered to the companion device without a separate action.

Figure 40:
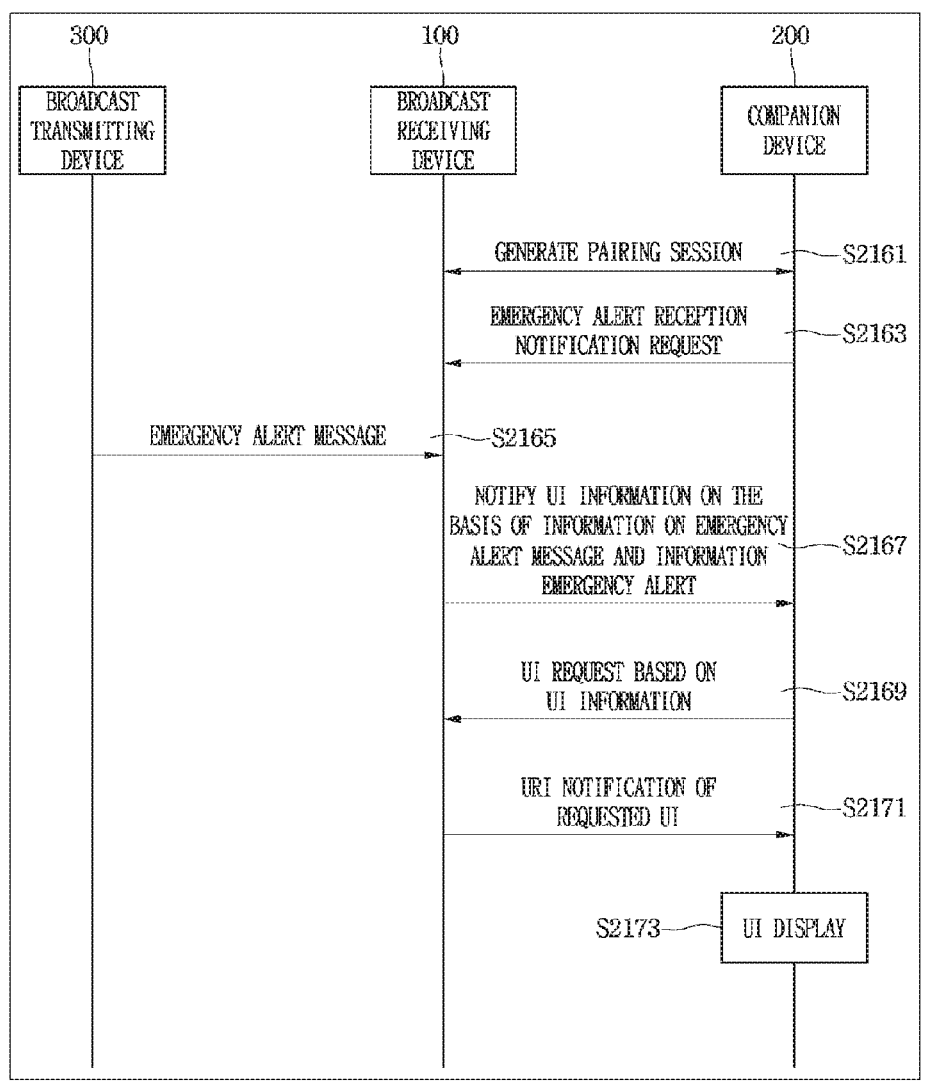
FIG. 40 is a ladder diagram showing operation for signaling an emergency alert from a broadcast receiving device to a companion device according to another embodiment of the present invention.

FIG. 40 is a ladder diagram showing operation for signaling an emergency alert from a broadcast receiving device to a companion device according to another embodiment of the present invention, that is, a ladder diagram according to the fourth embodiment.

The broadcast receiving device 100 and the companion device 200 generates a pairing session (S2161). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication as described above.

The companion device 200 requests emergency alert reception notification from the broadcast receiving device 100 (S2163). More specifically, the companion device 200 may request emergency alert reception notification from the broadcast receiving device 100 through the controller, such that the companion device is notified that the state variable indicating the emergency alert of the emergency alert service is changed.

The broadcast receiving device 100 receives the emergency alert message based on the broadcast service (S2165). More specifically, the broadcast receiving device 100 may receive the emergency alert message from the broadcast transmitting device 300 through the broadcast reception unit 110.

The broadcast receiving device 100 notifies the companion device 200 of the information on the emergency alert message and the UI information of the emergency alert based on the emergency alert message (S2167). More specifically, the broadcast receiving device 100 may notify the companion device 200 of the information on the emergency alert message and the UI information of the emergency alert based on the emergency alert message through the controller 150. At this time, the UI information of the emergency alert may include a list of UIs of the emergency alert.

The companion device 200 requests the UI of the emergency alert from the broadcast receiving device 100 based on the UI information of the emergency alert (S2169). More specifically, the companion device 200 may request the UI information of the emergency alert from the broadcast receiving device 100 through the controller based on the UI information of the emergency alert.

The broadcast receiving device 100 may transmit a URI capable of acquiring the UI of the emergency alert to the companion device 200 based on the request of the companion device 200 (S2171). The broadcast receiving device 100 may transmit a URI capable of acquiring the UI of the emergency alert to the companion device 200 through the controller 150 based on the request of the companion device 200.

The companion device 200 displays the UI of the emergency alert based on the URI capable of acquiring the UI of the emergency alert (S2173). The companion device 200 may display the UI of the emergency alert through the controller based on the URI capable of acquiring the UI of the emergency alert. More specifically, the companion device 200 may acquire the UI based on the URI capable of acquiring the UI of the emergency alert. At this time, the companion device 200 may acquire the UI of the emergency alert from an external server. For example, the companion device 200 may receive at least one of an image file, an HTML file and an XML file for the UI of the emergency alert from an external server. At this time, the external server may be the content/signaling server 400. In another detailed embodiment, the companion device 200 may pre-store the UIs of the emergency alert and retrieve the UI corresponding to the URI among the stored UIs. In addition, the companion device 200 may display the UI of the emergency alert acquired through such operation. Since the companion device 200 processes the emergency alert through such operation, it is possible to reduce the load of the companion device 200. Although the companion device requires a parser for parsing the emergency message in the first embodiment, the companion device used in the fourth embodiment does not require a parser for parsing a separate emergency message, because the companion device receives a UI obtained by reconfiguring a parsed emergency message from an external device.

Figure 41:
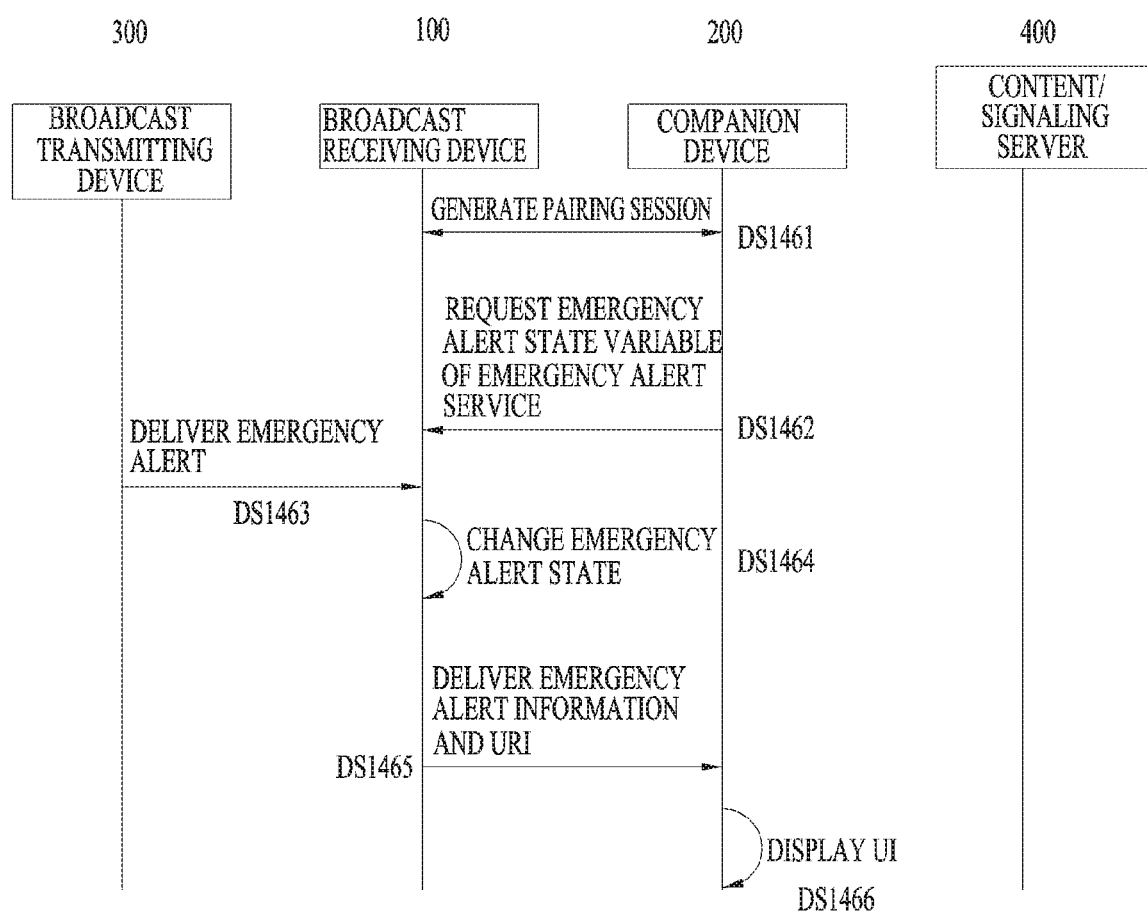
FIG. 41 is a ladder diagram showing operation for signaling an emergency alert from a broadcast receiving device to a companion device according to another embodiment of the present invention.

FIG. 41 is a ladder diagram showing operation for signaling an emergency alert from a broadcast receiving device to a companion device according to another embodiment of the present invention, that is, a ladder diagram of the case of using a GetEmergencyAlertURI action in the fourth embodiment.

The broadcast receiving device 100 and the companion device 200 generate a pairing session (DS1461). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication as described above.

The companion device 200 requests emergency alert reception notification from the broadcast receiving device 100 (DS1462). More specifically, the companion device 200 may request emergency alert reception notification from the broadcast receiving device 100 through the controller, such that the companion device is notified that the state variable indicating the emergency alert of the emergency alert service is changed.

The broadcast receiving device 100 receives the emergency alert message including the emergency alert based on the broadcast service (DS1463). More specifically, the broadcast receiving device 100 may receive the emergency alert message including the emergency alert from the broadcast transmitting device 300 through the broadcast reception unit 110.

The broadcast receiving device 100 may change the emergency alert state after receiving the emergency alert message including the emergency alert (DS1464). More specifically, the broadcast receiving device 100 may configure a UI for representing the emergency alert message and related supplementary information using a remote UI service after receiving the emergency alert message including the emergency alert. As another embodiment of this method, there is a method of using a remote UI service of a UPnP. The broadcast receiving device may notify the companion device that the emergency alert is generated by changing the emergency alert state.

The broadcast receiving device 100 may notify the companion device 200 of the information on the emergency alert message and the URI information of the emergency alert based on the emergency alert message (DS1465). More specifically, the broadcast receiving device 100 may notify the companion device 200 of the information on the emergency alert message and the URI information of the emergency alert through the controller 150 based on the emergency alert message.

The companion device 200 displays the UI of the emergency alert based on the URI capable of acquiring the UI of the emergency alert (DS1466). The companion device 200 may display the UI of the emergency alert through the controller based on the URI capable of acquiring the UI of the emergency alert. More specifically, the companion device 200 may acquire the UI based on the URI capable of acquiring the UI of the emergency alert. At this time, the companion device 200 may acquire the UI of the emergency alert from an external server. For example, the companion device 200 may receive at least one of an image file, an HTML file and an XML file for the UI of the emergency alert from an external server. At this time, the external server may be the content/signaling server 400. In another detailed embodiment, the companion device 200 may pre-store the UIs of the emergency alert and retrieve the UI corresponding to the URI among the stored UIs. In addition, the companion device 200 may display the UI of the emergency alert acquired through such operation. Since the companion device 200 processes the emergency alert through such operation, it is possible to reduce the load of the companion device 200. Although the companion device requires a parser for parsing the emergency message in the first embodiment, the companion device used in the fourth embodiment does not require a parser for parsing a separate emergency message, because the companion device receives a UI obtained by reconfiguring a parsed emergency message from an external device.

The companion device 200 may provide an additional service associated with the broadcast service. To this end, the broadcast receiving device 100 may transmit NRT data to the companion device 200. In particular, the broadcast receiving device 100 may transmit information for signaling a content item for an NRT service to the companion device 200. The content item is a set of one or a plurality of files necessary for NRT service presentation. More specifically, the content item is a set of one or a plurality of files intended to be treated by an NRT service provider as a single unit for NRT service presentation.

FIG. 42 is a view showing NRT data signaling information for a companion device according to an embodiment of the present invention.

In the present invention, an embodiment of using a UPnP in a method of signaling content items of an NRT service received by a broadcast receiving device to a companion device through a broadcast will be described. A module for signaling NRT items delivered from the broadcast receiving device to the companion device may be referred to as an NRT data signaling service. In an embodiment of using a UPnP, an NRTDataSignaling Service may be defined as shown in (a) of FIG. 42. The service type of the NRT data signaling service may be defined as atsc3.0:nrtdatasignaling:1 and a service identifier may be defined as urn: atsc.org: serviceId:atsc3.0:nrtdatasignaling.

(b) of FIG. 42 shows an XML schema structure of NRT data properties used in the embodiment of NRT data signaling. The NRT data signaling information for the companion device 200 may include at least one of an identifier for identifying NRT data, consumption model information indicating a consumption model of NRT data, downloading status information indicating a status in which the broadcast receiving device 100 downloads NRT data and information on a content item configuring NRT data. The information on the content item may include at least one of an identifier for identifying a content item, a content item name indicating the name of the content item, size information indicating the size of the content item, playback length information indicating a playback time of the content item and URL information indicating an URL capable of downloading the content item from a content server. The NRT data signaling information for the companion device 200 may be described in XML.

The NRT data signaling information for the companion device 200 may be described in XML in the embodiment of FIG. 42. In addition, in the embodiment of FIG. 42, the NRT data signaling information for the companion device 200 may include at least one of a DataId, a ConsumptionModel, a DownloadingStatus and a ContentItem.

The DataId indicates the unique identifier of the NRT. In a detailed embodiment, only one DataId may be present. In a detailed embodiment, there may be one DataId. The DataId may have an unsigned short data type.

The ConsumptionModel indicates the consumption model of the NRT data. The ConsumptionModel may indicate at least one of Browse & Download, Portal, Push, Triggered, Push Scripted, Portal Scripted and Electronic Program Guide (EPG). More specifically, Browse & Download indicates that the NRT services provides downloadable content. In addition, Portal indicates that the NRT service provides an experience similar to a web browser. In addition, Push indicates that the NRT service provides content based on a user request. Triggered indicates that the NRT services provides an application synchronized with an A/V program. Push Scripted indicates that a declarative object (DO) indicating the application of the NRT service provides a specific UI while providing content based on a user request. Portal Scripted indicates that the DO provides a specific UI while providing an experience similar to the web browser. EPG indicates that the NRT service provides content consumed by an EPG application of the broadcast receiving device 100. In a detailed embodiment, there may be one ConsumptionModel. In a detailed embodiment, the ConsumptionModel may have a string data type.

The DownloadingStatus indicates the downloading status of the NRT data of the broadcast receiving device 100. The downloading status of the NRT data may indicate at least one of Downloading indicating that downloading is being performed, Completed indicating that downloading is completed and Error indicating downloading failure. In a detailed embodiment, there may be one DownloadingStatus. In a detailed embodiment, DownloadingStatus may have a string data type.

The ContentItem indicates a content item included in the NRT data. In a detailed embodiment, the NRT data may include one or a plurality of content items. Accordingly, there may be one or a plurality of ContentItems.

The ContentItem may include at least one of a ContentItemId, a ContentItemName, a ContentItemSize, a PlaybackLength and an URL as attributes.

The ContentItemId is an identifier for identifying the content item. In a detailed embodiment, there may be one ContentItemId. In a detailed embodiment, contentItemId may have an unsigned short data type.

The ContentItemName indicates the name of the content item. In a detailed embodiment, there may be one or a plurality of ContentItemNames. In a detailed embodiment, ContentItemName may have a string data type.

The ContentItemSize indicates the size of the content item. In a detailed embodiment, the ContentItemSize may be represented in byte units. In a detailed embodiment, there may be one ContentItemSize. In addition, in a detailed embodiment, the ContentItemSize may have an unsigned short data type.

The PlaybackLength indicates the playback length of the content item. The PlaybackLength may be present only when the content item is video or audio. In a detailed embodiment, there may be one or a plurality of PlaybackLengths. In a detailed embodiment, PlaybackLength may have an unsigned short data type.

The URL indicate an URL capable of receiving the content item from the content server.

Figure 43:
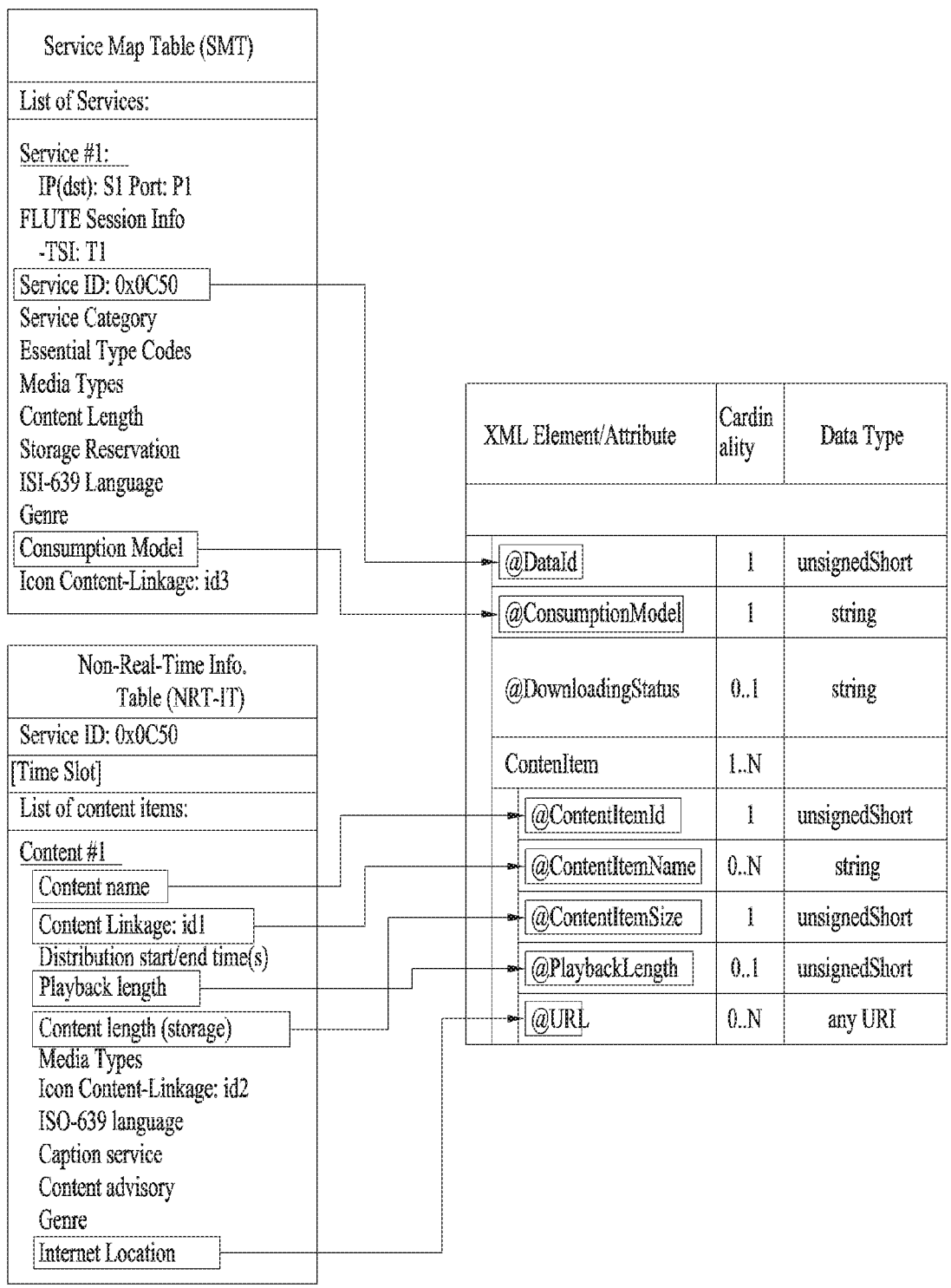
FIG. 43 is a view showing a broadcast receiving apparatus generating NRT data signaling information for a companion device based on NRT data signaling information for the broadcast receiving device according to an embodiment of the present invention.

FIG. 43 is a view showing a broadcast receiving apparatus generating NRT data signaling information for a companion device based on NRT data signaling information for the broadcast receiving device according to an embodiment of the present invention.

The broadcast receiving device 100 may receive NRT data signaling information for broadcast receiving device 100 based on the broadcast signal. The broadcast receiving device 100 may transmit the NRT data signaling information for the companion device 200 based on the NRT data signaling information for the broadcasting receiving device 100. More specifically, the broadcast receiving device 100 may generate NRT signaling information for the companion device 200 based on the NRT data signaling information for the broadcasting receiving device 100. The broadcast receiving device 100 may transmit the generated NRT data signaling information to the companion device 200. At this time, the broadcast receiving device 100 may extract at least one of an identifier for identifying NRT data, consumption model information indicating a consumption model of NRT data and information on a content item included in NRT data from the NRT data signaling information for the broadcasting receiving device 100. The information on the content item may include at least one of a content item name indicating the name of the content item, an identifier for identifying a content item, playback length information indicating a playback length of the content item and size information indicating the size of the content item.

In a detailed embodiment, the signaling information for the broadcast receiving device 100 may be divided into information for signaling NRT data and information for signaling the content item included in the NRT data. More specifically, the information for signaling the NRT data may be a service map table (SMT) of the ATSC standard. In addition, the information for signaling the content item may be a non-real-time information table (NRT-IT) of the ATSC standard. For example, the broadcast receiving device 100 may extract a service identifier corresponding to the NRT data from the SMT and map the service identifier to the identifier of the NRT data. In addition, the broadcast receiving device 100 may extract a consumption model corresponding to the NRT data from the SMT and map the consumption model to consumption model information. In addition, the broadcast receiving device 100 may extract a content item from the NRT IT and map the content item to a content item name. In addition, the broadcast receiving device 100 may extract linkage from the NRT IT and map the linkage to a content identifier. In addition, the broadcast receiving device 100 may extract a playback length from the NRT IT and map the playback length to playback length information. In addition, the broadcast receiving device 100 may extract a content length from the NRT IT and map the content length to a content item size. In addition, the broadcast receiving device 100 may extract an Internet location from the NRT IT and map the Internet location to an URL.

Figure 44:
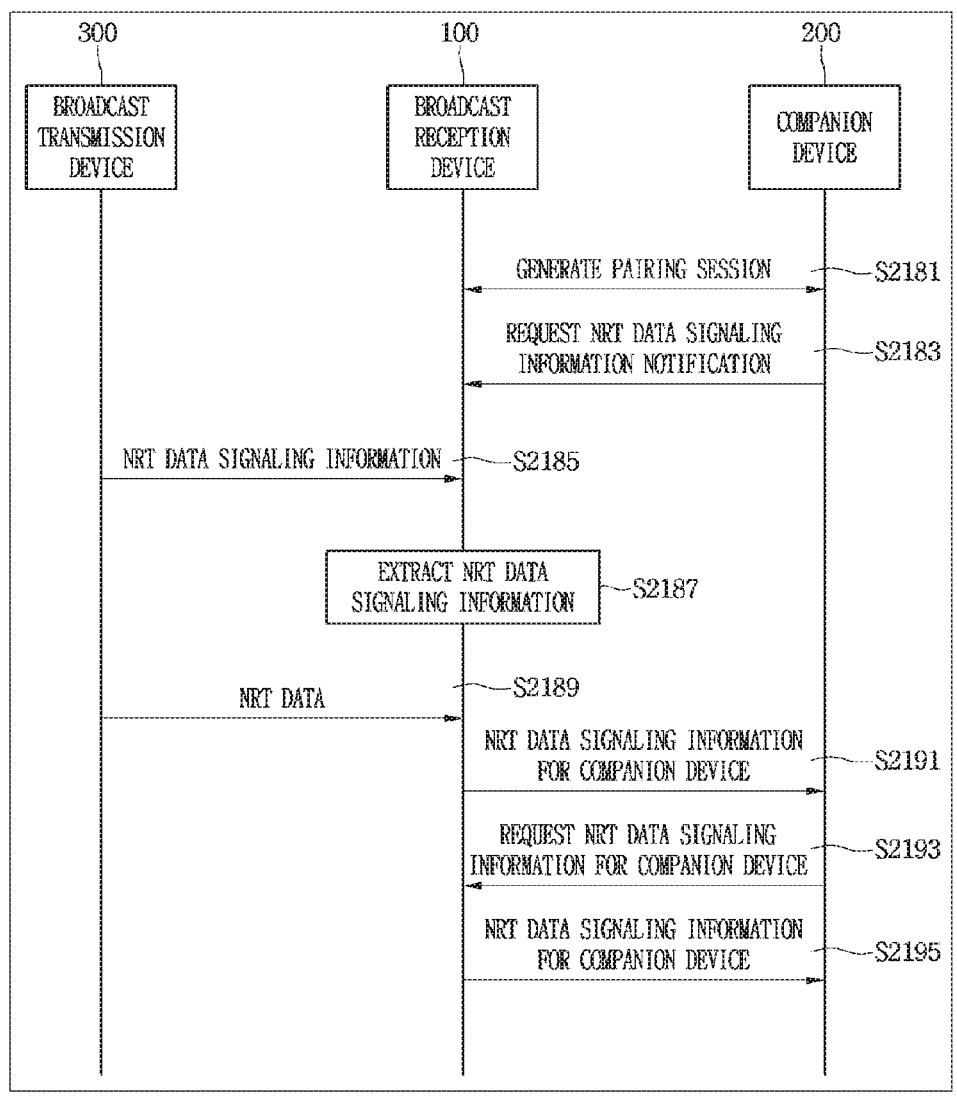
FIG. 44 is a view showing signaling of NRT data from a broadcast receiving device to a companion device according to an embodiment of the present invention.

FIG. 44 is a view showing signaling of NRT data from a broadcast receiving device to a companion device according to an embodiment of the present invention.

The broadcast receiving device 100 and the companion device 200 generate a pairing session (S2181). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. In addition, the broadcast receiving device 100 may generate the pairing session based on compatibility with the application of the companion device 200 in the process of generating the pairing session. More specifically, the broadcast receiving device 100 may generate the pairing session when compatibility with the application of the companion device 200 is possible. More specifically, in order to check compatibility, the broadcast receiving device 100 may check at least one of the application version and application identifier of the companion device 200. In another detailed embodiment, the companion device 200 may check compatibility with the application of the broadcast receiving device 100 in the process of generating the pairing session. More specifically, the companion device 200 may generate the pairing session when compatibility with the application of the broadcast receiving device 100 is possible. More specifically, in order to check compatibility, the companion device 200 may check at least one of the application version and application identifier of the broadcast receiving device 100.

The companion device 200 requests NRT data signaling information notification from broadcast receiving device 100 (S2183). More specifically, the companion device 200 may request NRT data signaling information notification from broadcast receiving device 100 through the controller. More specifically, the companion device 200 may notify NRT data signaling information notification from broadcast receiving device 100 using a UPnP protocol. In a detailed embodiment, the companion device 200 may request subscription to the properties of the NRT data from the broadcast receiving device 100 based an eventing protocol.

The broadcast receiving device 100 receives the NRT data signaling information for the broadcasting receiving device 100 based on the broadcast service (S2185). More specifically, the broadcast receiving device 100 may receive the NRT data signaling information from the broadcast transmitting device 300 through the broadcast reception unit 110.

The broadcast receiving device 100 receives the NRT data based on the NRT data signaling information (S2187, S2189). More specifically, the broadcast receiving device 100 may receive the NRT data from the broadcast network based on the NRT data signaling information through the broadcast reception unit 110. In addition, the broadcast receiving device 100 may receive the NRT data from the Internet protocol network based on the NRT data signaling information through the IP communication unit 130.

The broadcast receiving device 100 notifies the companion device 200 of the NRT data signaling information for the companion device 200 based on the NRT data signaling information for the broadcasting receiving device 100 (S2191). More specifically, the broadcast receiving device 100 may notify the companion device 200 of the NRT data signaling information for the companion device 200 based on the NRT data signaling information for the broadcasting receiving device 100 through the controller 150. The broadcast receiving device 100 may generate the NRT data signaling information for the companion device 200 based on the NRT data signaling information as described above. The broadcast receiving device 100 may transmit the generated NRT data signaling information for the companion device 200 to the companion device 200. In addition, as described above, the broadcast receiving device 100 may generate the NRT data signaling information for the companion device 200 including the NRT data properties requested by the companion device 200.

As described above, the companion device 200 requests the NRT data signaling information for the companion device 200 from the broadcast receiving device 100 and acquire the NRT data signaling information for the companion device 200 (S2193, S2195). More specifically, the companion device 200 may transmit the identifier for identifying the NRT data and receive NRT data signaling information corresponding to the identifier. At this time, the broadcast receiving device 100 and the companion device 200 may the above-described actions and variables.

The companion device 200 may receive the NRT data based on the NRT data signaling information. More specifically, the companion device 200 may receive the NRT data based on the NRT data signaling information through the Internet protocol network. In another detailed embodiment, the companion device 200 may receive the NRT data from the broadcast receiving device 100 based on the NRT data signaling information. Even when the companion device 200 cannot directly receive the broadcast service and cannot access a server for providing the NRT data through the Internet protocol network, the companion device 200 can receive the NRT data.

Figure 45:
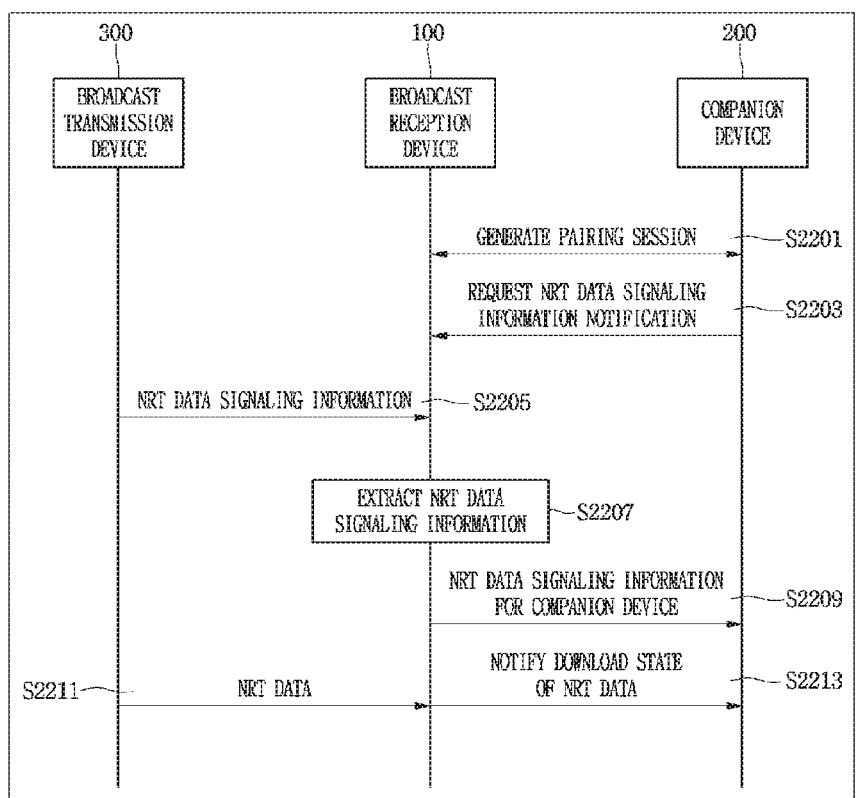
FIG. 45 is a view showing signaling of NRT data from a broadcast receiving device to a companion device according to another embodiment of the present invention.

FIG. 45 is a view showing signaling of NRT data from a broadcast receiving device to a companion device according to another embodiment of the present invention.

The broadcast receiving device 100 and the companion device 200 generate a pairing session (S2201). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described embodiment.

The companion device 200 requests NRT data signaling information notification from the broadcast receiving device 100 (S2203). More specifically, the companion device 200 may request NRT data signaling information notification from the broadcast receiving device 100 through the controller. More specifically, the companion device 200 may request NRT data signaling information notification from the broadcast receiving device 100 using a UPnP protocol. In a detailed embodiment, the companion device 200 may request subscription to an event for NRT data properties from the broadcast receiving device 100 based on an eventing protocol.

The broadcast receiving device 100 receives the NRT data signaling information for the broadcasting receiving device 100 based on the broadcast service (S2205). More specifically, the broadcast receiving device 100 may receive the NRT data signaling information from the broadcast transmitting device 300 through the broadcast reception unit 110.

The broadcast receiving device 100 notifies the companion device 200 of NRT data signaling information for the companion device 200 based on the NRT data signaling information for the broadcasting receiving device 100 (S2207, S2209). More specifically, the broadcast receiving device 100 may notify the companion device 200 of the NRT data signaling information for the companion device 200 based on the NRT data signaling information for the broadcasting receiving device 100 through the controller 150. The broadcast receiving device 100 may generate the NRT data signaling information for the companion device 200 based on the NRT data signaling information as described above. The broadcast receiving device 100 may transmit the generated NRT data signaling information for the companion device 200 to the companion device 200. In addition, as described above, the broadcast receiving device 100 may generate the NRT data signaling information for the companion device 200 including the NRT data properties requested by the companion device 200.

The broadcast receiving device 100 begins to receive the NRT data based on the NRT data signaling information (S2211). More specifically, the broadcast receiving device 100 may begin to receive the NRT data from a broadcast network through the broadcast reception unit 110 based on the NRT data signaling information. In addition, the broadcast receiving device 100 may begin to receive the NRT data from an Internet protocol network through the IP communication unit 130 based on the NRT data signaling information.

The broadcast receiving device 100 notifies the companion device 200 of the downloading status of the NRT data (S2213). The broadcast receiving device 100 may notify the companion device 200 of the downloading status of the NRT data through the controller 150. The broadcast receiving device 100 may display the downloading status as Downloading indicating that downloading is being performed, Completed indicating that downloading is completed or Error indicating downloading failure. At this time, the broadcast receiving device 100 may display a percentage of downloading completed if the NRT data is being downloaded. For example, the broadcast receiving device 100 may display the downloading status "30% completed" during downloading. In addition, the broadcast receiving device 100 may notify the companion device 200 of the downloading status of the NRT data at a predetermined interval. For example, the broadcast receiving device 100 may notify the companion device 200 of the downloading status of the NRT data at an interval of 10 seconds. At this time, a notification period may be determined based on the request of the companion device 200. For example, the companion device 200 may transmit the notification period while requesting NRT data signaling information notification from the broadcast receiving device 100. In addition, the broadcast receiving device 100 notify the companion device 200 of the downloading status of the NRT data according to the notification period requested by the companion device 200. In addition, the broadcast receiving device 100 may notify the companion device 200 of the downloading status of the NRT data based on the percentage of downloading completed. For example, when downloading of the NRT data is completed by 30%, 60% and 100%, the broadcast receiving device 100 notify the companion device 200 of the downloading status of the NRT data.

The companion device 200 may receive the NRT data based on the NRT data signaling information. In a detailed embodiment, upon receiving information indicating that downloading of the NRT data is completed from the broadcast receiving device 100, the companion device 200 may receive the NRT data from the broadcast receiving device 100 based on the NRT data signaling information. Therefore, even when the companion device 200 cannot directly receive the broadcast service and cannot access the server for providing the NRT server through the Internet protocol network, the companion device 200 may receive the NRT data. In addition, as soon as downloading of the NRT data of the broadcast receiving device 100 is completed, the companion device 200 may request the NRT data from the broadcast receiving device 100.

The broadcast receiving device 100 may signal or transmit a media component to the companion device 200. There are many types of companion devices 200 capable of interoperating with the broadcast receiving device 100. The various types of companion device 200 have different capabilities. Accordingly, it is difficult to provide media components presentable by all companion devices 200. In addition, if the companion device 200 cannot present the received media component, a user experiences inconvenience. In order to solve this problem, the broadcast receiving device 100 needs to signal device capability information indicating the capability of the device used to present the media component to the companion device 200.

Figure 46:
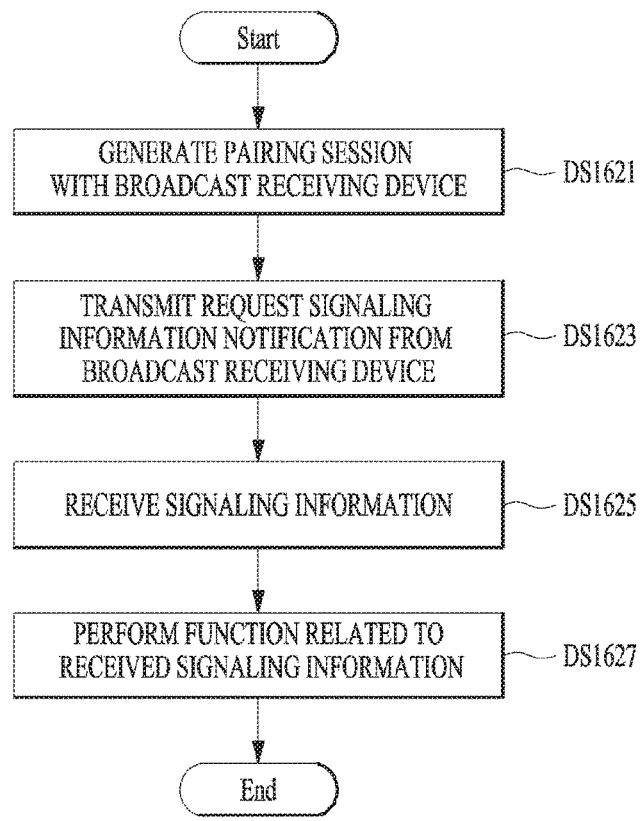
FIG. 46 is a flowchart illustrating operation of a companion device according to an embodiment of the present invention.

FIG. 46 is a flowchart illustrating operation of a companion device according to an embodiment of the present invention. The companion device according to the embodiment of the present invention may interoperate with the broadcast reception device for receiving the broadcast service.

The broadcast reception device 100 and the companion device 200 generate a pairing session (DS1621). More specifically, the broadcast reception device 100 may generate the pairing session with the companion device 200 through an IP communication unit 130. More specifically, the companion device 200 may generate the pairing session with the broadcast reception device 100 through a communication unit. More specifically, the broadcast reception device 100 and the companion device 200 may generate a pairing session for bidirectional communication. More specifically, the broadcast reception device 100 and the companion device 200 may generate a pairing session using a UPnP protocol. In a detailed embodiment, the broadcast reception device 100 may find the companion device 200 using the discovery protocol of a UPnP. For example, the broadcast reception device 100 may multicast a discovery message for finding a companion device through a well-known IP address. At this time, the companion device 200, which has received the multicast message, may request a description from the broadcast reception device 100. The broadcast reception device 100 may provide the description to the companion device 200 based on the request for the description of the companion device 200. The companion device 200 may access the broadcast reception device 100 based on the description. In another detailed embodiment, the companion device 200 may find the broadcast reception device 100 using the discovery protocol of the UPnP. For example, the companion device 200 may multicast a message for finding the broadcast reception device 100 for interoperation through a well-known IP address. At this time, the broadcast reception device may respond to the multicast message using a discovery message. At this time, the companion device 200, which has received the discovery message, may request a description from the broadcast reception device 100. The broadcast reception device 100 may provide the description to the companion device 200 based on the request for the description of the companion device 200. The companion device 200 may access the broadcast reception device 100 based on the description.

The companion device may transmit a request for notification of signaling information to the broadcast reception device (DS1623). More specifically, the companion device 200 may request signaling information notification from the broadcast reception device 100 through the controller. More specifically, the companion device 200 request signaling information notification from the broadcast reception device 100 using a UPnP protocol. In a detailed embodiment, the companion device 200 may request subscription to an event for the signaling information from the broadcast reception device 100 based on an eventing protocol. Here, the signaling information may include broadcast service property information, emergency alert service information, NRT data information or device capability information. The request for notification of each information may use a state variable corresponding to each of the above-described information.

The companion device may receive the signaling information (DS1625). Here, the signaling information may include broadcast service property information, emergency alert service information, NRT data information or device capability information. Reception of each information may be performed using the action and action argument corresponding to each of the above-described information.

The companion device may perform functions related to the received signaling information (DS1627). The companion device may update broadcast service property information upon receiving the broadcast service property information. The companion device may display an emergency alert message upon emergency alert service information. The companion device may update the property information of the NRT data upon receiving NRT data information. The companion device may request and receive a media component, display an unpresentable message, request and receive a replaceable medium component, or display a message for asking for user's consent, upon receiving the device capability information.

Operation of the companion device may be performed according to the embodiments described in the above figures.

Figure 47:
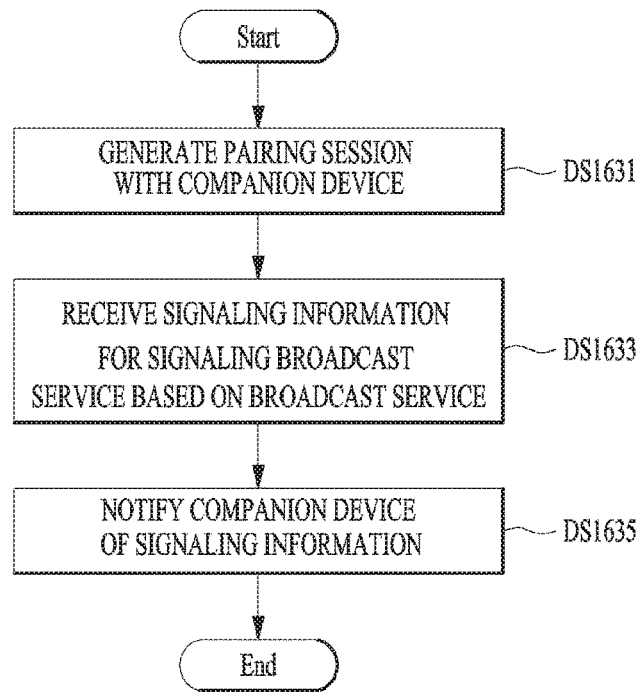
FIG. 47 is a flowchart illustrating operation of a broadcast reception device according to an embodiment of the present invention.

FIG. 47 is a flowchart illustrating operation of a broadcast reception device according to an embodiment of the present invention.

The broadcast reception device 100 and the companion device 200 generate a pairing session (DS1631). More specifically, the broadcast reception device 100 may generate the pairing session with the companion device 200 through an IP communication unit 130. More specifically, the companion device 200 may generate the pairing session with the broadcast reception device 100 through a communication unit. More specifically, the broadcast reception device 100 and the companion device 200 may generate a pairing session for bidirectional communication. More specifically, the broadcast reception device 100 and the companion device 200 may generate a pairing session using a UPnP protocol. In a detailed embodiment, the broadcast reception device 100 may find the companion device 200 using the discovery protocol of a UPnP. For example, the broadcast reception device 100 may multicast a discovery message for finding a companion device through a well-known IP address. At this time, the companion device 200, which has received the multicast message, may request a description from the broadcast reception device 100. The broadcast reception device 100 may provide the description to the companion device 200 based on the request for the description of the companion device 200. The companion device 200 may access the broadcast reception device 100 based on the description. In another detailed embodiment, the companion device 200 may find the broadcast reception device 100 using the discovery protocol of the UPnP. For example, the companion device 200 may multicast a message for finding the broadcast reception device 100 for interoperation through a well-known IP address. At this time, the broadcast reception device may respond to the multicast message using a discovery message. At this time, the companion device 200, which has received the discovery message, may request a description from the broadcast reception device 100. The broadcast reception device 100 may provide the description to the companion device 200 based on the request for the description of the companion device 200. The companion device 200 may access the broadcast reception device 100 based on the description.

The broadcast reception device may receive signaling information for signaling the broadcast service based on the broadcast service (DS1633). Here, the signaling information may include broadcast service property information, emergency alert service information, NRT data information or device capability information. Reception of each information may be performed using the action and action argument corresponding to each of the above-described information. The broadcast reception device may receive the signaling information from the broadcast transmission device or the content/signaling server.

The broadcast reception device may notify the companion device of the signaling information (DS1635). The broadcast reception device may notify the companion device for delivering a request for subscription to the signaling information thereto of the signaling information. The broadcast reception device may selectively notify the companion device of the signaling information only when the signaling information is changed. In some embodiments, only changed information or all signaling information may be notified.

Operation of the broadcast reception device may be performed according to the embodiments described with reference to the above figures.

The broadcast reception device may notify the companion device of the signaling information received by the broadcast reception device in a state of interoperating the companion device. In addition, the companion device may perform operation corresponding thereto using the signaling information received from the broadcast reception device. Therefore, signaling and content presentation considering the properties of the companion device are possible.

Figure 48:
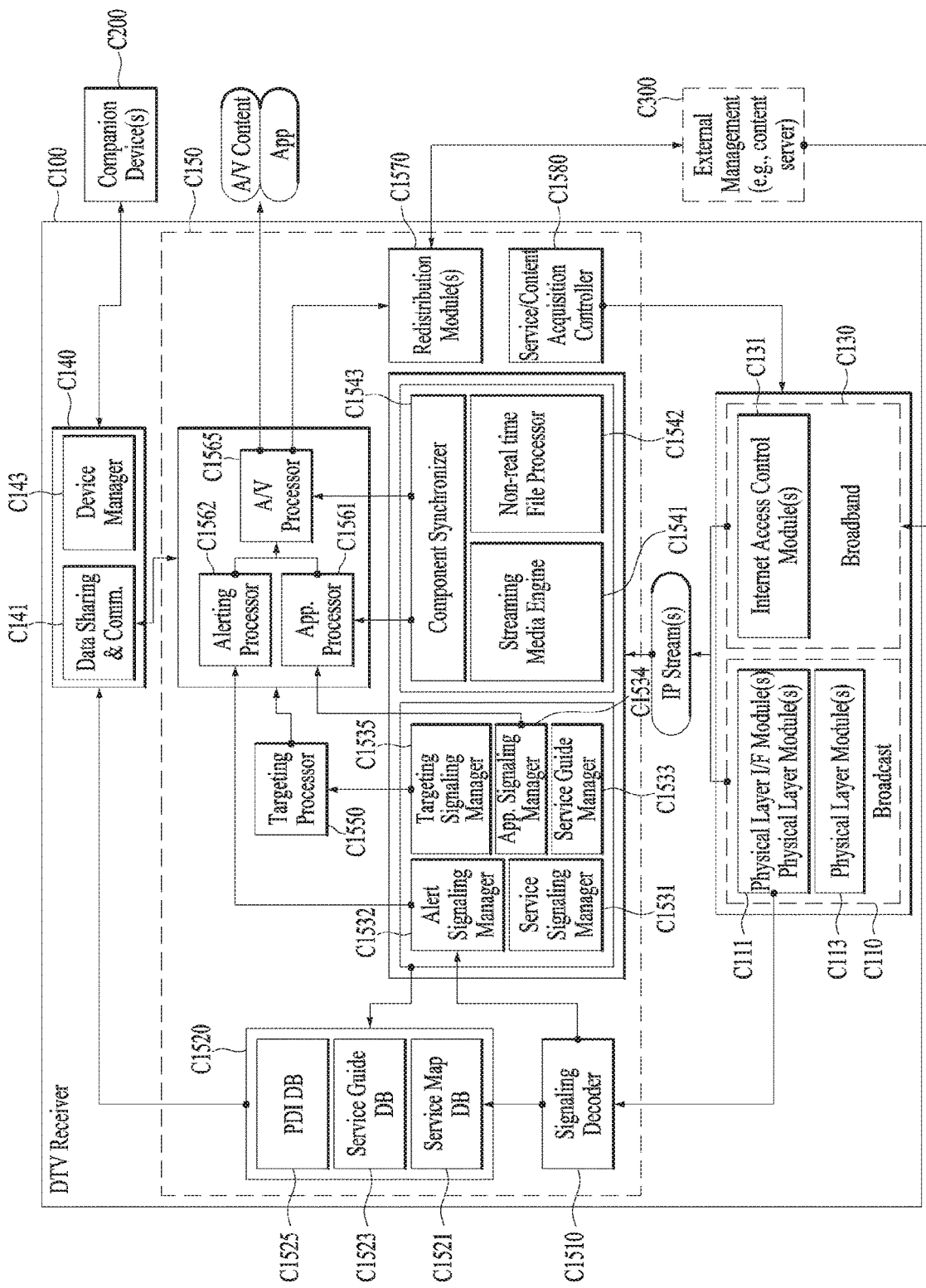
FIG. 48 is a diagram showing the configuration of a broadcast system according to an embodiment of the present invention.

FIG. 48 is a diagram showing the configuration of a broadcast system according to an embodiment of the present invention.

The broadcast system according to the embodiment of the present invention may include a broadcast reception device, a companion device C200 and/or an external management apparatus C300. The broadcast reception device may receive and process a broadcast signal. The companion screen device C200 may be an external device for sharing audio, video and/or data including signaling information with the broadcast reception device. The companion screen device C200 may receive a broadcast service through the Internet. The companion screen device C200 may be referred to as a second broadcast reception device, a second receiver, a second screen device, a slave device (SD) and/or a companion device (CD). The detailed description of the broadcast reception device and/or the companion screen device C200 may include the above description. The external management apparatus C300 may be a content server. The external management apparatus C300 may refer to external modules of the broadcast reception device for providing broadcast services/content, such as a next-generation broadcast service/content server.

The broadcast reception device (DTV Receiver) according to the embodiment of the present invention includes at least one of a broadcast interface C110, a broadband interface C130, a companion screen interface C140, and/or a controller C150.

The broadcast interface C110 may be one or a plurality of processors for performing a plurality of functions performed by the broadcast interface C110. The broadcast interface may include one or a plurality of circuits and one or a plurality of hardware units. More specifically, the broadcast interface C110 may be a system on chip (SOC) including various semiconductor parts. At this time, the SOC may be a semiconductor device including various multimedia parts such as graphics, audio, video and modems and a semiconductor part including a processor and a DRAM. The broadcast interface C110 may include a physical layer module C113 and a physical layer IP frame module C111. The physical layer module C113 receives and processes a broadcast related signal through a broadcast channel of a broadcast network. The physical layer IP frame module C111 converts a data packet such as an IP datagram acquired from the physical layer module C113 into a specific frame. For example, the physical layer module C113 may convert an IP datagram, etc. into an RS frame or GSE.

The broadband interface C130 may be one or a plurality of processors for performing a plurality of functions performed by the broadband interface C130. The broadband interface may include one or a plurality of circuits and one or a plurality of hardware units. More specifically, the broadband interface C130 may be a system on chip (SOC) including various semiconductor parts. At this time, the SOC may be a semiconductor device including various multimedia parts such as graphics, audio, video and modems and a semiconductor part including a processor and a DRAM. The broadband interface C130 may include an Internet access control module C131. The Internet access control module C131 may control operation of the broadcast reception device for acquiring at least one of a service, content and signaling data through the communication network (broadband).

The companion screen interface C140 may discover the companion screen device C200. The companion screen interface C140 may transmit data and/or signaling information to the companion screen device C200 or receive data and/or signaling information from the companion screen device C200. The companion screen interface C140 may include at least one of a data sharing unit C141 (Data Sharing & Comm) and a device manager (C143). For example, the companion screen interface C140 may be included in the controller C150.

The data sharing unit C141 (Data Sharing & Comm) performs data transmission operation between the broadcast reception device and an external device and processes exchange related information. More specifically, the data sharing unit C141 may transmit A/V data or signaling information to the external device. In addition, the data sharing unit C141 may receive A/V data or signaling information from the external device.

The device manager C143 manages a connectable external device. More specifically, the device manager C143 may perform at least one of addition, deletion and update of the external device. In addition, the external device may be connected to the broadcast reception device and exchange data with the broadcast reception device.

The controller C150 may be one or a plurality of processors for performing a plurality of functions performed by the controller C150. The controller may include one or a plurality of circuits and one or a plurality of hardware units. More specifically, the controller C150 may be a system on chip (SOC) including various semiconductor parts. At this time, the SOC may be a semiconductor device including various multimedia parts such as graphics, audio, video and modems and a semiconductor part including a processor and a DRAM. The controller C150 may include at least one of a signaling decoder C1510, database C1520, a service signaling manager C1531, an alert signaling manager C1532, a service guide manager C1533, an application signaling manager C1534, a targeting signaling manager C1535, a streaming media engine C1541, a non-real time file processor C1542, a component synchronizer C1543, a targeting processor C1550, an application processor C1561, an alerting processor C1562, an A/V processor C1565, a redistribution module C1570, and/or a service/content acquisition controller C1580.

The signaling decoder C1510 decodes signaling information.

The database C1520 may store data. The database C1520 may include at least one of a service map database C1521, a service guide database C1523, and/or a PDI database C1525. The service map database C1521 may store information related to a service map. The service guide database C1523 may store information related to service guide data. The PDI database C1525 may store data related to PDI.

The service signaling manager C1531 parses service signaling information. The service signaling manager C1531 may perform service scan from an IP datagram and signaling information extraction, parsing and management related to a service/content. For example, the service signaling manager C1531 extracts and parses signaling information related to a service. At this time, signaling information related to the service may be signaling information related to service scan. In addition, the signaling information related to the service may be signaling information related to content provided through the service.

The alert signaling manager C1532 extracts and parses signaling information related to alerts from the IP datagram, etc.

The service guide manager C1533 extracts announcement information from the IP datagram, etc., manages a service guide (SG) database, and provides service guide information.

The application signaling manager C1534 may extract, parse and/or manage signaling information related to application acquisition from the IP datagram. The signaling information related to application acquisition may include signaling information related to an application and/or application signaling information.

The targeting signaling manager C1535 extracts and parses information for personalizing a service or content or information for signaling targeting information.

The streaming media engine C1541 may extract and decode audio/video data for A/V streaming from the IP datagram, etc. The streaming media engine C1541 may include a scheduled streaming decoder (not shown) for decoding scheduled streaming which is content streamed according to a schedule decided by a content provider such as a broadcaster. In addition, the streaming media engine C1541 may include an on-demand streaming decoder (not shown) for decoding on-demand streaming which is on-demand content.

The non-real time file processor C1542 may extract, decode and/or manage NRT data from the IP datagram, etc. and file type data such as applications. The non-real time file processor C1542 may include a file decoder (not shown) for decoding a downloaded file. The file decoder decodes a file downloaded through a broadcast network and/or a communication network. In addition, the non-real time file processor C1542 may include a file database (not shown) for storing a file. More specifically, the file database may store a file downloaded through a broadcast network and/or a communication network.

The component synchronizer C1543 synchronzes content or a service. The component synchronizer C1543 may synchronize content and a service such as streaming audio/video data and NRT data. More specifically, the component synchronizer C1543 synchronzes content decoded by at least one of the non-real time file processor C1542 and/or the streaming media engine C1541.

The targeting processor C1550 processes information for personalizing a service or content.

The application processor C1561 controls execution of an application and application related information. More specifically, the application processor C1561 processes the state of a downloaded application and display parameters.

The alerting processor C1562 processes alerts-related signaling information.

The A/V processor C1565 processes audio/video rendering related operations based on decoded audio, video, application data, etc.

The redistribution module C1570 performs operation for supporting acquisition of at least one of a service, content, service related information and content related information when a service or content is not received through the broadcast network. More specifically, it is possible to request at least one of a service, content, service related information and content related information from the external management apparatus 300.

The service/content acquisition controller C1580 controls operation of a receiver for acquiring at least one of a service, content and service or content related information. The service/content acquisition controller C1580 controls operation of a receiver for acquiring a service, content or service or content related signaling data through a broadcast network or a communication network.

Figure 49:
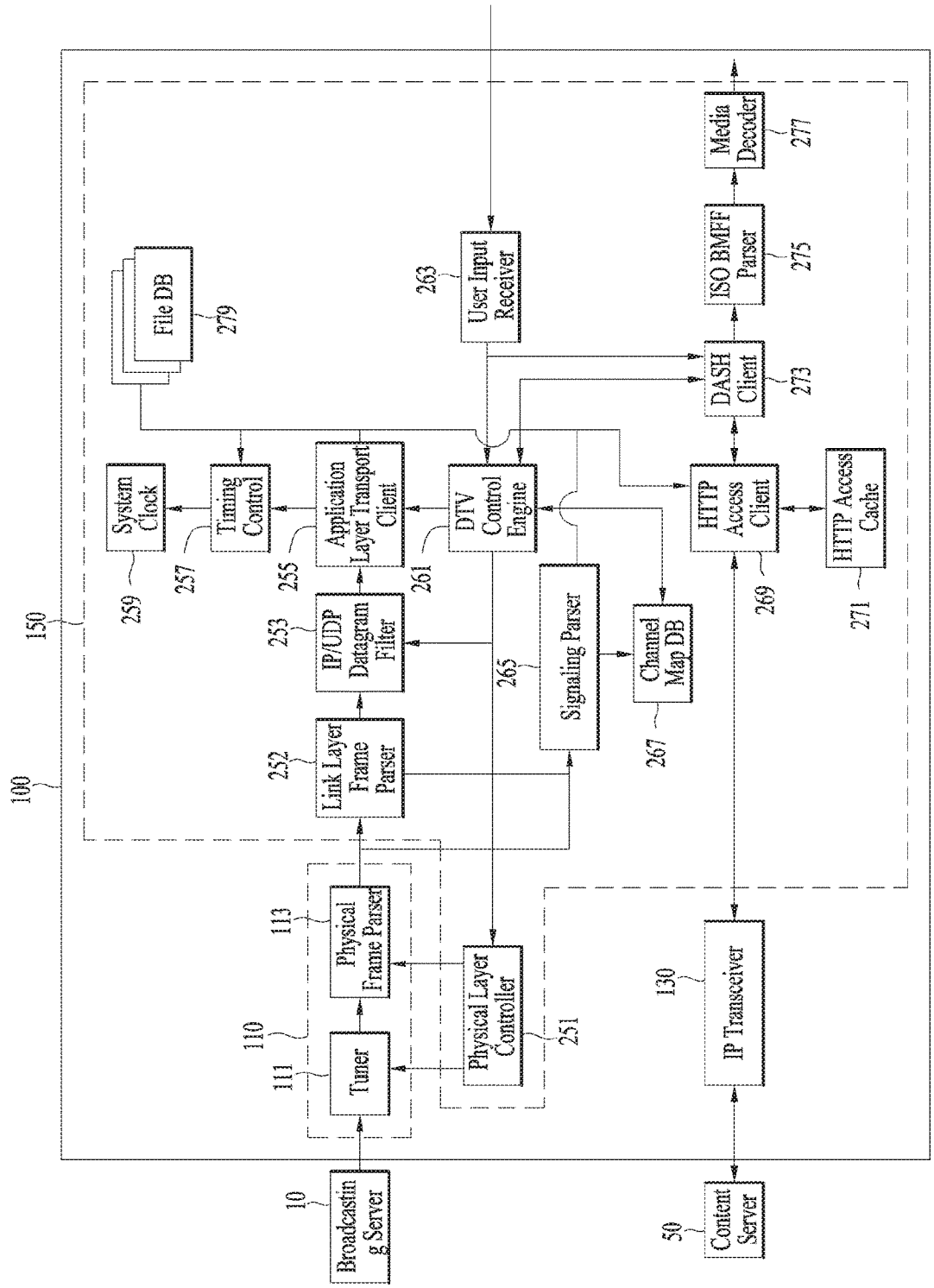
FIG. 49 is a diagram showing the configuration of a broadcast reception device according to an embodiment of the present invention.

FIG. 49 is a diagram showing the configuration of a broadcast reception device according to an embodiment of the present invention.

The broadcast reception device 100 may include at least one of a broadcast interface 110, a broadband interface 130, a companion screen interface (not shown), and/or a controller 150. The companion screen interface (not shown) may be included in the controller 150.

The broadcast interface 110 may include at least one of a tuner 111 and a physical frame parser 113.

The tuner 111 receives a broadcast signal transmitted through a broadcast network. The tuner 11 may convert the received broadcast signal into a physical frame format.

The physical frame parser 113 extracts a link layer frame from the physical frame of the received broadcast signal.

The broadband interface 130 receives and transmits IP data.

The controller 150 may include at least one of a physical layer controller 251, a link layer frame parser 252, an IP/UDP datagram filter 253, an application layer transport client 255, a timing controller 257, a system clock 259, a DTV control engine 261, a user input receiver 263, a signaling parser 265, a channel map database 267, an HTTP access client 269, an HTTP access cache 271, a DASH client 273, an ISO BMFF parser 275, a media decoder 277 and a file database 279.

The physical layer controller 251 controls operation of the broadcast receiver 110. More specifically, the physical layer controller 251 may control transport parameters of the broadcast signal received by the broadcast receiver 110 and selectively receive the broadcast signal. For example, the physical layer controller 251 may control the frequency of the broadcast signal received by the tuner 111. In addition, the physical layer controller 251 may control the physical frame parser 113 and extract a link layer frame from the broadcast signal.

The link layer frame parser 252 extracts data corresponding to the payload of the link layer frame from the link layer frame of the broadcast signal. More specifically, the link layer frame parser 252 may extract link layer signaling from the link layer frame. The link layer signaling signals a broadcast service through a link layer. Therefore, the broadcast reception device 100 may acquire information on the broadcast service without extracting an application layer. Accordingly, the broadcast reception device 100 may rapidly scan and switch the broadcast service. In addition, the link layer frame parser 252 may extract IP/UDP datagram from the link layer frame.

The IP/UDP datagram filter 253 extracts a specific IP/UDP datagram from the IP/UDP datagram. Since data transmission through a broadcast network or multicast through a communication network is unidirectional communication, the broadcast reception device 100 receives data other than data necessary therefor. Accordingly, the broadcast reception device 100 extracts data necessary therefor from the data stream. The IP/UDP datagram filter 253 extracts IP/UDP datagram required by the broadcast reception device 100 from an IP/UDP datagram stream. More specifically, the IP/UDP datagram filter 253 extracts an IP/UDP datagram corresponding to a specified IP address and UDP port number. At this time, the IP address may include at least one of a source address and a destination address.

The application layer transport client 255 processes application layer transport packets. More specifically, the application layer transport client 255 processes Real-time Object delivery over Unidirectional Transport (ROUTE) based ALC/LCT packets. A ROUTE protocol refers to an application layer protocol for transmitting real-time data using ALC/LCT packets. The broadcast reception device 100 may extract at least one of broadcast service signaling information, NRT data and media content from the ALC/LCT packets. At this time, the media content may be in MPEG-DASH format. More specifically, media content may be encapsulated in an ISO Base Media File Format (ISO BMFF) and transmitted through an MPEG-DASH protocol. The broadcast reception device 100 may extract an MPEG-DASH segment from the ROUTE packets. In addition, the broadcast reception device 100 may extract an ISO BMFF file from the MPEG-DASH segment.

The application layer transport client 255 may process transport packets such as ROUTE based ALC/LCT packets and/or MPEG Media transport (hereinafter, MMT) packets, collect and process several packets and generate one or more ISO Base Media File Format objects.

The timing controller 257 processes packets including system time information which is reference information of media content reproduction. In addition, the timing controller 257 may control a system clock based on the system time information.

The system clock 259 provides a reference clock for operation of the broadcast reception device 100.

The DTV control engine 261 serves as an interface between the components. More specifically, the DTV control engine 261 may deliver parameters for controlling operation of the components.

The user input receiver 263 receives user input. More specifically, the user input receiver 263 may receive at least one of remote control input and key input of a user.

The signaling parser 265 delivers information on a broadcast service, parses broadcast service signaling information for signaling the broadcast service and extracts the information on the broadcast service. More specifically, the signaling parser 265 may parse broadcast service signaling information extracted from the application layer and extract the information on the broadcast service. In another embodiment, the signaling parser 265 may parse broadcast service signaling information extracted from the link layer and extract the information on the broadcast service.

The channel map database 267 stores information on the channel map of the broadcast service. More specifically, the signaling parser 265 may extract the information on the broadcast service and store the information on the channel map in the channel map database 267. In addition, the DTV control engine 261 may acquire the information on the channel map of the broadcast service from the channel map database. At this time, the information on the channel map may include at least one of a channel number of a broadcast service and a broadcast service name of the broadcast service.

The HTTP access client 269 processes HTTP data. More specifically, the HTTP access client 269 may receive a request to a content server 50 using HTTP and receive a response from the content server 50 in response to the request.

The HTTP access cache 271 caches HTTP data to improve the processing speed of the HTTP data.

The DASH client 273 processes an MPEG-DASH segment. More specifically, the DASH client 273 may process the MPEG-DASH segment received through a communication network. More specifically, the DASH client 273 may process the MPEG-DASH extracted from the application layer of the broadcast signal received through the broadcast network.

The ISO BMFF parser 275 processes ISO BMFF packets. More specifically, the ISO BMFF parser 275 may extract media content from the ISO BMFF packets.

The media decoder 277 decodes media content. More specifically, the media decoder 277 may decode the media content and reproduce the media content.

The file database 279 stores files necessary for the broadcast service. More specifically, the file database 279 may store files extracted from the application layer of the broadcast signal.

Figure 50:
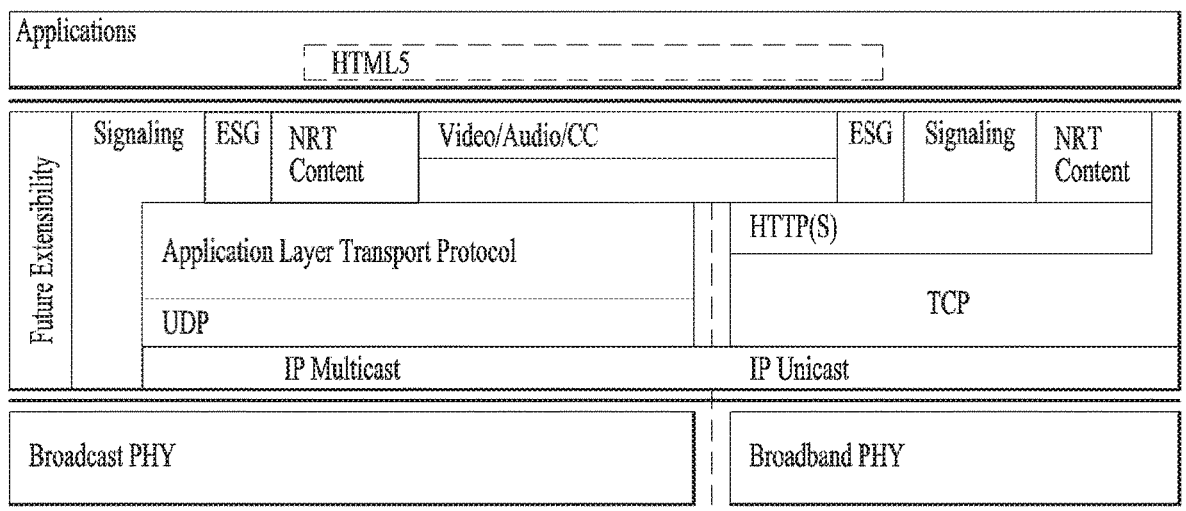
FIG. 50 is a diagram showing an application layer transport protocol stack according to an embodiment of the present invention.

FIG. 50 is a diagram showing an application layer transport protocol stack according to an embodiment of the present invention.

Referring to the figure, a protocol stack of a system supporting an IP based next-generation hybrid broadcast is shown.

A broadcast transmission device according to an embodiment of the present invention may transmit a broadcast service based on an application layer transport protocol stack.

The broadcast service according to the embodiment of the present invention may include media data (e.g., video data, audio data, or closed caption data) and supplementary services such as an HTML5 application, a bidirectional service, an ACR service, a second screen service, a personalization service, etc.

For example, the broadcast service of a next-generation broadcast system supporting an IP based hybrid broadcast may include real-time content data, signaling data, electronic service guide (ESG) data, and/or NRT (Non-Real Time) content data.

Such a broadcast service may be transmitted through a broadcast network such as a terrestrial, cable and/or satellite network. In addition, the broadcast service according to the embodiment of the present invention may be transmitted through the Internet (broadband).

First, a method of transmitting a broadcast service over a broadcast network will be described.

Media data may include video data, audio data and/or closed caption data. The media data may be encapsulated into MPEG (Moving Picture Expert Group)-DASH (Dynamic Adaptive Streaming over HTTP) segments and/or MMT (MPEG Media Transport) MPU (Media processing unit). For example, the file format of the MPEG-DASH segment and/or the MMT MPU may be an ISO Base Media File (hereinafter, ISO BMFF).

Signaling data, ESG data, NRT (Non Real Time) content data, and/or real-time content data may be encapsulated into application layer transport protocol packets supporting real-time transmission. For example, the real-time content data may include media data such as video data, audio data and/or closed caption data. In addition, the NRT content data may include media data and/or application data. In addition, the application layer transport protocol may include ROUTE (Real-Time Object Delivery over Unidirectional Transport) and/or MMT. The application layer transport protocol packets may include ROUTE packets and/or MMT packets. Hereinafter, the application layer transport protocol packets may be referred to as packets.

Then, the data encapsulated into application layer transport protocol packets may be encapsulated into a UDP datagram.

Then, the UDP datagram may be encapsulated into an IP datagram. For example, the IP datagram may be a datagram based on an IP Multicast or IP Unicast scheme.

Then, the IP datagram may be carried in the broadcast signal. For example, the IP datagram may be transmitted through a physical layer (Broadcast PHY).

The signaling data according to an embodiment of the present invention may be transmitted through a specific physical layer pipe (PLP) of a transport frame (or frame) transmitted through the physical layer of the broadcast network and the next-generation broadcast transmission system according to the properties of signaling. For example, the signaling format may be a format encapsulated into a bitstream or IP datagram.

Next, a method of transmitting a broadcast service through the Internet will be described.

Signaling data, ESG data, NRT Content data, and/or real-time content data may be encapsulated into HyperText Transfer Protocol (HTTP) packets.

Then, the data encapsulated into HTTP packets may be encapsulated into Transmission Control Protocol (TCP) packets. The broadcast service according to the embodiment of the present invention may be directly encapsulated into TCP packets.

Then, the TCP packets may be encapsulated into an IP datagram. For example, the IP datagram may be based on an IP Multicast or IP Unicast scheme.

Then, the IP datagram may be carried in the broadcast signal. For example, the IP datagram may be transmitted through a physical layer (Broadcast PHY).

Signaling data, ESG data, NRT content data, and/or real-time content data may be transmitted through the Internet in response to the request of the receiver.

The broadcast reception device may receive a broadcast service based on the above-described ROUTE protocol stack.

Hereinafter, the case where the above-described signaling data, ESG data, NRT Content data, and/or real-time content data are encapsulated into ROUTE transport packets will be focused upon.

ROUTE is a protocol for transmission of files through IP multicast networks. The ROUTE protocol uses Asynchronous Layered Coding (ALC) which is a base protocol designed for massively scalable multicast distribution, a Layered Coding Transport (LCT) protocol and the other well-known Internet protocols. ROUTE is an improved version of or a functional replacement for FLUTE and has additional features.

ROUTE may transmit signaling messages, electronic service guide (ESG) messages and NRT content. ROUTE is suitable for transmitting streaming media such as MPEG-DASH Media Segment files. As compared to FLUTE, ROUTE provides lower end-to-end latency through a delivery chain.

The ROUTE protocol is a generic transport application for providing transmission of an arbitrary type of object. The ROUTE protocol supports rich presentation including scene descriptions, media objects, and DRM related information. ROUTE is suitable for transmission of real-time media content and provides many features.

For example, ROUTE provides individual delivery of and access to different media components (e.g. language tracks, subtitles, alternative video views). In addition, ROUTE provides support of layered coding by enabling delivery in different transport sessions or different ROUTE sessions. In addition, ROUTE provides support for flexible FEC protection including multistage. In addition, ROUTE provides an easy MPEG-DASH combination. The MPEG-DASH combination enables synergy between broadcast and broadband delivery modes of DASH. In addition, ROUTE provides fast access to media upon joining in a ROUTE session and/or a transport session. In addition, ROUTE focuses upon the concept of delivery to provide high extensibility. In addition, ROUTE provides compatibility with existing IETF protocols and compatibility with IETF IETF-endorsed extension mechanisms.

Figure 51:
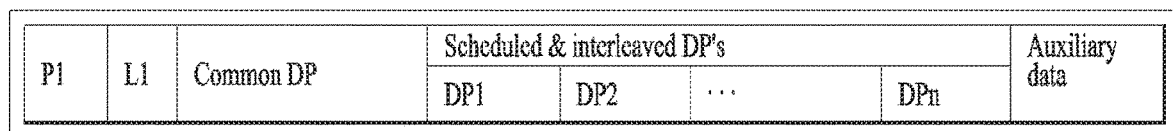
FIG. 51 is a diagram showing a broadcast transport frame according to an embodiment of the present invention.

FIG. 51 is a diagram showing a broadcast transport frame according to an embodiment of the present invention.

Hereinafter, a DP (data pipe) may be referred to as a PLP (physical layer pipe).

In one embodiment, the broadcast transport frame includes a P1 part, an L1 part, a common PLP part, an interleaved (scheduled & interleaved) PLP part and an auxiliary data part.

In one embodiment, a broadcast transmission device transmits information for transport signal detection through the P1 part of the broadcast transport frame. In addition, the broadcast transmission device may transmit tuning information for tuning of a broadcast signal through the P1 part.

In one embodiment, the broadcast transmission device transmits the configuration of the broadcast transport frame and the properties of each PLP through the L1 part. At this time, the broadcast reception device may decode the L1 part based P1 to acquire the configuration of the broadcast transport frame and the properties of each PLP.

In one embodiment, the broadcast transmission device may transmit information commonly applied to PLPs through the common PLP part. In a detailed embodiment, the broadcast transport frame may not include the common PLP part.

In one embodiment, the broadcast transmission device transmits a plurality of components included in the broadcast service through the interleaved PLP part. At this time, the interleaved PLP part includes a plurality of PLPs.

In one embodiment, the broadcast transmission device may signal information indicating through which PLP a component configuring each broadcast service is transmitted through the L1 part or the common PLP part. However, the broadcast reception device should decode the plurality of PLPs of the interleaved PLP part in order to acquire detailed broadcast service information for broadcast service scan.

Unlike, the broadcast transmission device may transmit the broadcast transport frame including a separate part including a broadcast service transmitted through the broadcast transport frame and information on components included in the broadcast service. At this time, the broadcast reception device may rapidly acquire the broadcast service and the information on the components included in the broadcast service through the separate part.

Figure 52:
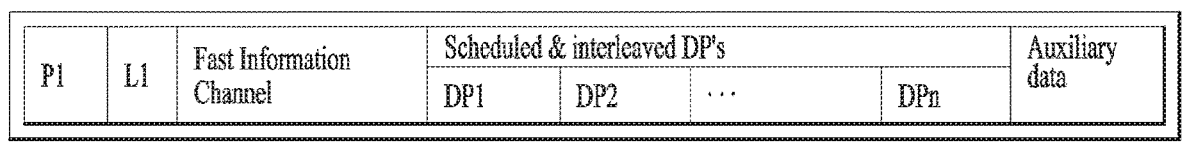
FIG. 52 is a diagram showing a broadcast transport frame according to an embodiment of the present invention.

FIG. 52 is a diagram showing a broadcast transport frame according to an embodiment of the present invention.

In one embodiment, the broadcast transport frame includes a P1 part, an L1 part, a Fast Information Channel (FIC) part, an interleaved (scheduled & interleaved) PLP part and an auxiliary data part.

The parts excluding the FIC part are equal to those of the above-described embodiment.

The broadcast transmission device transmits fast information through the FIC part. Fast information may include configuration information of a broadcast stream, brief broadcast service information and component information transmitted through a transport frame. The broadcast reception device may scan a broadcast service based on the FIC part. More specifically, the broadcast reception device may extract information on the broadcast service from the FIC part. The fast information may also be referred to as link layer signaling. The broadcast reception device may parse only the link layer without parsing the application layer to acquire the broadcast service information and the component information.

Further, a specific PLP may operate as a base PLP capable of rapidly and robustly transmitting signaling of a broadcast service and content transmitted in a corresponding transport frame.

Figure 53:
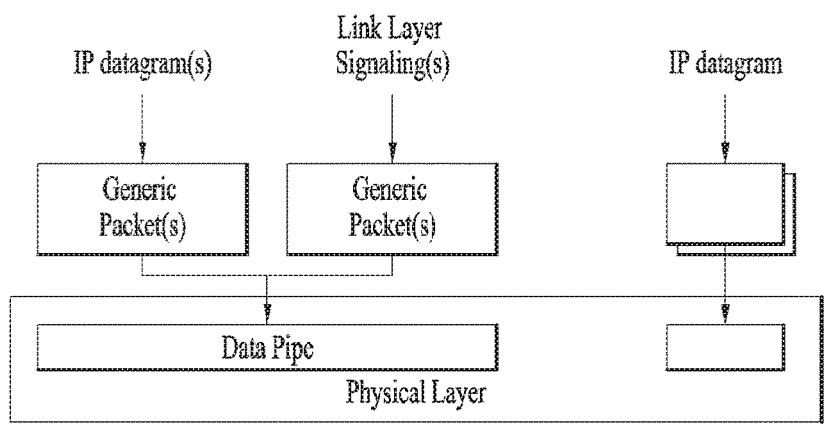
FIG. 53 is a diagram showing a broadcast transport frame according to an embodiment of the present invention.

FIG. 53 is a diagram showing a broadcast transport frame according to an embodiment of the present invention.

Data transmitted through each PLP of the transport frame of the physical layer is shown in the figure. That is, the link layer signaling and/or IP datagram may be encapsulated into generic packets and transmitted through the PLP.

Figure 54:
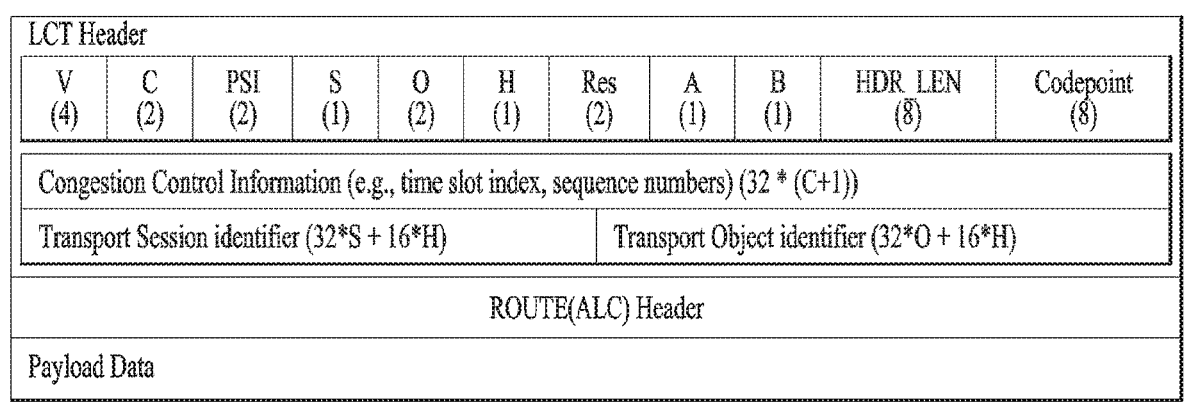
FIG. 54 is a diagram showing LCT packets according to an embodiment of the present invention.

FIG. 54 is a diagram showing LCT packets according to an embodiment of the present invention.

An application layer transport session may be a combination of an IP address and a port number.

In Real-Time Object Delivery over Unidirectional Transport (hereinafter, ROUTE), a ROUTE session may include one or more LCT (Layered Coding Transport) sessions. For example, if one media component (e.g., DASH Representation, etc.) is transmitted through one LCT transport session, one or more media components may be multiplexed and transmitted through one application transport session. Further, one or more transport objects may be delivered through one LCT transport session and each transport object may be a DASH segment associated with DASH representation transmitted through a transport session. Alternatively, the transport object may include the above-described delivery object.

For example, if the application layer transport protocol is based on LCT, the transport packet may be configured as follows. The transport packet may include an LCT header, a ROUTE (ALC) Header, and/or payload data.

The LCT header may include at least one of an LCT version number field (V), a Congestion control flag field (C), a Reserved field (R), a Transport Session Identifier flag field (S), a Transport Object Identifier flag field (O), a Half-word flag field (H), a Sender Current Time present flag field (T), an Expected Residual Time present flag field (R), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), and/or a Header Extensions field.

The ROUTE (ALC) Header may include an FEC Payload ID field (not shown).

The payload data may include an Encoding Symbol(s) field. The LCT version number field (V) may indicate a protocol version number. For example, the LCT version number field (V) may indicate an LCT version number. The LCT version number field (V) of the LCT header may be interpreted as a ROUTE version number field.

The Congestion control flag field (C) may indicate the length of the Congestion Control Information field.

The Reserved field (R) is reserved for future use. For example, the Reserved field (R) may be a Protocol-Specific Indication field (PSI). The Protocol-Specific Indication field (PSI) may be used as a special-purpose indicator in an LCT higher protocol. The PSI field may indicate whether current packets are source packets or FEC repair packets. Since a ROUTE source protocol transmits only source packets, the PSI field may be set to '10b'.

The Transport Session Identifier flag field (S) may indicate the length of the Transport Session Identifier field.

The Transport Object Identifier flag field (O) may indicate the length of the Transport Object Identifier field. For example, the object may mean one file and the TOI is the identification information of each object and a file having a TOI of 0 is referred to as an FDT.

The Half-word flag field (H) indicates whether a half-word (16 bits) is added to the length of the TSI and TOI field.

The Sender Current Time present flag field (T) may indicate whether a Sender Current Time (SCT) is present. T=0 may indicate that the Sender Current Time (SCT) field is not present. T=1 may indicate that the Sender Current Time (SCT) field is present. The SCT may be included in order for the transmitter to signal information indicating how long the session is processed to the receiver.

The Expected Residual Time present flag field (R) may indicate whether the Expected Residual Time (ERT) field is present. R=0 may indicate that the Expected Residual Time (ERT) field is not present. R=1 may indicate that the Expected Residual Time (ERT) field is present. The ERT may be included in order for the transmitter to signal information indicating how long session/object transmission is continued to the receiver.

The Close Session flag field (A) indicates whether the session is closed or is about to be closed.

The Close Object flag field (B) indicates whether the transmitted object is closed or is about to be closed.

The LCT header length field (HDR_LEN) may indicate the total length of the LCD header in 32-bit word units.

The Codepoint field (CP) may indicate the type of payload transmitted by current packets. According to the type of the payload, an additional payload header may be added in front of payload data.

The Congestion Control Information field (CCI) is used to transmit congestion control information such as layer numbers, logical channel numbers, sequence numbers, etc. The CCI field in the LCT header may include necessary congestion control information.

The Transport Session Identifier field (TSI) is the unique identifier of the session. The TSI may uniquely identify the session among all sessions transmitted from a specific transmitter. The TSI field may identify the transport session in ROUTE. The content of the transport session may be provided by an LSID (LCT Session Instance description).

The LSID may define what is transmitted in each LCT transport session of the ROUTE session. Each transport session may be uniquely identified by the TSI of the LCT header. The LSID may be transmitted through the same ROUTE session including the LCT transport session or may be transmitted through a communication network, a broadcast network, the Internet, a cable network and a satellite network. Means for transmitting the LSID are not limited thereto. For example, the LSID may be transmitted through a specific LCT transport session having a TSI value of "0". The LSID may include signaling information of all transport sessions transmitted through ROUTE session. The LSID may include LSID version information and information on validity of the LSID. In addition, the LSID may include transport session information for providing information on the LCT transport session. The transport session information may include TSI information for identifying a transport session, source flow information transmitted through the TSI and providing information on a source flow for transmission of source data, repair flow information transmitted through the TSI and providing information on a repair flow for transmission repair data, and transport session property information including additional property information of the transport session.

The TOI may indicate to which object in the session the current packets are related. The TOI field may indicate to which object in the current session the payload of the current packets belongs. Mapping to the object of the TOI field may be provided by an Extended FDT.

The Extended FDT may indicate the details of file delivery data. This may be an extended FDT instance. The extended FDT may be used to generate FDT-equivalent descriptions of a delivery object along with the LCT packet header. The Extended 1-DT may be provided as an embedded reference. Extended FDT may be independently updated with respect to the LSID upon being provided as the reference. The Extended FDT may be provided as an in-band object of TOI=0 included in the source flow upon being referred to.

The Header Extensions field is used as an LCT header extension part for additional information transmission. The Header Extensions in the LCT may be used to accommodate optional header fields which are not always used or have variable sizes.

For example, EXT_TIME extension may be used to transmit several types of timing information. The EXT_TIME extension may include general-purpose timing information, Sender Current Time (SCT), Expected Residual Time (ERT), and/or Sender Last Change (SLC) time extensions. The EXT_TIME extension may be used for timing information having narrower applicability. For example, the EXT_TIME extension may be defined for single protocol instantiation. In this case, the EXT_TIME extension may be separately described.

The FEC Payload ID field includes identification information of a transmission block or an encoding symbol. The FEC Payload ID indicates the identifier when the above-described file is FEC-encoded. For example, the FEC Payload ID may be allocated in order for the broadcaster or the broadcast server to identify the FLUTE protocol file, if the FLUTE protocol file is FEC-encoded.

The Encoding Symbol(s) field may include data of the transmission block or the encoding symbol.

Figure 55:
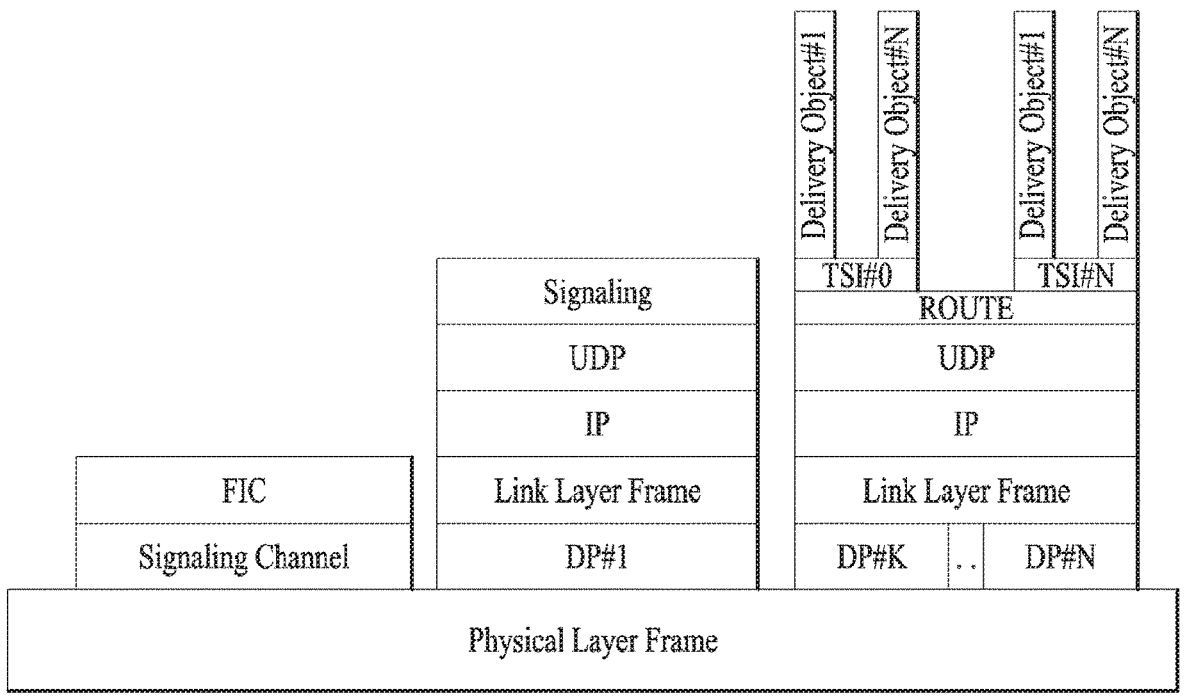
FIG. 55 is a diagram showing delivery of signaling information through a FIC and/or a PLP according to an embodiment of the present invention.

FIG. 55 is a diagram showing delivery of signaling information through a FIC and/or a PLP according to an embodiment of the present invention.

Signaling data of a next-generation broadcast system may be transmitted as follows. The broadcast transmission device may transmit signaling data of a broadcast service through the physical layer frame using Fast Information Channel (hereinafter, FIC), in order to support fast service/content scan of the broadcast reception device. If the FIC is not present, signaling data of a broadcast service may be delivered through a path for delivering link layer signaling.

Signaling information including information on a service and/or components in the service (audio, video, etc.) may be encapsulated into an IP/UDP datagram and/or application layer transport packets (e.g., ROUTE packets, MMP packets, etc.) through one or more PLPs in the physical layer frame.

The figure shows an embodiment in which such signaling data is transmitted through the FIC and/or one or more DPs. Signaling data supporting fast service scan/acquisition may be delivered through the FIC. In addition, signaling data including details of a service may be encapsulated into an IP datagram and transmitted through a specific PLP.

Figure 56:
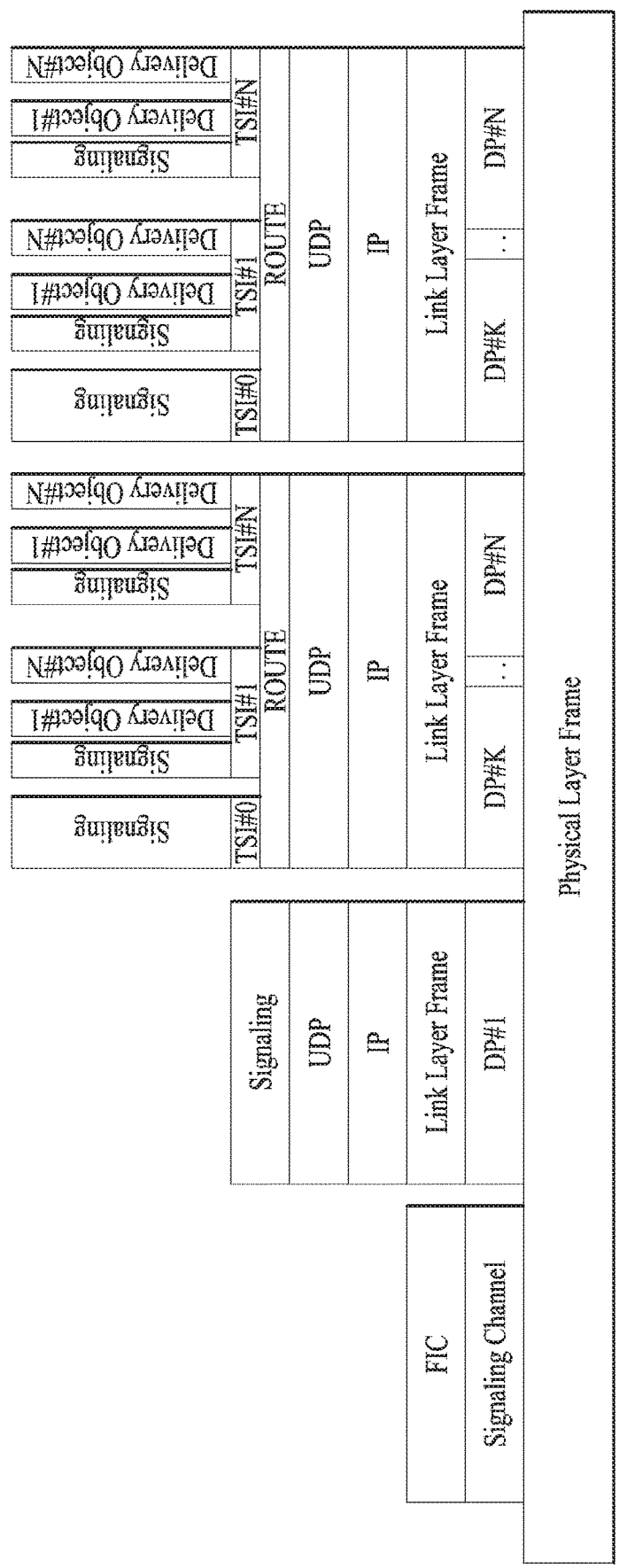
FIG. 56 is a diagram showing delivery of signaling information through a transport session according to an embodiment of the present invention.

FIG. 56 is a diagram showing delivery of signaling information through a transport session according to an embodiment of the present invention.

Referring to FIG. 56, signaling information supporting fast service scan/acquisition may be delivered through the FIC. In addition, some of signaling information including information on a specific component in a service may be delivered through one or more transport sessions in a ROUTE session.

FIG. 57 is a diagram showing the configuration of a service signaling message according to an embodiment of the present invention.

More specifically, the figure may show the syntax of a service signaling message header according to an embodiment of the present invention. The service signaling message according to the embodiment of the present invention may include a signaling message header and a signaling message. At this time, the signaling message may be expressed in a binary or XML format. In addition, the service signaling message may be included the payload of transport protocol packets.

The signaling message header according to the embodiment may include identifier information for identifying the signaling message. For example, the signaling message may take the form of a section. In this case, the identifier information of the signaling message may indicate the identifier (ID) of the signaling table section. The field indicating the identifier information of the signaling message may be a signaling_id. In one embodiment, the signaling_id field may be 8 bits. For example, if the signaling message is indicated in the form of a section, the identifier information of the signaling message may indicate the id of the signaling table section.

In addition, the signaling message header according to the embodiment may include length information indicating the length of the signaling message. The field indicating the length information of the signaling message may be a signaling_length. In a detailed embodiment, the signaling_length field may be 16 bits.

In addition, the signaling message header according to the embodiment may include identifier extension information for extending the identifier of the signaling message. At this time, the identifier extension information may be information for identifying signaling along with signaling identifier information. The field indicating the identifier extension information of the signaling message may be a signaling_id_extension. In a detailed embodiment, the signaling_id_extension field may be 16 bits.

At this time, the identifier extension information may include the protocol version information of the signaling message. The field indicating the protocol version information of the signaling message may be a protocol_version field. In a detailed embodiment, the protocol_version field may be 8 bits.

In addition, the signaling message header according to the embodiment may include the version information of the signaling message. The version information of the signaling message may be changed when the content included in the signaling message is changed. The field indicating the version information of the signaling message may be a version_number field. In a detailed embodiment, the version_number field may be 4 bits.

In addition, the signaling message header according to the embodiment may include information indicating whether the signaling message is currently available. The field indicating whether the signaling message is available may be a current_next_indicator. For example, if the current_next_indicator field is 1, the current_next_indicator field may indicate that the signaling message is available. As another example, if the current_next_indicator field is 0, the current_next_indicator field may indicate that the signaling message is not available and another signaling message including the same signaling identifier information, signaling identifier extension information and fragment number information is subsequently available.

In addition, the signaling message header according to the embodiment may include an indicator_flags. The indicator_flags may include at least one of a fragmentation_indicator, a payload_format_indicator, and/or an expiration_indicator.

The fragmentation_indicator may indicate whether the signaling message is fragmented. If the value of the fragmentation_indicator is '1', this may indicate that the message is fragmented. In this case, the fragmentation_indicator may indicate that only some of the signaling data is included in the signaling_message_data( ). If the value of the fragmentation_indicator is '0', the fragmentation_indicator may indicate that overall signaling data is included in the signaling_message_data( ).

The payload_format_indicator may indicate whether a payload_format value is included in the current signaling message header part. If the value of the payload_format_indicator is '1', the payload_format_indicator may indicate that the payload_format value is included in the signaling message header part.

The expiration_indicator may indicate whether an expiration value is included in the current signaling message header part. If the value of the expiration_indicator is '1', the expiration_indicator may indicate that the expiration value is included in the signaling message header part.

In addition, the signaling message header according to the embodiment may include fragment number information of the signaling message. One signaling message may be transmitted in a state of being divided into a plurality of fragments. Accordingly, information for identifying the plurality of fragments by the receiver may be fragment number information. The field indicating the fragment number information may be a fragment_number field. In a detailed embodiment, the fragment_number field may be 4 bits. For example, if one signaling message is transmitted in a state of being divided into several fragments, the fragment_number field may indicate the fragment number of the current signaling message.

In addition, the signaling message header according to the embodiment may include the number information of a last fragment if one signaling message is transmitted in a state of being divided into a plurality of fragments. For example, if information on the last fragment number is 3, this may indicate that the signaling message is transmitted in a state of being divided into three fragments. In addition, this may indicate that the fragment including the fragment number of 3 includes the last data of the signaling message. The field indicating the number information of the last fragment may be a last_fragment_number field. In a detailed embodiment, the last_fragment_number field may be 4 bits.

In addition, the signaling message header according to the embodiment may include payload format information indicating the format of the signaling message data included in the payload. The field indicating the payload format information may be a payload_format field. For example, payload_format may indicate one of binary and/or XML.

In addition, the signaling message header according to the embodiment of the present invention may include expiration information indicating the expiration time of the signaling message included in the payload. The expiration information may be expiration.

FIG. 58 is a ladder diagram showing operation for signaling an emergency alert from a broadcast reception device to a companion device according to an embodiment of the present invention.

The broadcast reception device 100 or C100 according to the embodiment of the present invention may receive an emergency alert message from the broadcast transmission device 300 through a broadcast network (broadcast method) and transmit all and/or some of properties of the received emergency alert message to at least one companion device 200 or C200 or a companion screen device C200 using a multicast method.

For example, the broadcast reception device 100 according to the embodiment of the present invention may transmit the emergency alert message to the at least one companion device 200 using the multicast method without requesting subscription. For example, the broadcast reception device 100 according to the embodiment of the present invention may transmit all and/or some of the properties of the emergency alert message to the at least one companion device 200 using the multicast method.

The multicast method refers to a method of, at one broadcast reception device 100, simultaneously transmitting data (or datagrams) to a plurality of companion devices 200 connected to a network through the Internet. For example, one broadcast reception device 100 may transmit data to at least one companion device 200 of a selected specific group. The multicast method may unidirectionally transmit data to a specific device in one-to-many manner. In contrast, a broadcast method is different from the multicast method in that data is unidirectionally delivered to a plurality of unspecified devices. Accordingly, the multicast method may simultaneously transmit data to at least one device connected to the network.

The broadcast reception device 100 may transmit the emergency alert message to the at least one companion device 200 using the multicast method, even when the at least one companion device 200 is not paired with the broadcast reception device 100 or when the at least one companion device 200 is paired with the broadcast reception device 100 but a request for subscription to the emergency alert service of the broadcast reception device 100 is not made.

The broadcast reception device 100 according to the embodiment of the present invention and the at least one companion device 200 are connected to the network for multicast.

The at least one companion device 200 connected to the network always listens to a multicast address (IP & port) for a predefined emergency alert message (CS1105). For example, the at least one companion device 200 prepares to receive the emergency alert multicast message including the emergency alert message through the predefined multicast address (e.g., 239.255.255.251:1900).

The broadcast reception device 100 receives a broadcast signal including the emergency alert message from the broadcast transmission device (CS1110). More specifically, the broadcast reception device 100 may receive a broadcast signal including at least one of the emergency alert message and/or signaling information from the broadcast transmission device 300 using the broadcast receiver 110 or the broadcast interface C110.

The broadcast signal may include an Emergency Alter Table (EAT) and the EAT may include an emergency alert message. The emergency alert message may include an emergency alert.

In addition, the broadcast signal may include signaling information, the signaling information may include a Service Map Table (SMT), and the SMT may include supplementary information of the emergency alert message. The supplementary information of the emergency alert message may include at least one of a ServiceId indicating the identifier of a service which is being provided by the broadcast reception device 100, a MessageId indicating the identifier of the emergency alert message received by the broadcast reception device 100 and/or a MessageURI indicating the address of the content server and/or the broadcast reception device 100 where the supplementary information related to emergency alert is located.

The broadcast reception device 100 may generate an emergency alert multicast message including information related to the emergency alert message based on the emergency alert message.

In one embodiment, the broadcast reception device 100 may generate the emergency alert multicast message including all and/or some of the properties of the emergency alert message based on the emergency alert message using the controller 150.

In one embodiment, the broadcast reception device 100 may generate the emergency alert multicast message including the supplementary information of the emergency alert message based on the supplementary information of the emergency alert message using the controller 150.

In one embodiment, the broadcast reception device 100 may receive the emergency alert message and generate a user interface (UI) to be displayed to the user. The broadcast reception device 100 may generate user interface information of the emergency alert using the controller 150. The user interface information may indicate the properties of the user interface. The user interface information of the emergency alert may include information on a service identifier, a message identifier and a location list of the emergency alert. The service identifier may be expressed by <ServiceId> and may indicate the identifier of the service which is being provided by the broadcast reception device. The message identifier may be expressed by <MessageId> and may indicate the identifier of the emergency alert message received by the broadcast reception device. The location list may be expressed by <URIList> and may indicate a list of URIs indicating the location of the html page configuring the UI using the emergency alert message received by the broadcast reception device. The location information included in the location list may be expressed by <URI> and may indicate the location of the html page configuring the UI using the emergency alert message received by the broadcast reception device. One or more pieces of location information may be included in <URIList>. Then, the broadcast reception device 100 may generate the emergency alert multicast message including UI information of the emergency alert using the controller 150.

The broadcast reception device 100 signals (multicasts) the emergency alert multicast message to a predetermined multicast address using the multicast method (CS1120). For example, the broadcast reception device 100 may signal (or multicast) the emergency alert multicast message including at least one of all and/or some of the properties of the emergency alert message, supplementary information of the emergency alert message and/or UI information of the emergency alert to the predefined multicast address using the multicast method. The predefined multicast address may be a multicast address for transmission of the emergency alert multicast message within the network for multicast. In this case, the broadcast reception device 100 may signal the emergency alert multicast message to the at least one companion device 200 using the controller 150.

The companion device 200 may receive the emergency alert multicast message using the multicast method (CS1130). For example, the companion device 200 may receive the emergency alert multicast message including at least one of all and/or some of the properties of the emergency alert message, supplementary information of the emergency alert message and/or UI information of the emergency alert through the predefined multicast address within the network for multicast.

The companion device 200 may process the emergency alert multicast message. For example, the companion device 200 may display all and/or some of the properties of the emergency alert message using the controller. In addition, the companion device 200 may request the supplementary information stored in the broadcast reception device 100 based on the received messageId and/or ServiceId using the controller. In addition, the companion device 200 may request the supplementary information through the URL of the content server 400 based on the received messageURL using the controller. In addition, the companion device 200 may request a user interface for the emergency alert from the broadcast reception device 100 based on the user interface information of the emergency alert using the controller. In addition, the companion device 200 displays the user interface for the emergency alert based on the URI capable of acquiring the user interface for the emergency alert using the controller. The companion device 200 may display an interface for the emergency alert based on the URI capable of acquiring the interface for the emergency alert through the controller. At this time, the companion device 200 may acquire the interface for the emergency alert from an external server. For example, the companion device 200 may receive at least one of an image file, an HTML file and an XML file for the interface for the emergency alert from the external server. At this time, the external server may be a content/signaling server 400. In another detailed embodiment, the companion device 200 may pre-store the interface for the emergency alert and retrieve the interface corresponding to the URI among the stored interfaces. In addition, the companion device 200 may display the interface for the emergency alert acquired through such operation.

FIG. 59 is a diagram showing a header message format for delivery of an emergency alert multicast message according to an embodiment of the present invention.

The broadcast reception device may generate an emergency alert multicast message using a NOTIFY method and transmit the emergency alert multicast message to a companion device, upon receiving an emergency alert message from a broadcaster. At this time, the value of the TYPE may be set to "atsc:emergency", which may indicate that the emergency alert message is included in a body).

Referring to the figure, the request line of the emergency alert multicast message may be equal to "NOTIFY*HTTP/1.1".

"NOTIFY" may indicate a method of transmitting notification.

"HTTP/1.1" may indicate the version of the HTTP.

In addition, the header field of the emergency alert multicast message may include at least one of a HOST field, a CACHE-CONTROL field, a LOCATION field, a NOTIFICATION-TYPE field, and/or a MESSAGE-TYPE field.

The HOST field may include an address and/or port capable of multicasting the emergency alert message. For example, the HOST field may include "239.255.255.251:1900".

The CACHE-CONTROL field may indicate a time until the multicast message expires. For example, the CACHE-CONTROL field may include an integer specifying the number of seconds when the multicast message is available (Field value can have the max-age directive followed by an integer that specifies the number of seconds the multicast message is available.).

The LOCATION field may indicate the location of the emergency alert message in the content server or the broadcast server. For example, the location may be a URL (Uniform Resource Locator). The companion device may access this URL to access an emergency alert related information page.

The NOTIFICATION-TYPE field may indicate the type of the message. For example, the NOTIFICATION-TYPE field may indicate "atsc:emergency".

The MESSAGE-TYPE field may indicate the emergency message type. For example, the MESSAGE-TYPE field may indicate a Common Alerting Protocol (CAP).

The fields available in the basic header message format were described above and may be deleted/changed or fields may be added according to an emergency alert service system used in a next-generation hybrid broadcast system.

FIG. 60 is a diagram showing a body message format for delivery of an emergency alert multicast message according to an embodiment of the present invention.

Referring to the figure, the body message format for delivery of the emergency alert multicast message including all of the properties of the emergency alert message according to the embodiment of the present invention is shown.

The broadcast reception device 100 according to the embodiment of the present invention may signal (or multicast) the emergency alert multicast message including all of the properties of the received emergency alert message to a predefined multicast address using a multicast method. In this case, the companion device may require an emergency message parser such as a CAP parser.

FIG. 61 is a diagram showing a body message format for delivery of an emergency alert multicast message according to an embodiment of the present invention.

Referring to (a) of the figure, a body message format for delivery of an emergency alert multicast message including some properties of an emergency alert message according to an embodiment of the present invention is shown.

The broadcast reception device may receive an emergency alert message, extract specific elements and/or properties of the emergency alert message, generate an emergency alert multicast message and multicast the emergency alert multicast message.

For example, the broadcast reception device 100 may extract at least one of an identifier element for identifying the emergency alert, a category element indicating the category of the emergency alert, a description element indicating the description of the emergency alert, an areaDesc element indicating the area corresponding to the emergency alert, an urgency element indicating the urgency of the emergency alert, a severity element indicating the severity of disaster causing the emergency alert and/or a certainty element indicating the certainty of disaster causing the emergency alert, from the emergency alert message. Then, the broadcast reception device 100 may generate an emergency alert multicast message including at least one of the identifier element, the category element, the description element, the areaDesc element, the urgency element, the severity element, and/or the certainty element based on the emergency alert message using the controller 150.

The companion device may access the URL of the LOCATION field of the header to access the emergency alert related information page, if a user desires to obtain more emergency alert related information after receiving the emergency alert multicast message including some properties of the emergency alert message. That is, the companion device may receive the emergency alert related information from the content server and/or the broadcast server based on the URL of the LOCATION field.

Referring to (b) of the figure, a body message format for delivery of an emergency alert message in the form of text according to an embodiment of the present invention is shown.

Similarly, when the user desires to obtain more emergency alert related information, the companion device may access the URL of the LOCATION field of the header to access the emergency alert related information page.

FIG. 62 is a flowchart illustrating operation of a broadcast reception device according to an embodiment of the present invention.

The broadcast reception device according to the embodiment of the present invention may perform operation related to the above description.

The broadcast reception device may receive a broadcast signal using a broadcast receiver or a broadcast interface (CS1210). For example, the broadcast reception device may receive a broadcast signal including an emergency alert message and/or signaling information indicating metadata of the emergency alert message.

The broadcast signal may include an Emergency Alert Table (EAT), and the ETA may include an emergency alert message. The emergency alert message may include an emergency alert. In addition, the broadcast signal may include signaling information, the signaling information includes a Service Map Table (SMT), and the SMT may include supplementary information of the emergency alert message. The supplementary information of the emergency alert message may include at least one of a ServiceId indicating the identifier of a service which is being provided by the broadcast reception device 100, a MessageId indicating the identifier of the emergency alert message received by the broadcast reception device 100 and/or a MessageURI indicating the address of the content server and/or the broadcast reception device 100 where the supplementary information related to emergency alert is located.

In addition, the signaling information may include service layer signaling (or first information) for providing discovery and acquisition of a service and at least one content component included in the service. In addition, the signaling information may include a service list table (or FIC or second information) including data related to fast channel joining and switching. The service list table may build a list of services and provide bootstrap discovery of service layer signaling. The FIC may enable the broadcast reception device to build a basic service list and bootstrap discovery of service layer signaling for each service. In some embodiments, the FIC may be expressed by a Service List Table (SLT). The FIC (or SLT) may be transmitted through link layer signaling. In addition, the FIC (or SLT) may be transmitted in each physical layer frame, for fast acquisition. In some embodiments, the FIC (or SLT) may be transmitted through at least one of a physical layer frame, a PLP for transmitting signaling and/or a PLP allocated per broadcaster.

In addition, the signaling information may include a fragmentation_indicator indicating whether signaling information is fragmented, a payload_format_indicator indicating whether information on a payload format is included in a header part of signaling information, an expiration_indicator indicating whether an expiration time of the signaling information is included in the header part of signaling information, a fragment_number attribute indicating the number of the fragmented signaling information, a last_fragment_number attribute indicating a last number of the numbers of the fragmented signaling information, a payload_format attribute indicating a payload format of signaling information, and an expiration attribute indicating the expiration time of the signaling information.

The broadcast reception device may generate an emergency alert multicast message based on the broadcast signal using the controller (CS1220).

The emergency alert multicast message may include a header message and the header message may include at least one of a HOST field indicating an address and/or port capable of multicasting the emergency alert multicast message, a CACHE-CONTROL field indicating an expiration time of the emergency alert multicast message, a LOCATION field indicating the location of the emergency alert message, a NOTIFICATION-TYPE field indicating the type of the emergency alert multicast message and a MESSAGE-TYPE field indicating the type of the emergency alert message.

In addition, the emergency alert multicast message may include a body message and the body message may include all of the properties of the emergency alert message.

In addition, the emergency alert multicast message may include a body message and the body message may include at least one of an identifier element for identifying an mergency alert, a category element indicating the category of the emergency alert, a description element indicating the description of the emergency alert, an areaDesc element indicating the area corresponding to the emergency alert, an urgency element indicating urgency of the emergency alert, a severity element indicating severity of disaster causing the emergency alert and a certainty element indicating the certainty of disaster causing the emergency alert.

In addition, the broadcast reception device may generate an emergency alert multicast message including supplementary information of the emergency alert message using the controller.

In addition, the broadcast reception device may generate a user interface for the emergency alert based on the emergency alert message using the controller and generate an emergency alert multicast message including user interface information indicating the properties of the user interface. The user interface information may include at least one of a ServiceId indicating an identifier of a service, a MessageId indicating an identifier of an emergency alert message, and/or a URIList indicating the location of a page configuring a user interface.

The broadcast reception device 100 may transmit the emergency alert multicast message to a companion screen device using a companion screen interface (CS1230). For example, the broadcast reception device 100 may signal (or multicast) the emergency alert multicast message to a predefined multicast address using a multicast method. The companion screen device may include the above-described companion device. In addition, the companion screen interface may be included in the controller. The predefined multicast address may be a multicast address for transmission of the emergency alert message within a network for multicast. For example, the broadcast reception device 100 may signal (or multicast) the emergency alert multicast message including at least one of all or/or some properties of the emergency alert message, supplementary information of the emergency alert message and/or user interface information of the emergency alert to a predefined multicast address using a multicast method.

Features, structures, effects, and the like as described above in the embodiments are included in at least one embodiment of the present invention and should not be limited to only one embodiment. In addition, the features, structures, effects, and the like described in the respective embodiments may be combined or modified even with respect to the other embodiments by those skilled in the art. Accordingly, contents related to these combinations and modifications should be construed as within the scope of the present invention.

Although the preferred embodiments of the present invention have been disclosed for illustrative purposes, the embodiments are only exemplified, but do not limit the present invention. Those skilled in the art will appreciate that various modifications and applications are possible, without departing from the scope and spirit of the invention as disclosed in the accompanying claims. Further, differences related to such modifications and applications should be interpreted as within the scope of the present invention defined by the accompanying claims.

MODE FOR INVENTION

Various embodiments have been described in the best mode for carrying out the invention.

INDUSTRIAL APPLICABILITY

The present invention is applicable to the broadcast industry.

The invention claimed is:
1. A primary device (PD) for communicating with at least one companion device (CD), the PD comprising:
a broadcast interface to receive a broadcast signal including an emergency alert message (EAM), wherein the emergency alert message (EAM) includes identification (ID) information of the emergency alert message

(EAM), priority information of the emergency alert message (EAM), and description information of at least one emergency event; and a network interface to send the emergency alert message (EAM) to a multicast group address such that the at least one CD is able to join a multicast group for the emergency alert message (EAM) based on the multicast group address, and send at least one message comprising capability information for representing capabilities and capability group required for decoding and presenting content to the at least one CD, a first value included in the capability information is used to represent video type information, a second value included in the capability information is used to represent audio type information and a third value included in the capability information is used to represent internet link information.

2. The PD according to claim 1, wherein the broadcast signal further includes signaling information including first information for providing discovery and acquisition of a service and at least one content component included in the service and second information including data related to fast channel joining and switching.

3. The PD according to claim 1, wherein the signaling information includes at least one of a fragmentation_indicator indicating whether the signaling information is fragmented, a payload_format_indicator indicating whether information on a payload format is included in a header part of the signaling information, an expiration_indicator indicating whether an expiration time of the signaling information is included in the header part of the signaling information, a fragment_number attribute indicating the number of the fragmented signaling information, a last_fragment_number attribute indicating a last number of the numbers of the fragmented signaling information, a payload_format attribute indicating the payload format of the signaling information, and an expiration attribute indicating the expiration time of the signaling information.

4. The PD according to claim 1, wherein the emergency alert message includes a header message, and the header message includes at least one of a HOST field indicating an address and/or port capable of multicasting the emergency alert multicast message, a CACHE-CONTROL field indicating an expiration time of the emergency alert multicast message, a LOCATION field indicating a location of the emergency alert message, a NOTIFICATION-TYPE field indicating a type of the emergency alert multicast message and a MESSAGE-TYPE field indicating the type of the emergency alert message.

5. The PD according to claim 4, wherein the emergency alert message includes a body message and the body message includes all properties of the emergency alert message.

6. The PD according to claim 4, wherein the emergency alert message includes a body message, and the body message includes at least one of an identifier element for identifying an emergency alert, a category element indicating a category of the emergency alert, a description element indicating a description of the emergency alert, an urgency element indicating urgency of the emergency alert, a severity element indicating severity of disaster causing the emergency alert and a certainty element indicating the certainty of disaster causing the emergency alert.

7. The PD according to claim 1, wherein the broadcast signal further includes signaling information includes supplementary information of the emergency alert message, and the controller generates the emergency alert multicast message including the supplementary information of the emergency alert message.

8. The PD according to claim 7, wherein the supplementary information of the emergency alert message includes a MessageURI indicating an address of supplementary information related to the emergency alert.

9. The PD according to claim 1, wherein the controller generates a user interface of the emergency alert based on the emergency alert message and generates the emergency alert message including user interface information indicating properties of the user interface.

10. The PD according to claim 9, wherein the user interface information includes a URIList indicating a location of a page configuring the user interface.

11. A method of communicating with at least one companion device (CD) in a primary device (PD), the method comprising:
receiving a broadcast signal including an emergency alert message (EAM), wherein the emergency alert message (EAM) includes identification (ID) information of the emergency alert message (EAM), priority information of the emergency alert message (EAM), and description information of at least one emergency event;
sending the emergency alert message (EAM) to a multicast group address such that the at least one CD is able to join a multicast group for the emergency alert message (EAM) based on the multicast group address; and
sending at least one message comprising capability information for representing capabilities and capability groups required for decoding and presenting content to the at least one CD, a first value included in the capability information is used to represent video type information, a second value included in the capability information is used to represent audio type information and a third value included in the capability information is used to represent internet link information.

12. The method according to claim 11, wherein the broadcast signal further includes signaling information including first information for providing discovery and acquisition of a service and at least one content component included in the service and second information including data related to fast channel joining and switching.

13. The method according to claim 11, wherein the emergency alert message includes a header message, and the header message includes at least one of a HOST field indicating an address and/or port capable of multicasting the emergency alert multicast message, a CACHE-CONTROL field indicating an expiration time of the emergency alert multicast message, a LOCATION field indicating a location of the emergency alert message, a NOTIFICATION-TYPE field indicating a type of the emergency alert multicast message and a MESSAGE-TYPE field indicating the type of the emergency alert message.

14. The method according to claim 13, wherein the emergency alert message includes a body message, and the body message includes at least one of an identifier element for identifying an emergency alert, a category element indicating a category of the emergency alert, a description element indicating a description of the emergency alert, an urgency element indicating urgency of the emergency alert, a severity element indicating severity of disaster causing the emergency alert and a certainty element indicating the certainty of disaster causing the emergency alert.

* * * * *